United States Patent
Anton et al.

(10) Patent No.: US 10,798,130 B2
(45) Date of Patent: *Oct. 6, 2020

(54) CONTROL OVER DATA RESOURCE UTILIZATION THROUGH A SECURITY NODE CONTROL POLICY EVALUATED IN THE CONTEXT OF AN AUTHORIZATION REQUEST

(71) Applicant: Vescel, LLC, Las Vegas, NV (US)

(72) Inventors: Dhryl Anton, Henderson, NV (US); Michael McFall, Henderson, NV (US)

(73) Assignee: Vescel, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/912,667

(22) Filed: Mar. 6, 2018

(65) Prior Publication Data
US 2018/0198826 A1 Jul. 12, 2018

Related U.S. Application Data

(63) Continuation of application No. 15/230,421, filed on Aug. 7, 2016, now Pat. No. 9,948,682, and a continuation-in-part of application No. 14/754,514, filed on Jun. 29, 2015, now Pat. No. 10,318,753.

(60) Provisional application No. 62/203,596, filed on Aug. 11, 2015, provisional application No. 62/019,363, filed on Jun. 30, 2014.

(51) Int. Cl.
*H04L 29/06* (2006.01)

(52) U.S. Cl.
CPC ............. *H04L 63/20* (2013.01); *H04L 63/10* (2013.01)

(58) Field of Classification Search
CPC .................................. H04L 63/10; H04L 63/20
See application file for complete search history.

(56) References Cited

U.S. PATENT DOCUMENTS

| | | | | |
|---|---|---|---|---|
| 8,189,596 B2* | 5/2012 | Rasanen | ................. | H04L 47/10 370/395.21 |
| 8,577,368 B2* | 11/2013 | Rasanen | ................. | H04L 45/00 370/331 |
| 8,966,578 B1* | 2/2015 | Belov | ..................... | H04L 63/10 709/225 |
| 9,069,979 B2* | 6/2015 | Srinivasan | ............. | G06F 21/62 |
| 9,225,744 B1* | 12/2015 | Behm | ..................... | H04L 63/20 |

(Continued)

*Primary Examiner* — Ali Shayanfar
(74) *Attorney, Agent, or Firm* — Peter Jensen-Haxel

(57) ABSTRACT

Disclosed is a method, a device, and/or a system of control over data resource utilization through a security node control policy evaluated in the context of an authorization request. In one embodiment, a method includes receiving an authorization request from a device to utilize a protected resource within a datastore. A control policy extracted from a security node defines an authorized context for the device to utilize the protected resource. The control policy includes a control algorithm comprising one or more conditionals comparing context values to control ranges. Context values are retrieved to form a context dataset. Utilization of the protected resource is authorized when it is determined by the control algorithm that the context dataset conforms to the authorized context. The security node may organize data into a domain structure that includes a unique identifier, an identity element, a content element, and a context element.

20 Claims, 31 Drawing Sheets

Network View 150

(56) References Cited

U.S. PATENT DOCUMENTS

| | | | | |
|---|---|---|---|---|
| 9,280,674 B2* | 3/2016 | Fujisaki | ............... | G06F 21/62 |
| 9,787,681 B2* | 10/2017 | Clancy, III | ............. | H04L 63/10 |
| 2005/0182958 A1* | 8/2005 | Pham | ................ | G06F 21/51 |
| | | | | 726/22 |
| 2008/0016580 A1* | 1/2008 | Dixit | .................. | G06F 21/604 |
| | | | | 726/27 |
| 2008/0148346 A1* | 6/2008 | Gill | ................... | H04L 63/1408 |
| | | | | 726/1 |
| 2014/0258363 A1* | 9/2014 | Peco | ................... | H04L 51/32 |
| | | | | 709/202 |
| 2015/0092727 A1* | 4/2015 | Rydnell | ............ | H04W 76/022 |
| | | | | 370/329 |
| 2016/0014157 A1* | 1/2016 | Gomez | ............... | H04L 63/20 |
| | | | | 726/1 |

* cited by examiner

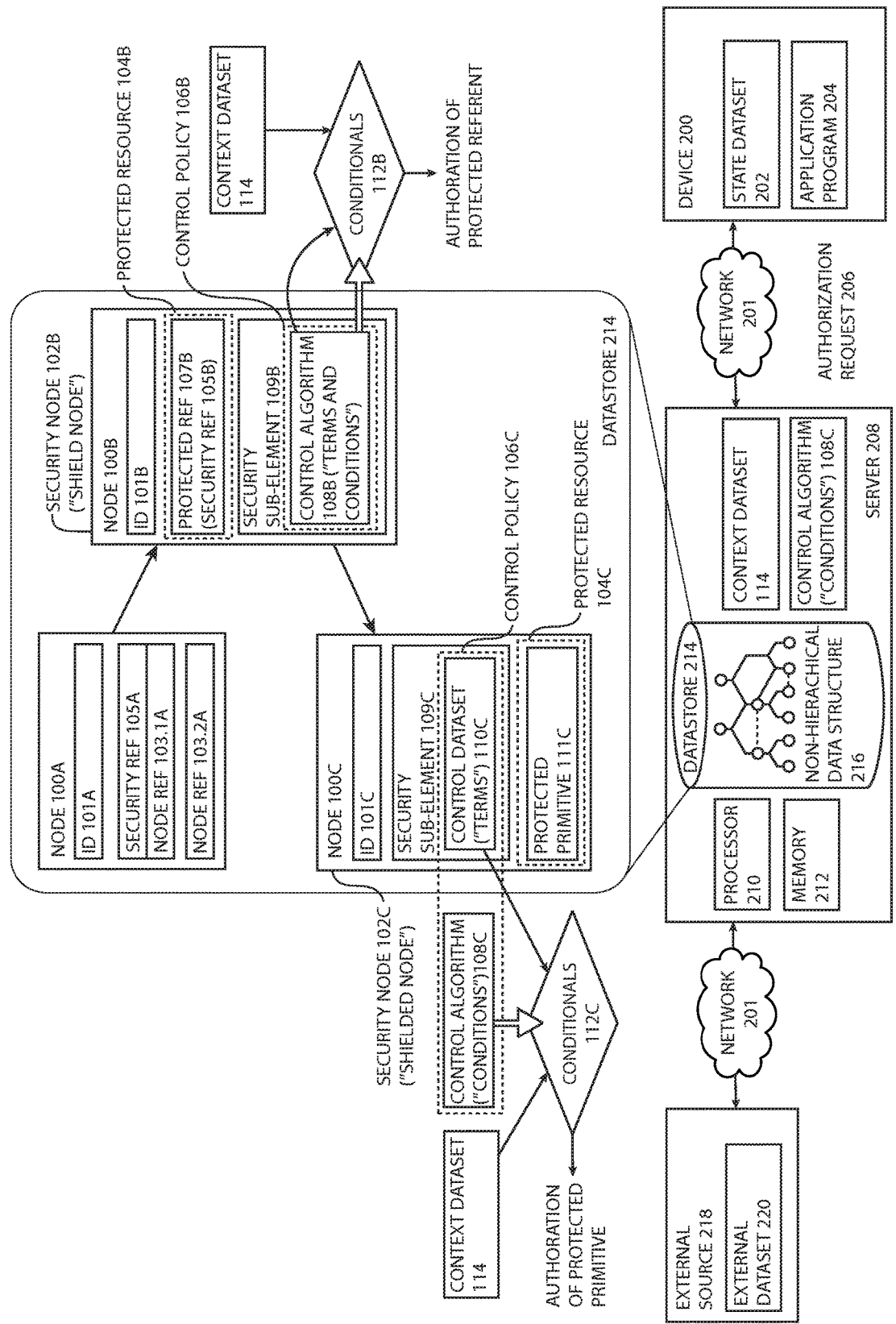
FIG. 1 Network View 150

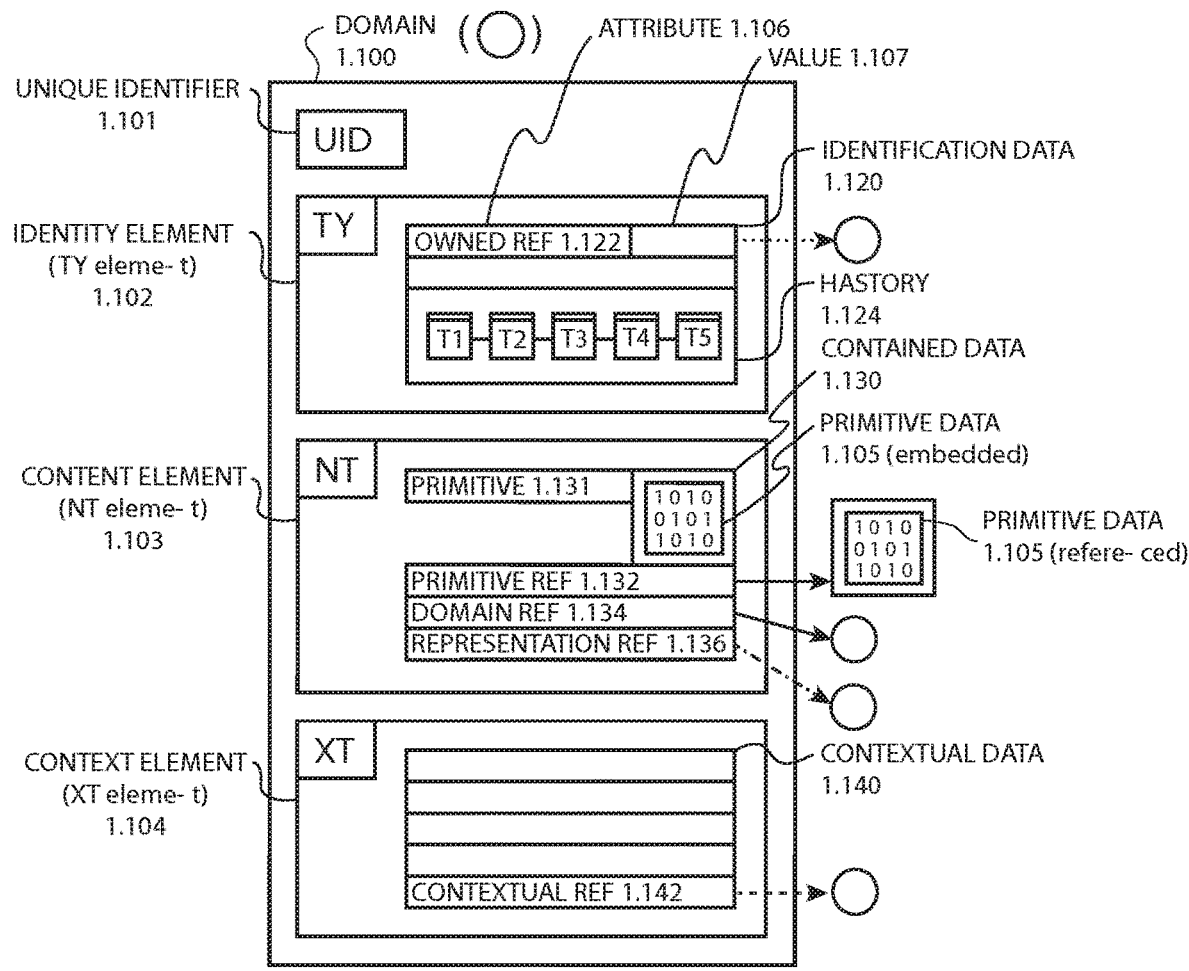
FIG. 1.1A

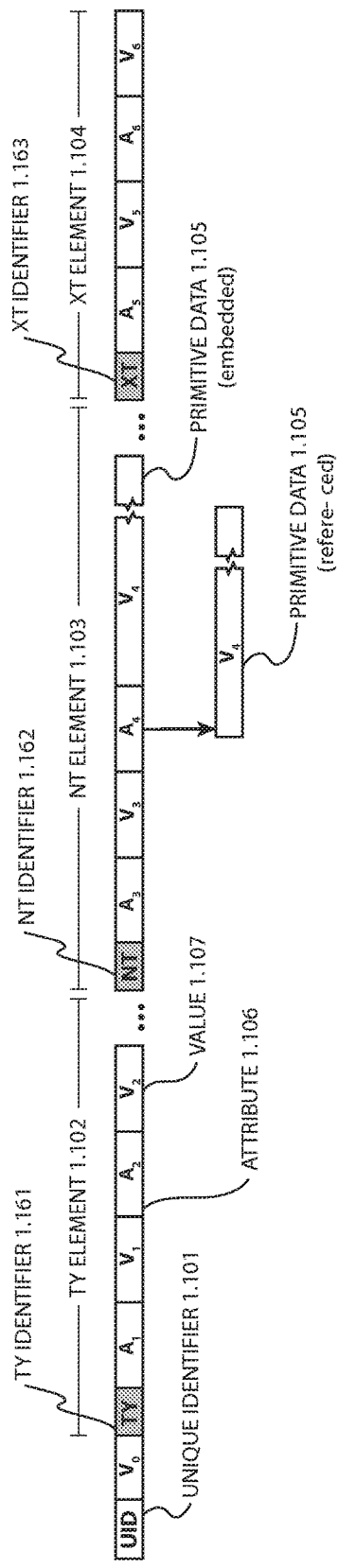
FIG. 1.1B
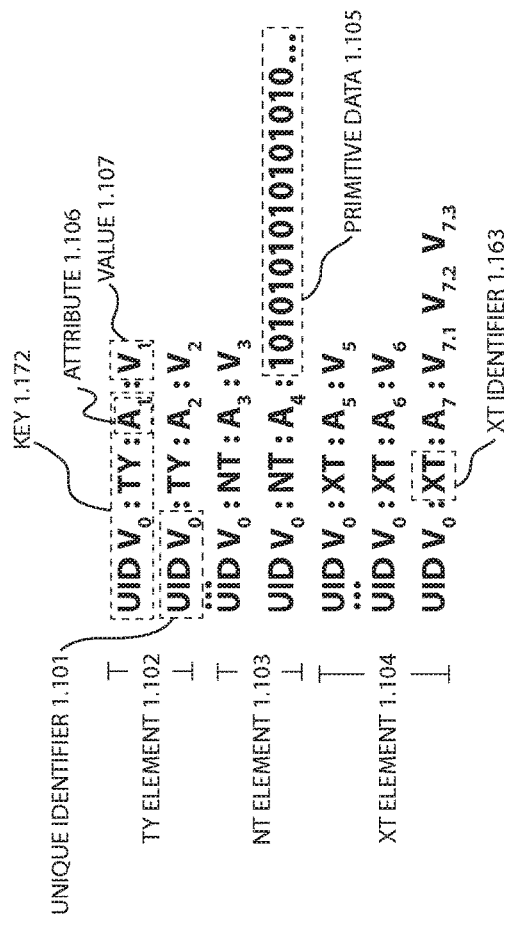
FIG. 1.1C

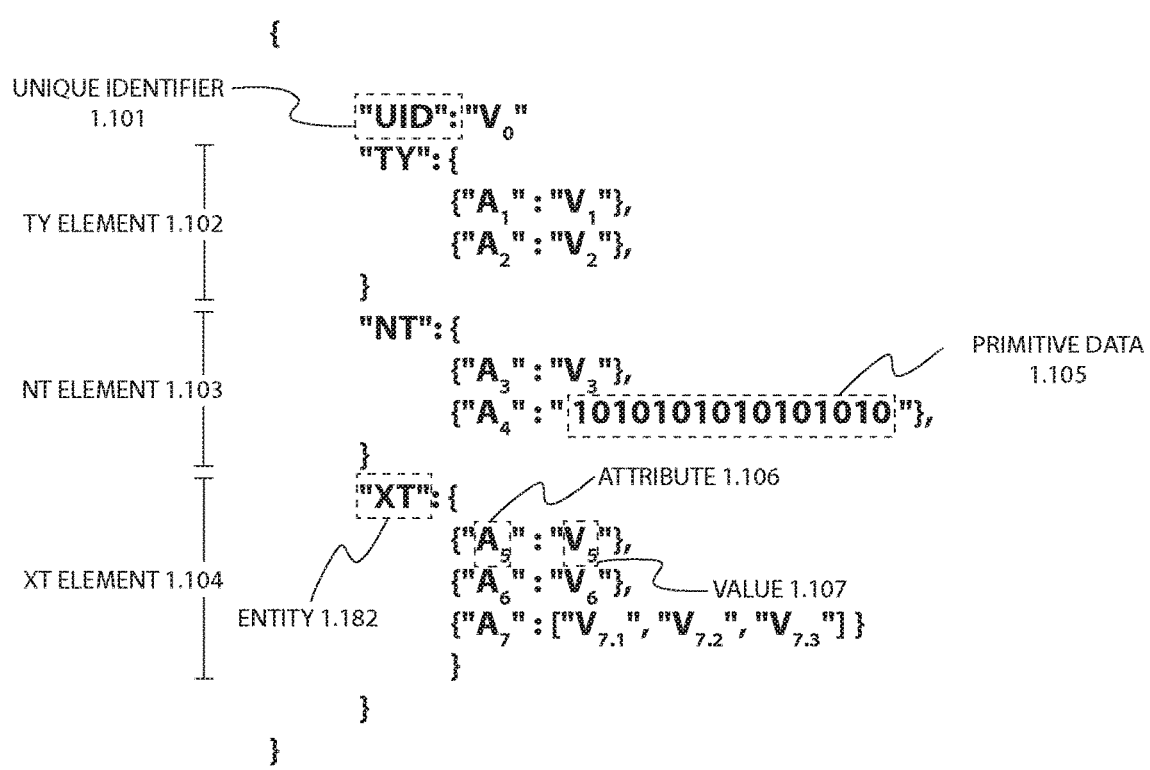
FIG. 1.1D  Docume-t Format Storage 1.180 of Domai- show- i- JSON Notatio-

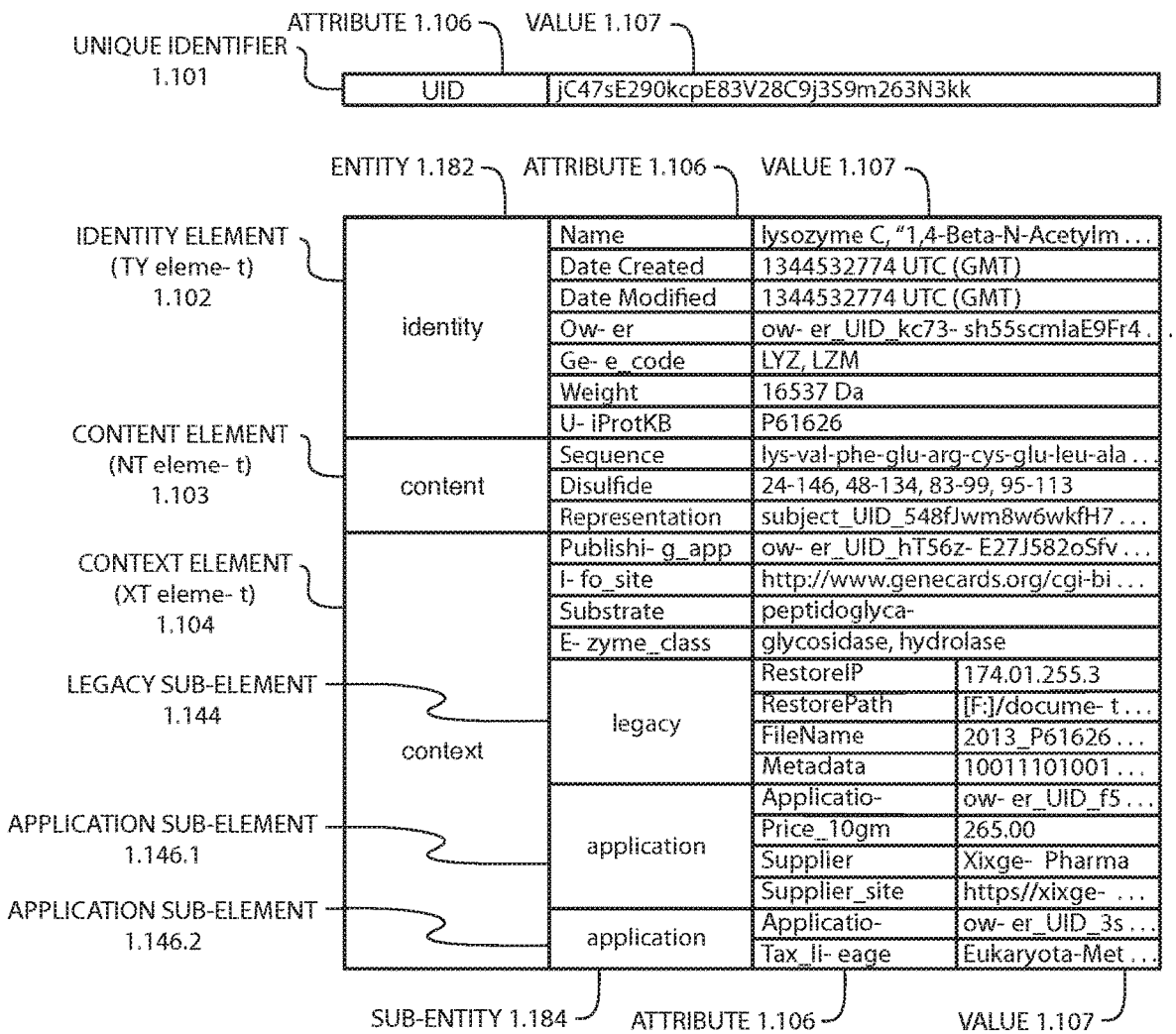
FIG. 1.1E  E-tity-Attribute-Value Represe-tatio- 1.190

○ DOMAIN 1.100

△ SUBJECT DOMAIN 1.200

⊛ RELATION DOMAIN 1.300

✦ OWNER DOMAIN 1.400

🛡 SECURITY DOMAIN 1.500

○* SHIELDED DOMAIN

□ OBJECT DOMAIN 1.700

⬠ STACK DOMAIN 1.800

⬡ COLLECTION DOMAIN 1.900

⬣ EPI-COLLECTION DOMAIN 1.1000

⟶ REFERENCE
    e.g., DOMAIN REF 1.134, 1.234, 1.334, 1.434 ...
    e.g., SUBJECT REF 1.734, OBJECT REF 1.834 ...
    e.g., PRIMITIVE REF 1.132, 1.232 ...
    e.g., OWNING REF 1.422
    e.g., DIRECTED EDGE 1.635
    e.g., SECURITY REF 1.338

┈┈▶ OWNED REFERENCE
    e.g., OWNED REF 1.122, 1.222, 1.322, 1.422 ...

┄┄▶ REPRESENTATION REFERENCE
    e.g., REPRESENTATION REF 1.136, 1.236, 1.336 ...
    e.g., REPRESENTATION REF 1.636
    e.g., SUBJECT REF 1.736, 1.836, 1.936, 1.1036

╌╌▶ UNCONSTRAINED REFERENCE
    e.g., CONTEXTUAL REF 1.142, 1.242, 1.342, 1.442 ...
    e.g., UNCONSTRAINED REF 1.642

*FIG. 1.1F*  Domai- Key 199

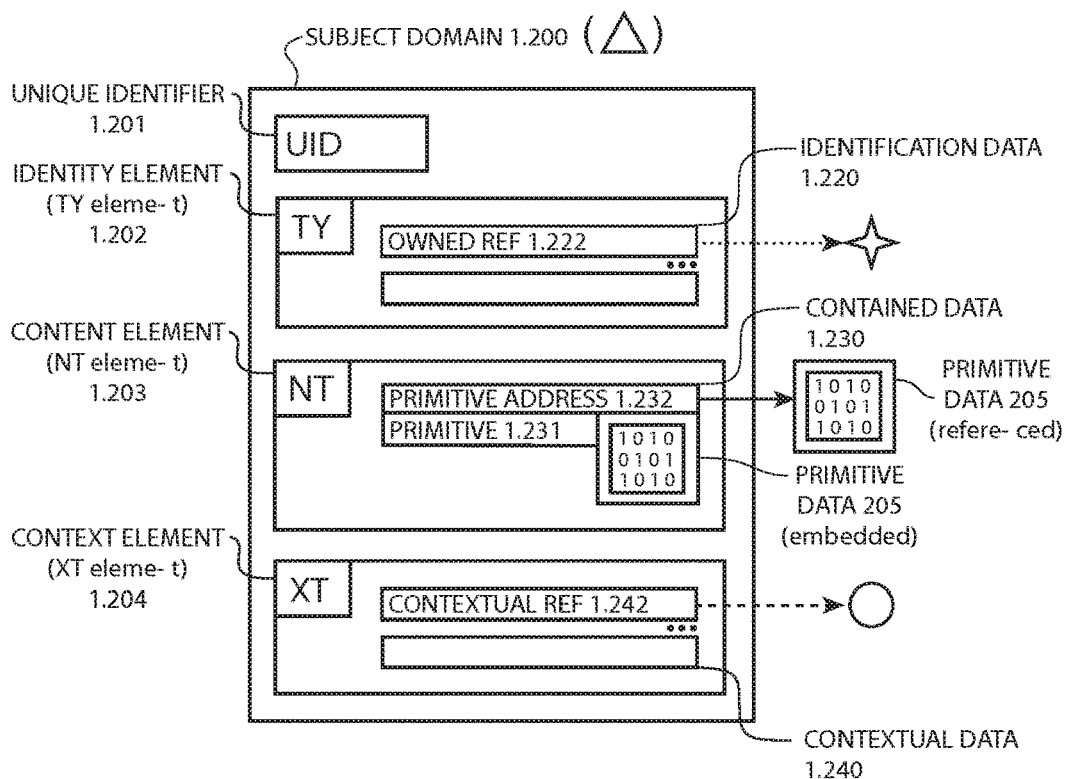
FIG. 1.2
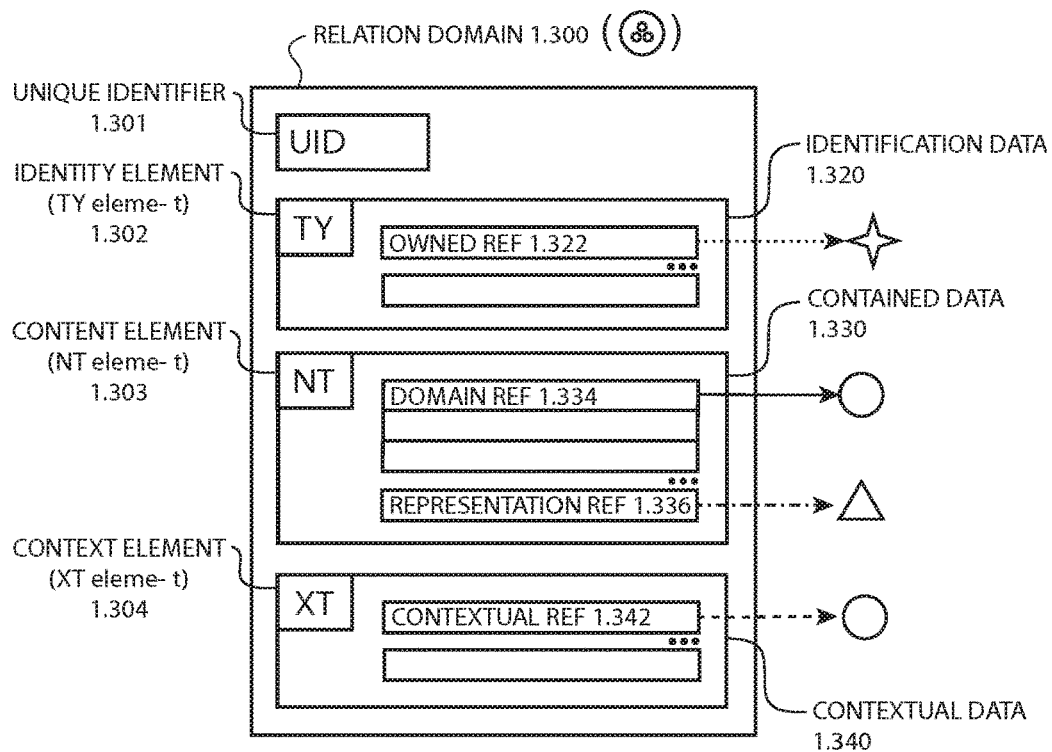
FIG. 1.3

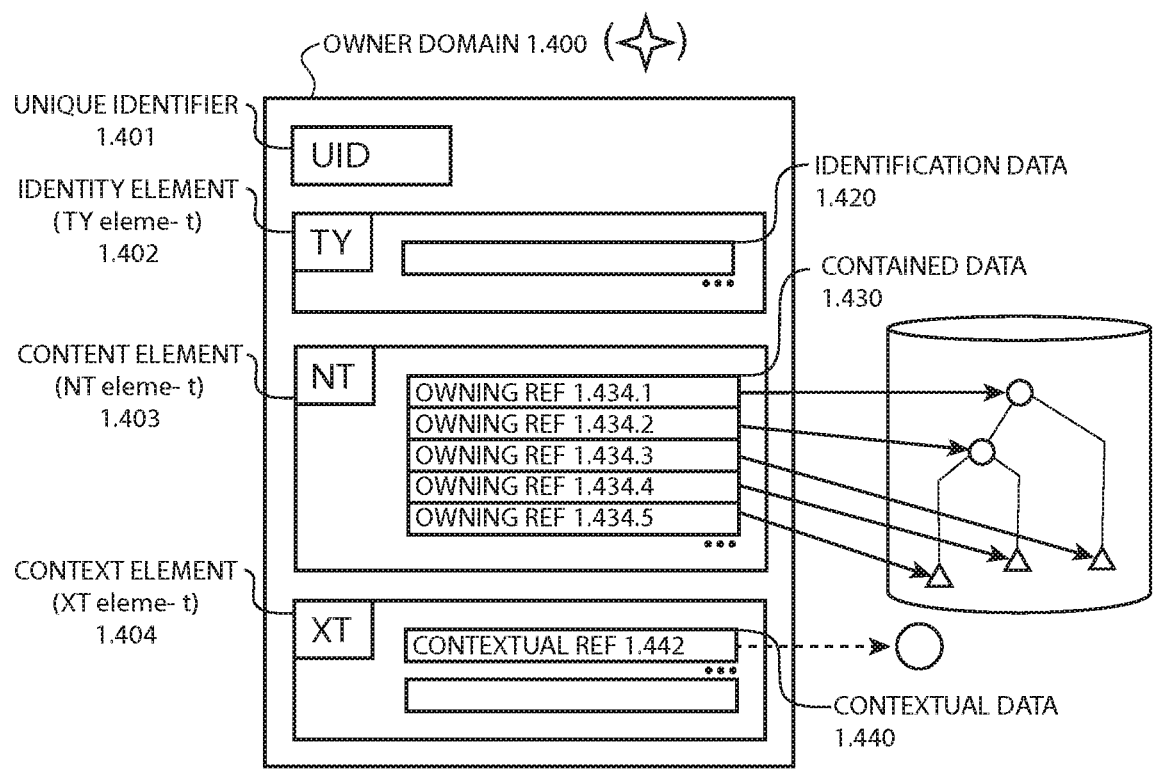
FIG. 1.4

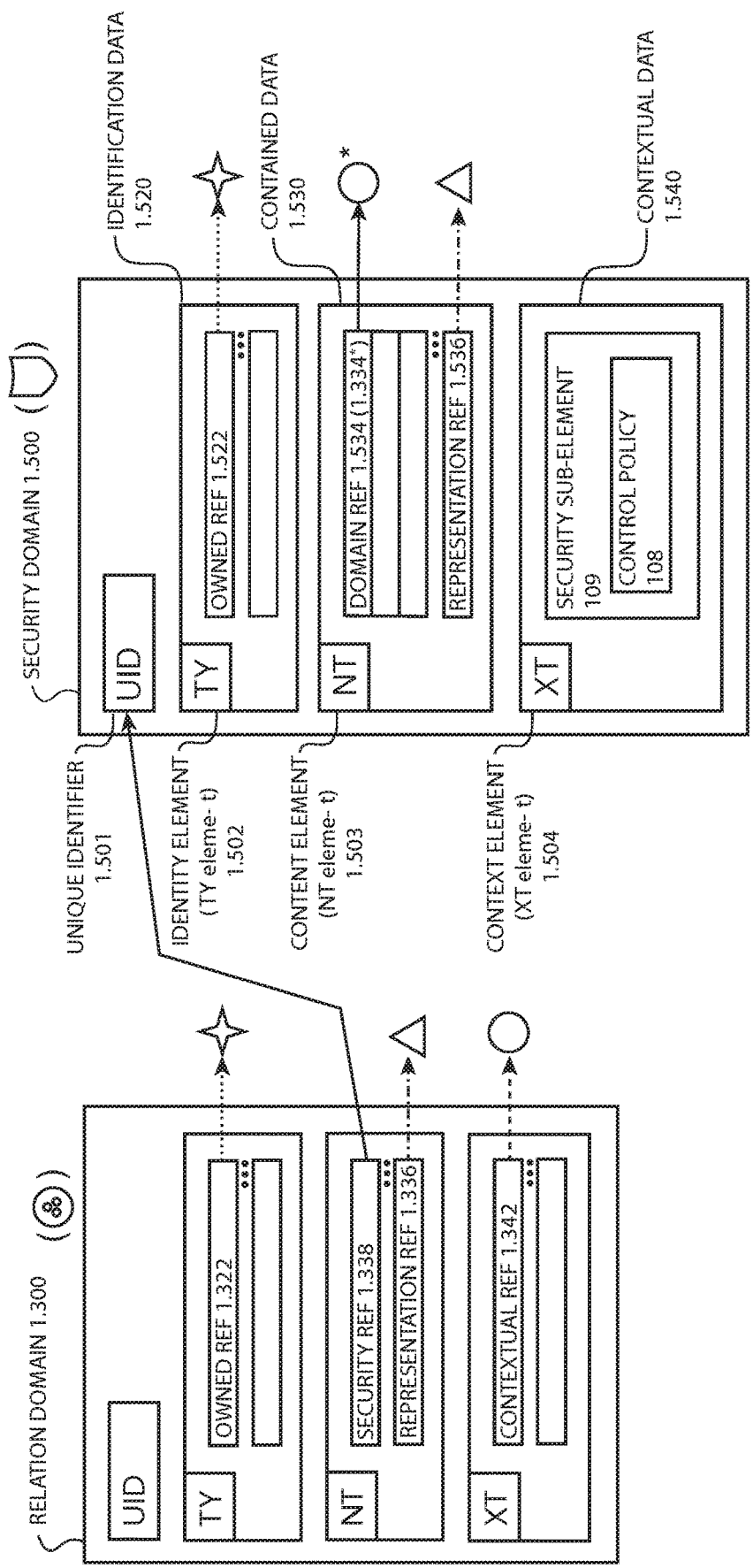
FIG. 1.5

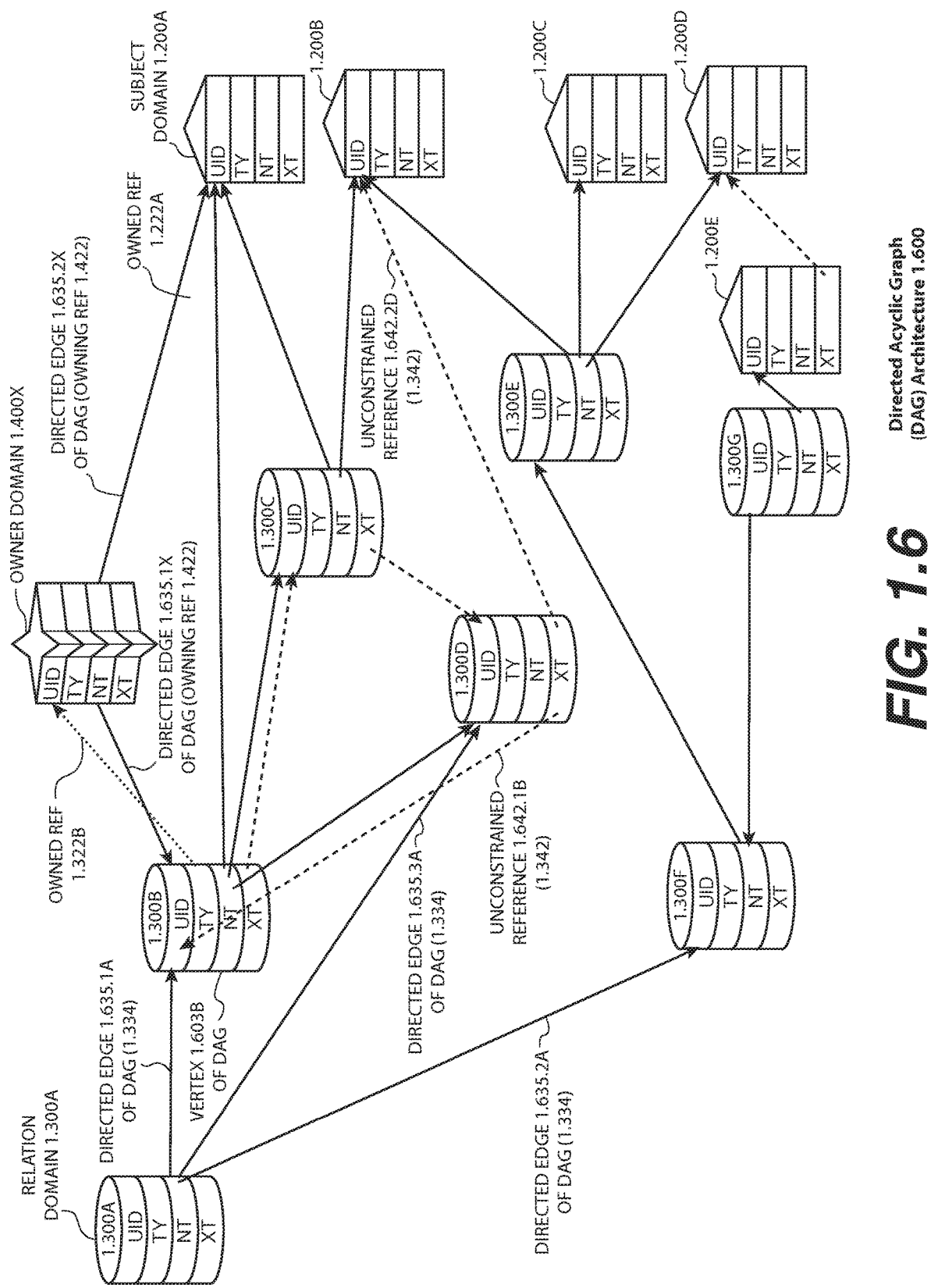
FIG. 1.6 Directed Acyclic Graph (DAG) Architecture 1.600

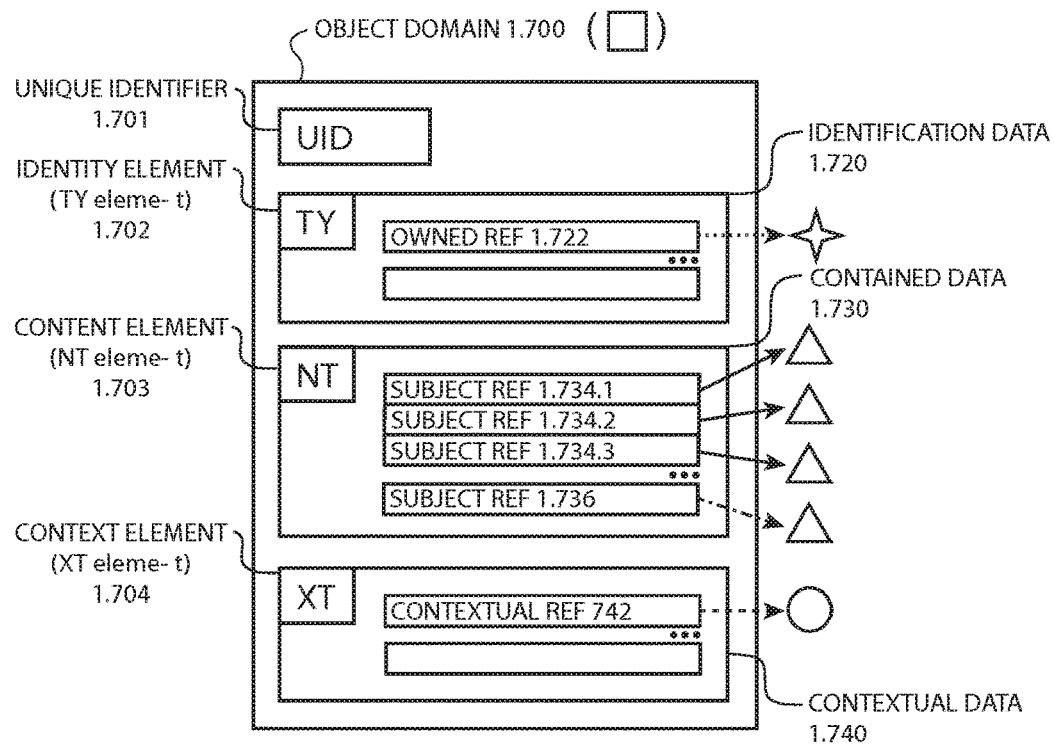
FIG. 1.7
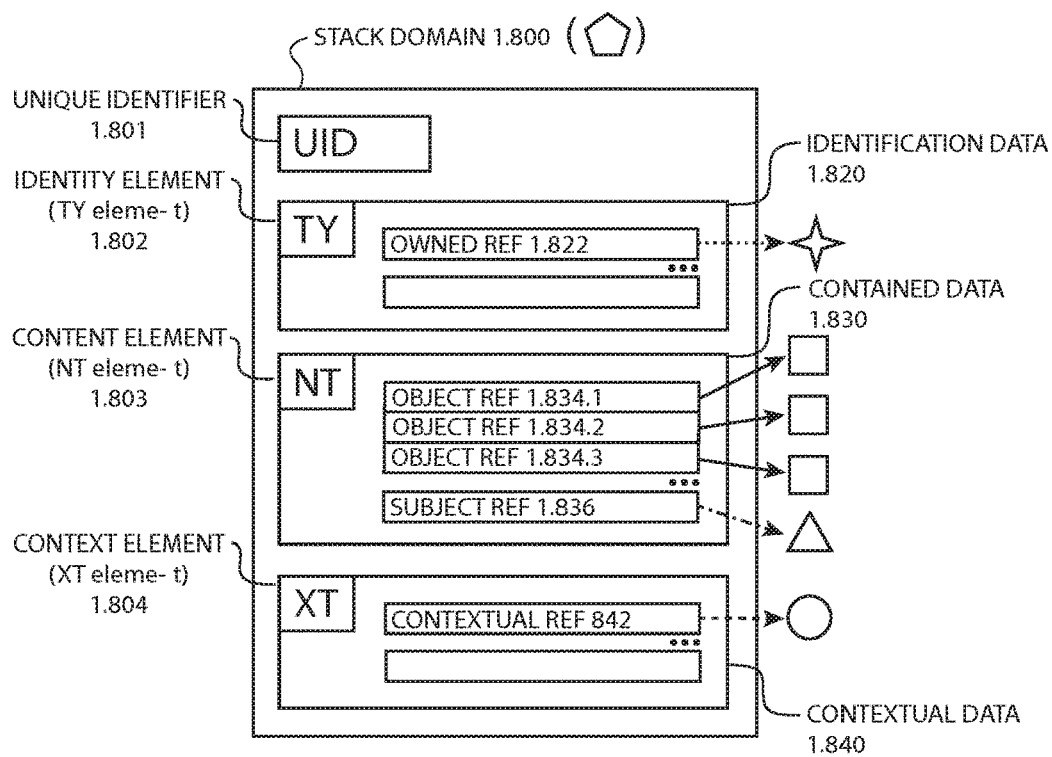
FIG. 1.8

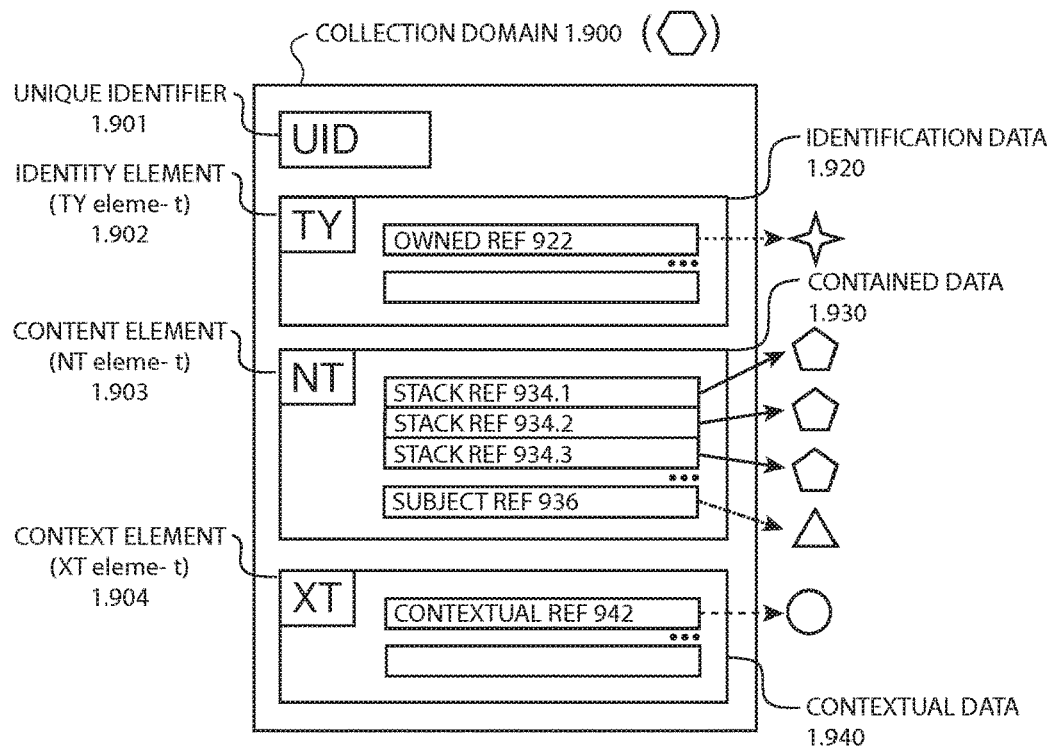
FIG. 1.9
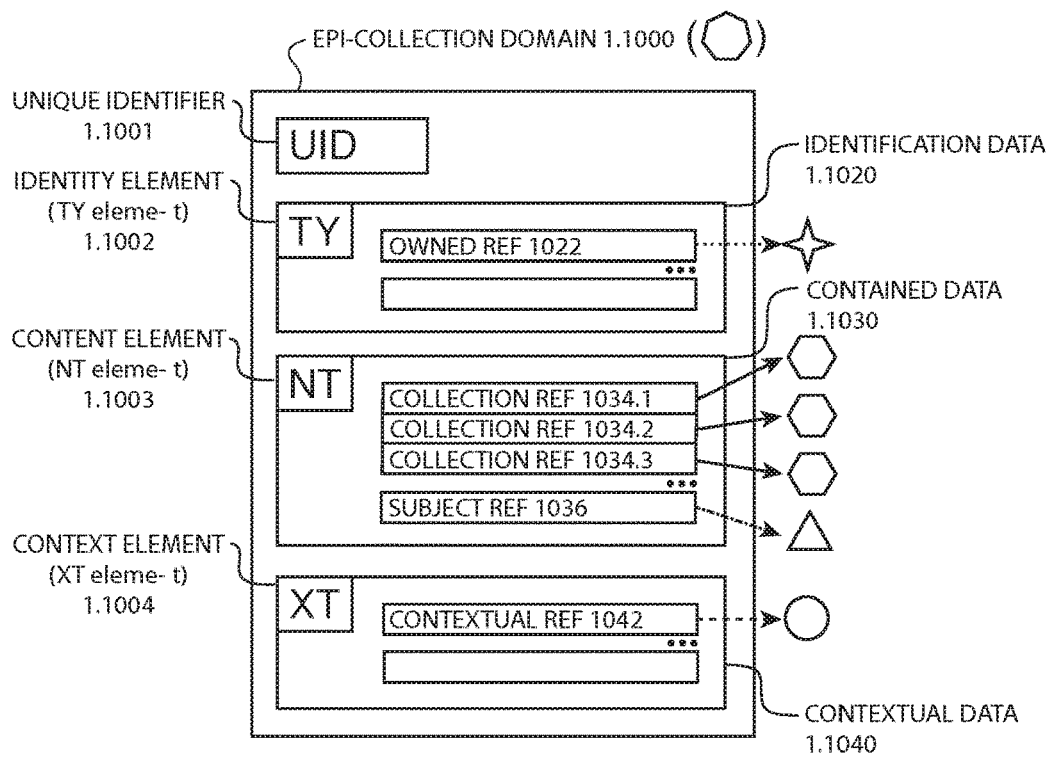
FIG. 1.10

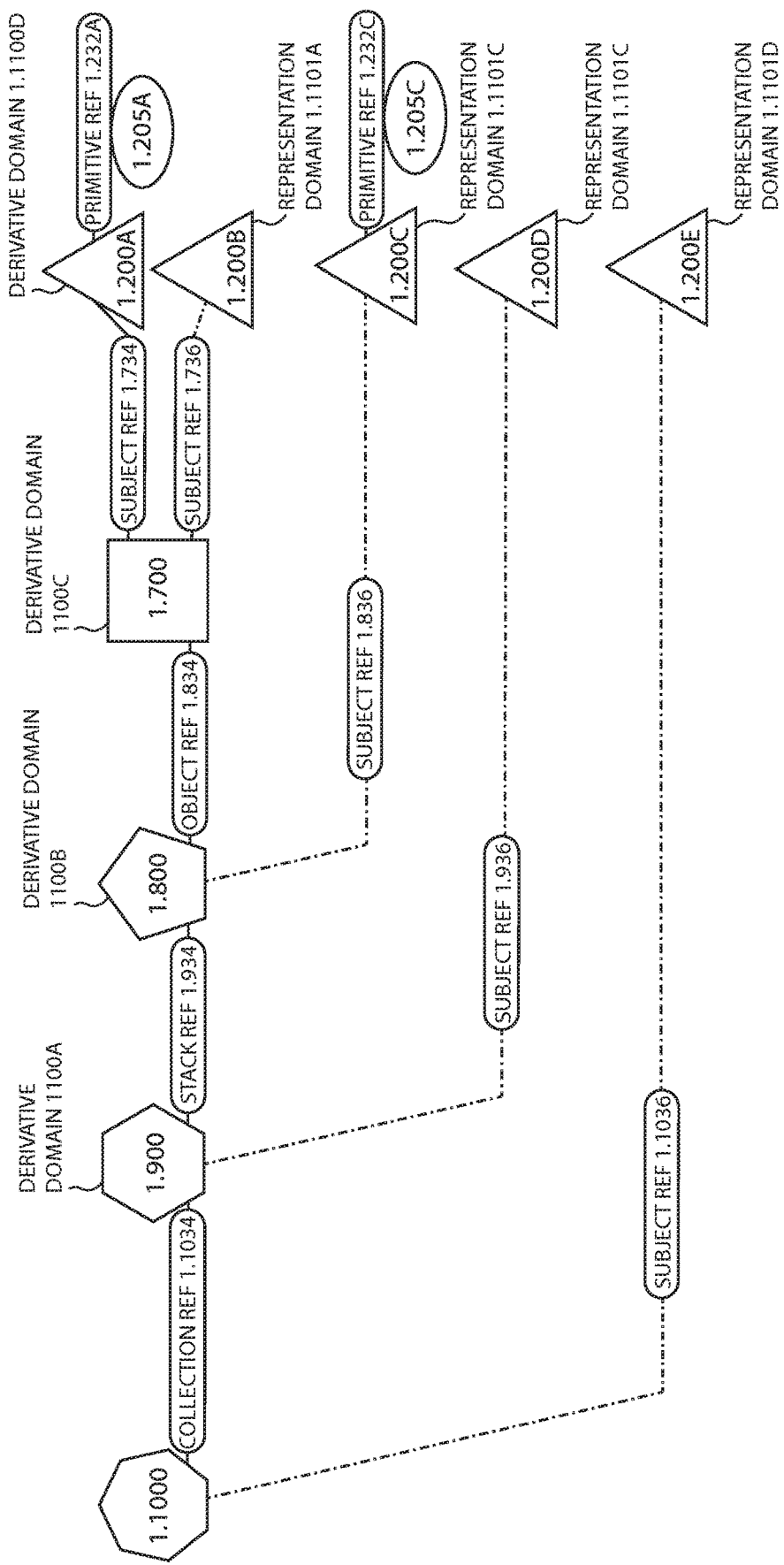
FIG. 1.11

| SECURITY SUB-ELEMENT 109 | CONTROL ATTRIBUTE 600 | CONTROL VALUE RANGE 602 |
|---|---|---|
| CONTROL DATASET 110 ("TERMS") | Email_domai- | <@foo, @lorum, @ipsum> |
| | User | <all> |
| | Time | <9:00:00, 17:30:00> |
| | Day | <mo-, tue, wed, thurs, fri> |
| | Device_id | <all> |
| | Device_type | <tablet, pho- e> |
| | Device_os | <iOS8, iOS9, A- droid> |
| | Accou- t_fu- ds | <2000, a- y> |
| | ... | |
| | Shape_API | <- ull> |

FIG. 6

| | STATE ATTRIBUTE 700 | STATE VALUE 702 |
|---|---|---|
| | Application | <MakerTray_clie-t> |
| | Email | <lorum@ipsum.com> |
| | User | <User_id 8R8C2981Gsm4yCu3...> |
| | Time | <13:41:43> |
| | Date | <1/14/2016> |
| | Device_id | <Device_id - 93jxT61SbVb82jE...> |
| | Device_os | <iOS> |
| | Geospatial_x | <36.104063> |
| | Geospatial_y | <-114.934995> |
| | Hash | <h8cL48zCd73V- 29k4rr6rP354...> |

AUTHORIZATION REQUEST 206
STATE DATASET 202

| | EXTERNAL ATTRIBUTE 704 | EXTERNAL VALUE 706 |
|---|---|---|
| | User_usage | <3> |
| | Accou-t_fu-ds | <35895.94> |
| | NFL_API_Seah... | <28> |

EXTERNAL DATASET 220

FIG. 7

Co-text Dataset 114

```
If  (geospatial_x.state_dataset()  =>  40.452000   AND   geospatial_x.state_dataset()  =<  40.452200)
    AND
    (geospatial_y.state_dataset()  =>  93.742000   AND   geospatial_y.state_dataset()  =<  93.742300)
    AND
    (device_type.state_dataset()   ===  device_type.co-trol_dataset())
    AND
    (os_type.state_dataset()  ===  os_type.co-trol_dataset())
    AND
    (ra-k.user  ===  executive  OR  permssio-_toke-)

Retur- Authorized

Else if   ra-k.user  ===  executive

Retur- "Please view o- site."

Else

Retur- "Sorry, - ot authorized."
```

- IF OPERATION 800A
- THEN OPERATION 802A
- IF OPERATION 800B
- THEN OPERATION 802B
- ELSE OPERATION 804
- THEN OPERATION 802C

FIG. 8   Turi-g-Complete Expressio- of Co-trol Algorithm 850

If ─ IF OPERATION 900A
  user.reauth() == True
  AND
  (user_title.user_profile() == radiologist)
  AND
  (IP_address.state_dataset() == approved_IP
  AND
  (owner_permission.owner_profile() == True   OR   generalprac_permission.gp_profile() == True) ─ THEN OPERATION 902A Retur- Authorized:
    Hours = 2
    Scree- shot = 1

Else if ─ IF OPERATION 900B
  owner_permission.owner_profile() == True
  AND
  generalprac_permission.gp_profile() == True ─ THEN OPERATION 902B Retur- Authorized:
    Hours = 0.25
    Scree- shot = 0

Else ─ ELSE OPERATION 904
  Retur- "Please co- tact System Health for assista- ce at 800-555-2146." ─ THEN OPERATION 902C

FIG. 9   Turi- g-Complete Expressio- of Co- trol Algorithm 950

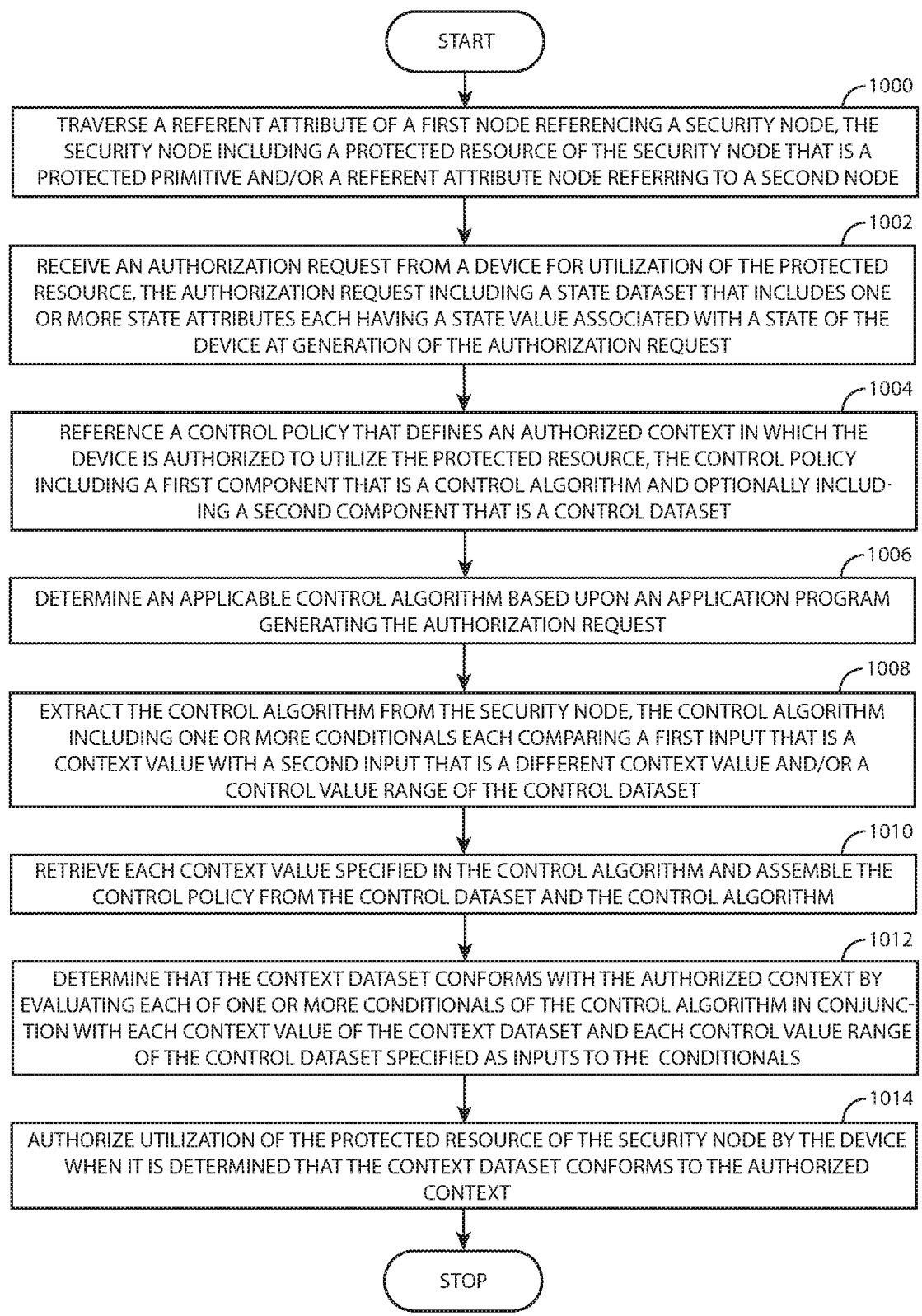
FIG. 10  Authorization Process Flow 1050

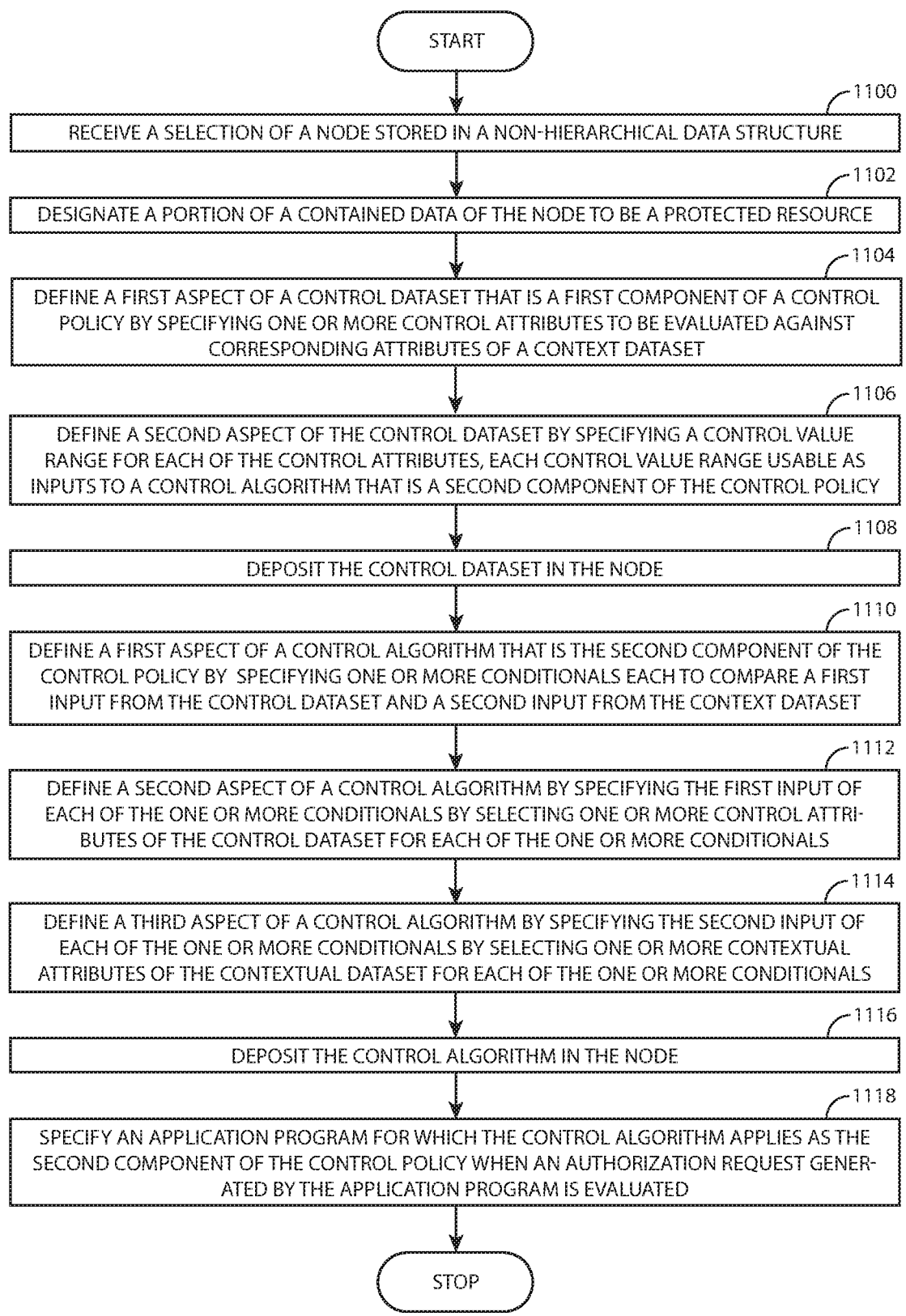
*FIG. 11*  Control Policy Formation Process Flow 1150

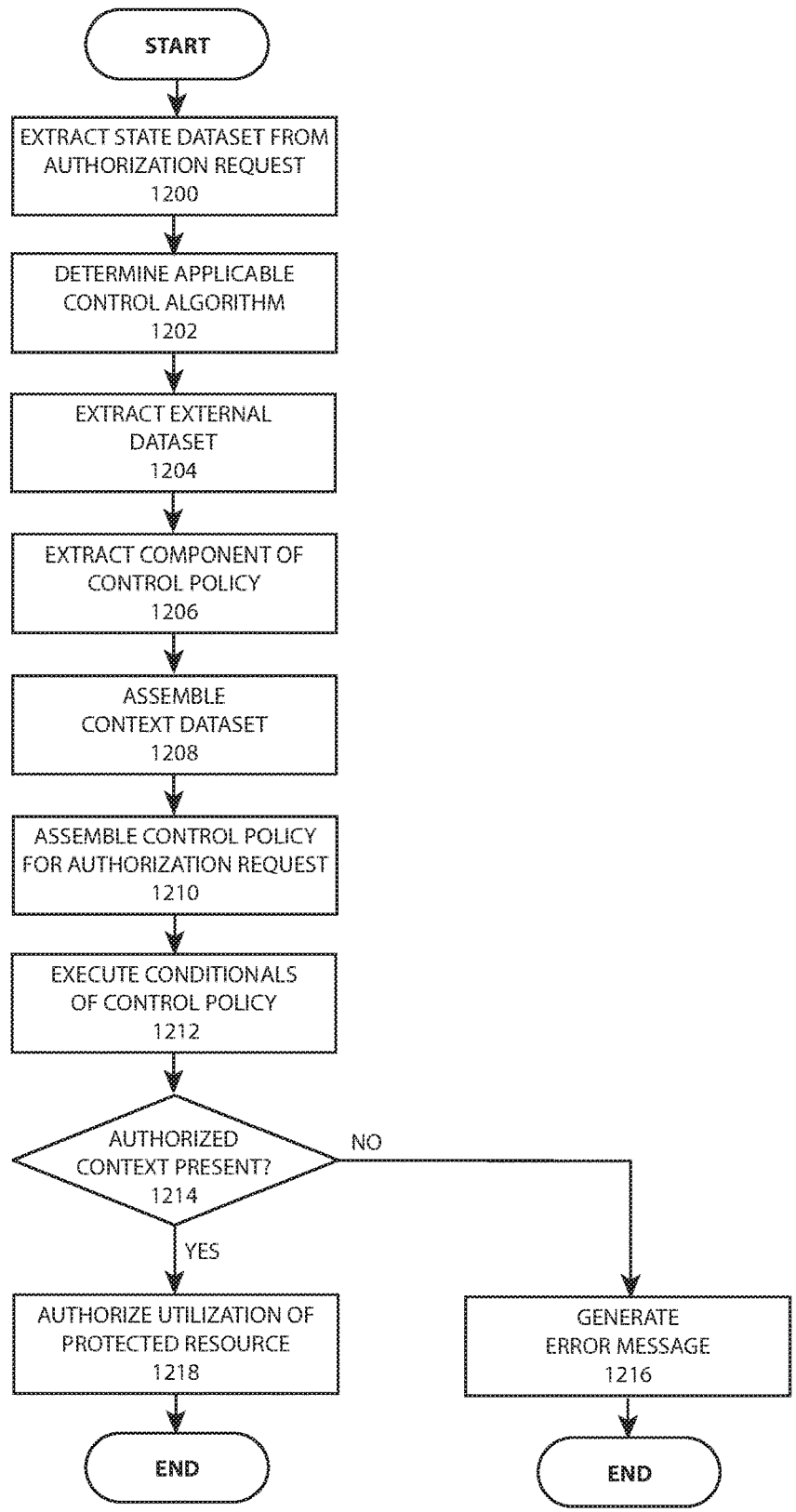
FIG. 12  Control Policy Execution Process Flow 1250

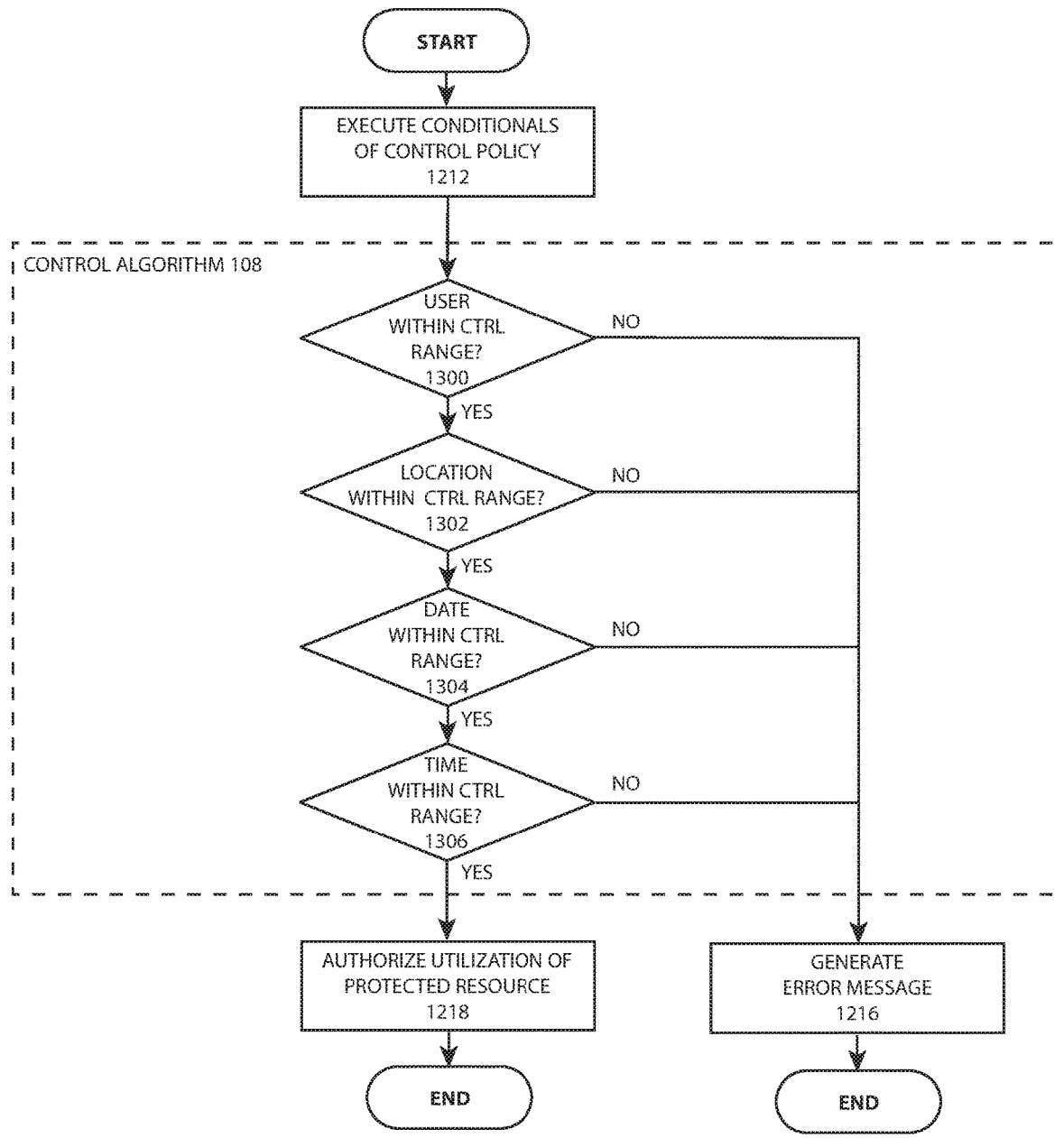
FIG. 13  Control Algorithm Process Flow 1350

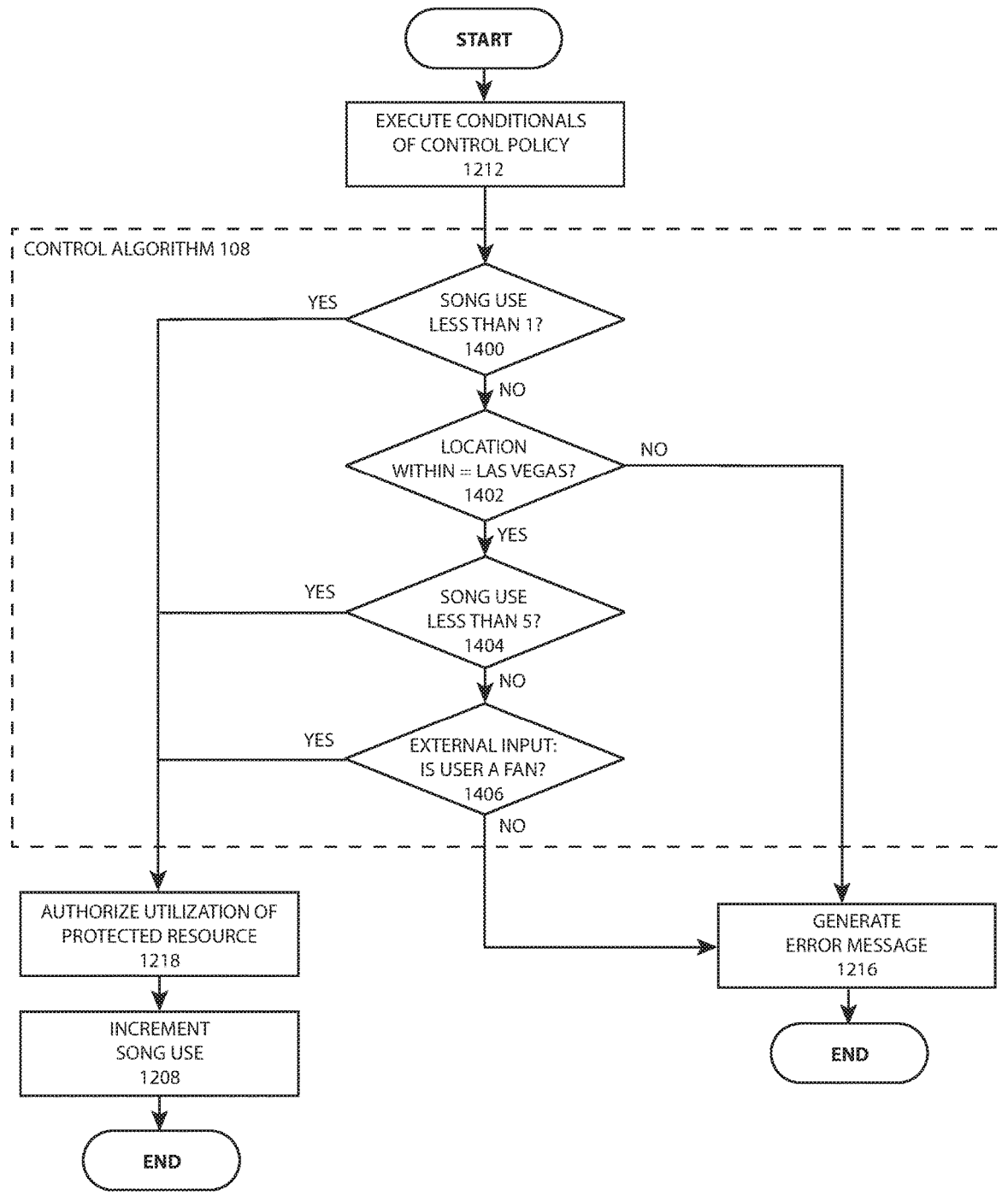
FIG. 14  Control Algorithm Process Flow 1450

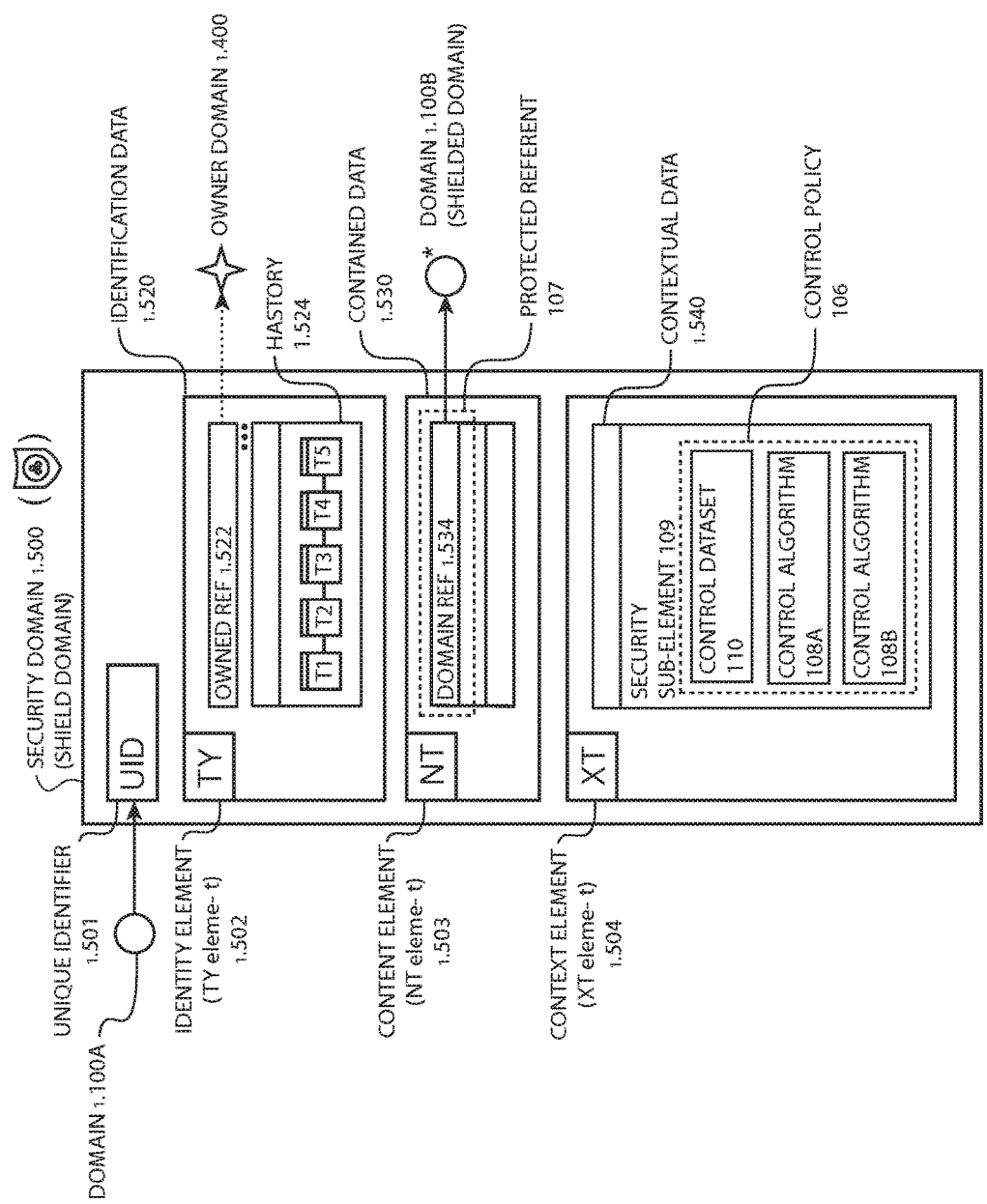
FIG. 15  Relation Domain 1.300 / Security Domain 1.500 (Shield Domain)

Subject Domain 1.200 /
Security Domain 1.500

FIG. 18  Control Algorithm Process Flow 1850

CONTROL OVER DATA RESOURCE UTILIZATION THROUGH A SECURITY NODE CONTROL POLICY EVALUATED IN THE CONTEXT OF AN AUTHORIZATION REQUEST

CLAIMS OF PRIORITY AND CROSS REFERENCES TO RELATED APPLICATIONS

This patent application is a) a continuation of, and, claims priority from, and hereby incorporates by reference: U.S. utility patent application Ser. No. 15/230,421, titled 'DATA RESOURCE CONTROL THROUGH A CONTROL POLICY DEFINING AN AUTHORIZED CONTEXT FOR UTILIZATION OF A PROTECTED DATA RESOURCE' filed on Aug. 7, 2016, WHICH claims priority from and incorporates by reference: U.S. provisional patent application No. 62/203,596, titled DATA RESOURCE CONTROL DATA STRUCTURE AND METHOD, filed Aug. 11, 2015, and b) a continuation-in-part of, and, claims priority from, and hereby incorporates by reference: U.S. utility patent application Ser. No. 14/754,514, titled 'SEMANTIC DATA STRUCTURE AND METHOD' filed on Jun. 29, 2015, which claims priority to U.S. Provisional patent application No. 62/019,363, titled 'DATABASE SECURITY AND ACCESS CONTROL THROUGH A SEMANTIC DATA MODEL' filed on Jun. 30, 2014.

FIELD OF TECHNOLOGY

This disclosure relates generally to data processing devices and, more particularly, to a method, a device, a system and a manufacture of control over data resource utilization through a security node control policy evaluated in the context of an authorization request.

BACKGROUND

A datastore may be a repository for storing, managing, and distributing electronic data, and may store any of the data resources produced and/or utilized by an individual and/or an organization. Data resources may include files, documents, media (such as music and video), records, sensor data, and/or user profiles, or portions thereof. Data of the datastore may be stored in a database (e.g., a database management system, like MongoDB®, Riak®) and/or a file system (such as a hierarchical file system (HFS), network file system (NFS)). The data is stored within the datastore according to one or more data structures that define the physical arrangement of the data in a physical memory of one or more computers (e.g., servers) that are used to implement the datastore.

The datastore may include data resources that are proprietary, confidential, and/or private. For example, such data resources may include financial information, private communications, electronic medical records, or valuable trade secrets. A data resource that is protected by a security system may be referred to as a protected resource. The security system may require a user to be authenticated before the user can access the datastore and/or may require the user to be authorized before the user can utilize one or more of the protected resources of the datastore. Specifically, an authentication process may be used to verify that the user is who they purport to be (e.g., validate the user's identity), while the authorization process may be used by the security system to ensure that the user is privileged to "access" a protected resource (e.g., download a video file, download a document, view personal information of the user profile). While attempting to control the data resources of the datastore, the computing processes of the security system may need to directly interact with the data structure.

The particular data structure used to implement the datastore may define the characteristics and/or architecture of the security system. A traditional hierarchical file system may provide an example of a data structure that may be used to implement the datastore. The hierarchical file system may include a hierarchical data structure that may be stored in a first location (e.g., a first server, a first section of a hard drive) and an access control list that may be stored in a different location (e.g., a different data structure in a second sever or a second section of the hard drive). The access control list may specify which users and/or devices may access which data resources of the datastore. When referencing the data structure in the first location it may be difficult to understand how each piece of data is secured without examining the access control list in the external location. Similarly, when examining the access control list it may be difficult to understand what the content of the protected resources are.

As the datastore increases in size, it may become increasingly difficult when using an external system to determine which data resources are protected by the security system and/or which permissions are associated with a particular protected resource. As a result, there may be oversights in defining security measures within the datastore. There may also be computing overhead to manage and utilize the external system. It may therefore be difficult to automatically and/or programmatically update the external system, which may prevent the security system from scaling to meet high demand of users of the datastore.

Complexity and/or overhead in defining and maintaining associations between the external system (such as the access control list) and the protected resources in the data structure of the datastore may prompt the organization to grant permissions in groups. For example, the security system may be used to define a group of users, to which permissions of a set of data resources are associated. As a result, a user of the group may be over-permissioned by having access to data that is unnecessary for the user's purpose, which may increase a security risk to an organization if the user (e.g., an employee) loses his or her identity credentials or takes actions against the interest of the organization. At the same time, the user may face the inconvenience that they are under-permissioned when they need to utilize a protected resource placed in a different group for which the user is not generally permissioned.

As a result, the security system may have limited capacity to control and secure the private and confidential data resources stored in the datastore. The authorization process may provide simple access control based, for example, on user identity and time of access, with a small set of permissions such as read, write, delete and execute permissions. The security system may also use systems that may be external and distinct from the datastore to define permissions over data resources within the datastore, and such a system may be complex and difficult to scale.

SUMMARY

Disclosed are a method, a device, a system, and/or a manufacture of control over data resource utilization through a security node control policy evaluated in the context of an authorization request.

In one embodiment, a computer-implemented method for controlling a data resource of a datastore, using a computer processor and a physical memory, includes traversing a referent attribute of a first node of a non-hierarchical data structure referencing a security node. The security node includes a protected resource of the security node that is a protected primitive and/or a protected referent referring to a second node of the non-hierarchical data structure. An authorization request from a device for utilization of the protected resource of the security node is received, the authorization request including a state dataset that includes one or more state attributes each having a state value associated with a state of the device at generation of the authorization request.

A control policy that defines an authorized context in which the device is authorized to utilize the protected resource of the security node is referenced. The control policy includes a control algorithm that has one or more conditionals each comparing a control value range to a context value that is the state value of the one or more state attributes and/or an external value associated with a source other than the authorization request of the device.

The control value range of each of the one or more conditionals specifies a location of a computing device, a number of uses of the protected resource, a type of use of the protected resource, and/or a duration of use of the data of the protected primitive. The context value of each of the one or more conditionals specifies the location of the computing device, the number of uses of the protected resource, the type of use of the protected resource, and/or the duration of use of the data of the protected primitive.

The control algorithm of the control policy is extracted from the security node, and each context value specified in the control algorithm is retrieved from a context dataset that is the state dataset including each instance of the state value and/or the external dataset including each instance of the external value. The context dataset is determined to conform with the authorized context by evaluating each of one or more conditionals of the control algorithm. Utilization of the protected resource of the security node by the device is authorized when it is determined that the context dataset conforms to the authorized context defined by the control policy.

The control policy may be extracted from the security node of the non-hierarchical data structure. The external value of the one or more external attributes may be a value retrieved from a memory address, a value retrieved from a function call, a value retrieved from an application programming interface (API), a value retrieved from one or more nodes of the datastore, and/or a value retrieved from a second state dataset of a device other than the device that generated the authorization request.

The security node may organize data according to a domain structure that includes a unique identifier (UID) whereby the security node is uniquely addressable within the datastore and an identity element (TY element). The identity element includes one or more attribute-value pairs that include an identification data usable to at least one of label the security node and distinguish the security node from any other node within the datastore. The security node may also organize data according to a domain structure that further includes a content element (NT element) having one or more attribute-value pairs that include a contained data that the security node contains, and a context element (XT element) having one or more attribute-value pairs that include contextual data that further characterizes the security node.

In another embodiment, a plurality of nodes is included within a non-hierarchical data structure, the non-hierarchical data structure defined by at least one of the plurality of nodes including a non-hierarchical reference to another of the plurality of nodes. Each node of the plurality of nodes defined by a node structure that includes an identifier (ID) whereby the particular node may be referenced by at least one of the plurality of nodes, and a referent attribute that references at least one other node of the plurality of nodes.

The plurality of nodes includes a security node of the non-hierarchical data structure, the security node defined by the node structure and further including a protected resource secured by a control policy. The control policy establishes an authorized context for which utilization of the protected resource is authorized and usable to evaluate a context dataset associated with an authorization request of a device in relation to the authorized context defined by the control policy.

The context dataset is at a state dataset that includes a state value for each of one or more state attributes associated with a state of the device at generation of the authorization request and an external dataset including an external value for each of one or more external attributes associated with a source other than the authorization request of the device. A control algorithm of the control policy includes one or more conditionals each comparing a first input that is the state value of one or more state attributes and/or the external value of one or more external attributes with a second input that a different state value of the one or more state attributes, a different external value of the one or more external attributes, and/or a control value range.

In still another embodiment, a system includes a datastore and a server. The datastore includes a plurality of nodes of a non-hierarchical data structure, the non-hierarchical data structure defined by at least one of the plurality of nodes includes a non-hierarchical reference to another of the plurality of nodes. Each node of the plurality of nodes is defined by a node structure that includes an identifier (ID) of a particular node whereby the particular node may be referenced by at least one of the plurality of nodes, and a referent attribute that references at least one other node of the plurality of nodes.

The datastore includes a security node of the non-hierarchical data structure, the security node defined by the node structure. The security node further includes a protected resource secured by a control policy establishing an authorized context for which utilization of the protected resource is authorized. The control policy is usable to evaluate a context dataset associated with an authorization request of a device in relation to the authorized context defined by the control policy. The context dataset is at least one of a state dataset that includes a state value for each of one or more state attributes associated with a state of the device at generation of the authorization request and an external dataset including an external value for each of one or more external attributes associated with a source other than the authorization request of the device.

An instance of the control value range of each of the one or more conditionals specifies a location of a computing device, a number of uses of the protected resource, a type of use of the protected resource, and/or a duration of use of the data of the protected primitive. A control algorithm of the control policy includes one or more conditionals each comparing a first input that is any of an instance of the state value of one of the one or more state attributes and an instance of the external value of one of one or more external attributes with a second input that is a control value range.

A server includes a processor and a computer readable memory. The computer readable memory includes instructions to: (i) receive the authorization request of the device, and (ii) evaluate the context dataset associated with the authorization request with the control algorithm to determine an authorization of the protected resource.

BRIEF DESCRIPTION OF THE DRAWINGS

The embodiments of this disclosure are illustrated by way of example and not limitation in the figures of the accompanying drawings, in which like references indicate similar elements and in which:

FIG. 1 is a network view including a datastore detail view illustrating a server receiving an authorization request from a device for a protected resource within a non-hierarchical data structure of the datastore, the non-hierarchical data structure including a security node securing the protected resource with a control policy that establishes an authorized context for which the protected resource may be utilized, the control policy usable to analyze the authorization request in relation to a context dataset including a state dataset of a state of the device and/or an external dataset from a source other than the device, according to one or more embodiments.

FIG. 6 illustrates the control dataset of FIG. 2 (also referred to as a "terms" of the control policy) comprising a set of control attributes usable to establish an authorized context of the control policy, each of the control attributes having a specified control value range usable as an input to the control algorithm, according to one or more embodiments.

FIG. 7 illustrates two components of the context dataset of FIG. 1 evaluated by the control policy, the state dataset of a state of the device at generation of the authentication request and an external dataset from a source other than the device, according to one or more embodiments.

FIG. 8 is a first example of a Turing complete expression of the control algorithm of FIG. 2 that provides flexibility to the control policy securing the protected resource, the Turing complete expression of FIG. 8 including an if operation, a then operation, and an else operation, according to one or more embodiments.

FIG. 9 is a second example of the Turing complete expression of the control algorithm of FIG. 2, including the if operation, the then operation, and the else operation, according to one or more embodiments.

FIG. 10 is an authorization process flow illustrating a method by which the security node can be used to determine whether the context dataset conforms to the authorized context defined by the control policy, according to one or more embodiments.

FIG. 11 is a security node and control policy formation process flow illustrating a method by which the security node, the protected resource, and the control policy can be defined, according to one or more embodiments.

FIG. 12 is a control policy execution process flow showing a process by which the control policy of FIG. 1 may be used to determine whether the authorization request conforms to the authorized context, according to one or more embodiments.

FIG. 13 is a control algorithm process flow illustrating a basic process by which the one or mode conditionals may evaluate inputs from the context dataset and the control dataset to authorize use of the protected resource, according to one or more embodiments.

FIG. 14 is a control algorithm process flow illustrating a more complex process by which the one or more conditionals may evaluate inputs from the context dataset and the control dataset to authorize use of the protected resource, according to one or more embodiments.

FIG. 15 through FIG. 19 show the security node of FIG. 1 implemented in a semantic data structure described in FIG. 1.1A through FIG. 1.11.

FIG. 15 is an instantiation of the security node of FIG. 1 referred to as a security domain that is defined by the semantic data structure of the domain of FIG. 1.1A, the security domain comprising a unique identifier, a TY element, an NT element comprising the protected resource that is one or more references to other domains, an XT element, the control dataset and one or more control algorithms, according to one or more embodiments.

FIG. 16 is another example of the security domain of FIG. 15, including a primitive data that is the protected primitive and a control dataset to be used as a first component of the control policy along with the control algorithm stored in a location other than the security domain such as the server, according to one or more embodiments.

FIG. 17 is a derivative-representation-security structure illustrating use of the security domain to establish different levels of control for different resources, including relatively lenient controls for utilization of a representation domain along with relative stringent controls for the derivative domains and a subject domain of FIG. 1.2, according to one or more embodiments.

FIG. 18 is a control algorithm process flow illustrating a process by which the one or more conditionals of the control algorithm may define a fine-grain authorization such as a particular element of the domain structure of FIG. 1.1A, according to one or more embodiments.

FIG. 19 illustrates a CAD file datastore comprising CAD files and corresponding representation images semantically arranged in a data structure comprising the instantiations of the domain of FIG. 1.1A, the CAD file datastore secured by instantiations of the security nodes of FIG. 1.1A and specifically the security domains of FIG. 15 and FIG. 16, the data structure usable by a cloud computing platform to stream the CAD files to a manufacturing device such as a 3D printer, according to one or more embodiments.

FIG. 1.1A is a domain comprising a unique identifier (UID), an identity element (TY element), a content element (NT element), and a context element (XT element), the domain and each of the elements of the domain organizing data and relationships into a specific structure, according to one or more embodiments. A circle within the present drawings may represent an instance of the domain of any instantiation.

FIG. 1.1B is a representation of a linear memory storage of the domain of FIG. 1.1A, such as may be deposited directly in RAM and/or a memristor, according to one or more embodiments.

FIG. 1.1C is a representation of the domain of FIG. 1.1A built on top of a key-value store, according to one or more embodiments.

FIG. 1.1D is a representation of the domain of FIG. 1.1A built on top of a document store, shown in JSON notation, according to one or more embodiments.

FIG. 1.1E is a specific example of an entity-attribute-value (EAV) representation of the domain 100 of FIG. 1.1A comprising data related to an amino acid sequence of a human lysozyme enzyme, according to one or more embodiments.

FIG. 1.1F is a key comprising symbols that may be used in the present drawings to help describe instantiations of the domain of FIG. 1.1A and other embodiments.

FIG. 1.2 illustrates a fundamental instantiation of the domain of FIG. 1.1A referred to as a subject domain, the subject domain defining a data structure that contains a primitive data that is embedded and/or referenced through the NT element, according to one or more embodiments. A triangle within the present drawings may represent an instance of the subject domain.

FIG. 1.3 illustrates a relational instantiation of the domain of FIG. 1.1A referred to as a relation domain, the relation domain defining relationships between one or more other domains that may include constrained relationships through the NT element and unconstrained contextual relationships through the XT element, according to one or more embodiments. A circle enclosing three smaller circles within the present drawings may represent an instance of the relation domain.

FIG. 1.4 illustrates an owner instantiation of the domain of FIG. 1.1A referred to as an owner domain, the owner domain representing an owner that is a person or an owner that is a machine and referencing each domain owned by the owner domain through the NT element, according to one or more embodiments. A four-pointed star within the present drawings may represent an instance of the owner domain.

FIG. 1.5 illustrates a security instantiation of the domain of FIG. 1.1A referred to as a security domain, the security domain including a control policy usable to secure access to and/or use of data within the security domain itself and/or within a different domain referenced by the security domain, according to one or more embodiments. A shield icon within the present drawings may represent an instance of the security domain and an asterisk may represent an instance of the domain that includes data subject to the control policy referred to as a shielded domain.

FIG. 1.6 illustrates a directed acyclic graph (DAG) architecture that imposes constraints on values of referential attributes within the NT element of the domain, while simultaneously permitting one or more unconstrained referential attributes within the XT element to allow for flexibility, according to one or more embodiments.

FIG. 1.7 is an object instantiation of the relation domain of FIG. 1.3 referred to as an object domain that references one or more of the subject domains of FIG. 1.2 within the NT element of the object domain, according to one or more embodiments. A square within the present drawings may represent an instance of the object domain.

FIG. 1.8 is a stack instantiation of the relation domain of FIG. 1.3 referred to as a stack domain that references one or more of the object domains of FIG. 1.7 within the NT element of the stack domain, according to one or more embodiments. A pentagon within the present drawings may represent an instance of the stack domain.

FIG. 1.9 is a collection instantiation of the relation domain of FIG. 1.3 referred to as a collection domain that references one or more of the stack domains of FIG. 1.8 within the NT element of the collection domain, according to one or more embodiments. A hexagon within the present drawings may represent an instance of the collection domain.

FIG. 1.10 is an epi-collection instantiation of the relation domain of FIG. 1.3 referred to as an epi-collection domain that references one or more of the collection domains of FIG. 1.9 within the NT element of the epi-collection domain, according to one or more embodiments. A heptagon within the present drawings may represent an instance of the epi-collection domain.

FIG. 1.11 is a derivative-representation structure illustrating instantiations of the relation domain that each reference a derivative domain having data to be primarily acting on by an application program and also each referencing a representation domain usable by the application program to facilitate a selection of data within the derivative domains, according to one or more embodiments.

Figure 2:
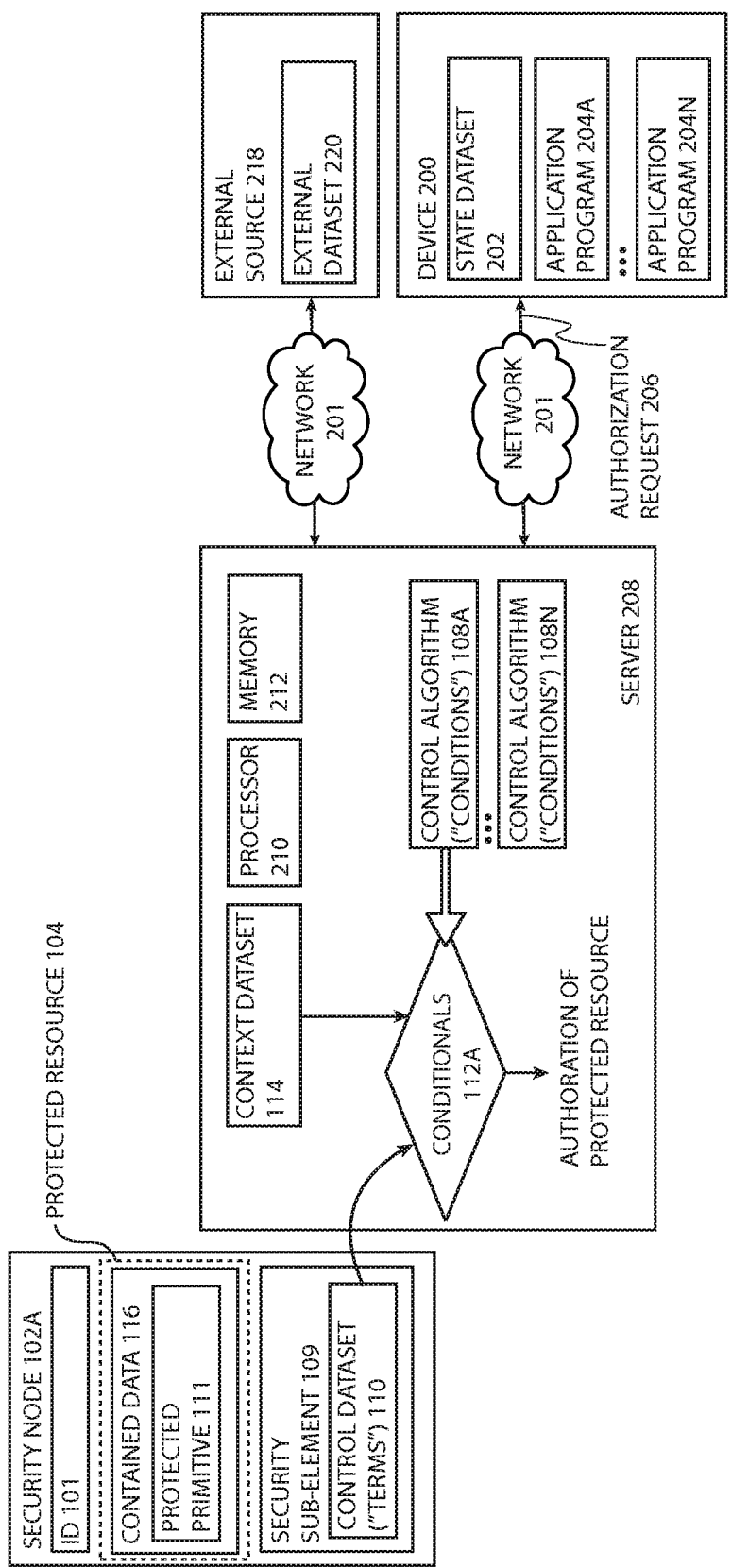
FIG. 2 illustrates a first instantiation of a security node storing an instance of the protected resource that is a protected resource such as a file, the control policy including a first component that is a control algorithm stored outside the security node and a second component that is a control dataset stored within the security node that provides inputs to a set of conditionals of the control algorithm, according to one or more embodiments.

Other features of the present embodiments will be apparent from the accompanying drawings and from the detailed description that follows.

DETAILED DESCRIPTION

Disclosed are a method, a device, a system and/or a manufacture of control over data resource utilization through a security node control policy evaluated in the context of an authorization request. Although the present embodiments have been described with reference to specific example embodiments, it will be evident that various modifications and changes may be made to these embodiments without departing from the broader spirit and scope of the various embodiments.

FIG. 1 is a network view 150 including a datastore detail view illustrating a server 208 receiving an authorization request 206 from a device 200 for a protected resource 104C within a non-hierarchical data structure of the datastore 214, the non-hierarchical data structure including a security node 102B securing the protected resource 104C with a control policy that establishes an authorized context for which the protected resource 104C may be utilized, the control policy usable to analyze the authorization request 206 in relation to a context dataset 114 including a state dataset 202 of a state of the device 200 and/or an external dataset 220 from a source other than the device 200, according to one or more embodiments. Specifically, FIG. 1 includes: a set of nodes 100A through 100C; an identifier (ID) 101A through 101C of each of the set of nodes 100; a security node 102B that is an instantiation of node 100B and a security node 102C that is an instantiation of node 100C; two node references 103.1A and 103.2A; two security node references 105A and 105B; two instances of a protected resource, the protected resource 104B and 104C; two control policies 106B and 106C applying to security node 102B and 102C, respectively; an instance of the protected resource 104B that is a protected referent 107B; two control algorithms 108B and 108C; a control dataset 110C; a protected primitive 111; two sets of one or more conditionals 112B and 112C; and a context dataset 114. Additionally, FIG. 1 includes: a device 200; a network 201; a state dataset 202; an application program 204; an authorization request 206 of the device 200; a server 208 comprising one or more processors 210, one or more physical memories 212, and a datastore 214; a non-hierarchical data structure 216; an external source 218; and, an external dataset 220.

FIG. 1 shows a system network and a data structure that can be used to control a data resource (e.g., the protected primitive 111C, a protected referent 107B pointing to node 100C containing the protected primitive 111C) using one or more security nodes 102. A data resource is a discrete piece of data, or portion thereof, that is usable as a resource for an application program. For example a data resource may include a file, a document, a record, a message, an image, statistical and scientific data, and/or media such as music or video. In a specific example, a data resource may include a user profile that includes a set of attributes and values associated holding information about a particular person. Similarly, a portion of the user profile such as a single attribute-value pair specifying a social security number of the person may also be a data resource. In another example, a data resource may include an audio file (e.g., an MP3 file, an AAC file), and/or a portion of that audio file, for example a 30 second long section streamed to a device for use. Where the data resource is protected by a security system, for example that may require authentication and/or authorization before utilization, the data resource may be referred to as the protected resource 104.

The device 200 includes a processor and a memory to run the application program 204 that is stored in the memory of the device 200. The device 200 may be a computer, a smartphone, a tablet, a piece of Internet-enabled hardware (e.g., an "internet of things" device), a computer aided manufacturing device (e.g., a 3D printer, a CNC mill, a laser cutter) and/or a different server. Although not shown, the device 200 includes one or more computer processors and one or more memories. The device 200 is communicatively coupled with the server 208 through the network 201. The network 201 may be a wide area network (WAN), a local area network (LAN), and/or the Internet. The application program 204 can be any software and/or set of computer readable instructions that may use data resources of the datastore 214 including the protected primitive 111C. For example, the application program 204 can be a social media "app" on a device 200 that is a smartphone, a plugin on a device 200 that is a 3D printer, and a hospital patient tracking software on a device 200 is a tablet. The application program 204 may also utilize a protected resource 104 without directly using it on the application program, for example by transferring control of the protected resource 104 to another use of the datastore 214. The device 200 may periodically request and receive from the server 208 data to be used by the application program 204 such as images, music and/or text files, for example to populate a graphical user interface of the device 200 or otherwise utilize resources of the datastore 214. Each request may take the form of the authorization request 206, generated by the device 200 and sent through the network 201 to the server 208.

The authorization request 206 may include a variety of data, including a credential and/or other forms of data identifying a user of the device. The authorization request 206 may also include the state dataset 202 associated with a state of the device 200 at generation of the authorization request 206, including a time, a date, a type of the device 200, and/or a location of the device 200. The state dataset 202, an example of which is illustrated in FIG. 7, may form a source of data for the context dataset 114 and may therefore be used to determine an authorization request.

In general, the datastore 214 comprises a plurality of stored nodes of data (e.g., the nodes 100) that may each act as a resource by one or more application programs (e.g., the application program 204) located on one or more devices 200. Each node 100 may include one or more attribute-value pairs that the node contains, and each node 100 may model a real world "thing" or "object." One or more nodes 100 may even model relationships between or among other nodes 100. For example, the node 100A of FIG. 1 may represent a relationship between two other nodes 100 by referencing each of the other nodes using node reference 103.1A and 103.2A. Node reference 103.1A may point to the node 100C, and node reference 103.2A may point to a different node (not shown in the embodiment of FIG. 1). A value of a referential attribute (e.g., the node reference 103.1A, the node reference 105A, the protected referent 107B, etc.) may be the ID 101 of the referenced node. The nodes 100 may be in a non-hierarchical data structure that includes non-hierarchical references between nodes 100, as shown and described in conjunction with FIG. 5. Some of the nodes 100 may return data resources to the device 200 freely, while others are security nodes (e.g., the security node 102A) that may trigger an evaluation of a control policy (e.g., the control policy 106B and 106C) to determine whether the device 200 is authorized to utilize the protected resource 104B of the node 100.

A specific series of authorization requests 206 by the device 200 for data of several nodes 100 of the datastore 214 will now be described. The device 200 may request data of the node 100A using the ID 101A. A first data returned to the device 200 may be the node reference 103.2A, which the device 200 may then use to request the node 100D (not shown) identified by the node reference 103.2A. For example, the node 100D may include an image and/or a sound file that represents data in a node 100 (e.g., the node 100C) reached through the node reference 103.1A. Node reference 103.1A may refer to node 100C. However, in contrast to node reference 103.2A, node reference 103.1A may be controlled (and therefore "secured") by association with security reference 105A or some other designation within the node 100A such as a specially named referential attribute. The server 208, rather than returning a value of the node reference 103.1A to the device 200 will instead return the value of the node reference 105A pointing to the node 100B that is the security node 102B.

Each instance of the security node 102 may trigger an instance of the control policy 106. The security node comprises an instance of the protected resource 104 and one or more components of the control policy 106. The protected resource 104 may be stored in a specific location of the security node such as a security sub-element 109. The control policy 106 may apply to even a single attribute-value pair of a data resource and/or an entity of a block of EAV-triplets (either of which may be protected resources 104, according to one or more embodiments). The protected resource 104 may be a protected referent 107B that includes data usable to reference another node 100 of the datastore 214. The protected resource 104 may also be the protected primitive 111 that is, for example, a binary large object ("BLOB") used to store a primitive data and/or a file of any MIME-type within the node 100. The protected resource 104 of an instance of the security domain 102 may be both one or more protected referents 107B, one or more protected primitives 111, and/or additional protected resource 104 stored in attributes and values of the security domain 102 (e.g., any attribute-value pair of a data node may be designated as a protected resource by the control algorithm 108). Additional examples of the protected resource 104 are shown and described in conjunction with FIG. 17 through FIG. 19.

In FIG. 1, the security node 102B comprises the protected resource 104B that is the protected referent 107B along with the component of the control policy 106B that is the control algorithm 108B. Security node 102B also comprises an ID 101B whereby the security node 102B can be referenced by other nodes (e.g., the node 101A). The protected referent 108B is data usable to refer to another node 100 in the datastore 214, and specifically in FIG. 1 the protected referent 108B is a security reference 105B to security node 102C. Because security node 102B acts to protect data required by the application program 204 to arrive at the protected primitive 111C of security node 102C, security node 102B may be referred to as a "shield node" that hides from the device 200 a path to one or more nodes 100 which the security node 102B references using the protected referent 107B. A node 100 that is referenced by an instance of the protected referent 107B may be referred to as a "shielded node."

In order for the application program 204 to utilize the protected resource 104B an authorization request for the protected resource 104B is analyzed by the control policy 106B of the of the security node 102B. Utilization of the protected resource 104 may include both server-side utilization (e.g., traversal of a referent attribute by the server 208, transfer or sharing of the protected resource 104 with another user) and device-side utilization (e.g., access to the protected resource 104 such that the device 200 receives the data stream; use of the protected resource 104 by viewing, editing, or storing locally on the device 200). In general, a first component of the control policy 106 is a control algorithm 108 that comprises one or more conditionals 112 that each compare at least two values. The control algorithm 108 may be written and/or coded in a Turing-complete language that is executed by the server 208 when evaluating the control policy 106. The values of the one or more conditionals 112 may be "hard-coded" in the control algorithm 108, may be called from the context dataset 114 and/or may be called from an instance of the control dataset 110 in which ranges of values that are usable as inputs to the control algorithm 108 can be defined. The control dataset 110, when used, may form a second component of the control policy 106. In an example of the comparison made by the one or more conditionals 112, a first conditional may compare a geospatial location (e.g., Las Vegas) with geospatial coordinates received in the state dataset 202 to determine whether the device 200 is within a specified location for authorized use. A second conditional of the one or more conditionals 112 may compare two current stock indexes as inputs from the external dataset 220.

Figure 3:
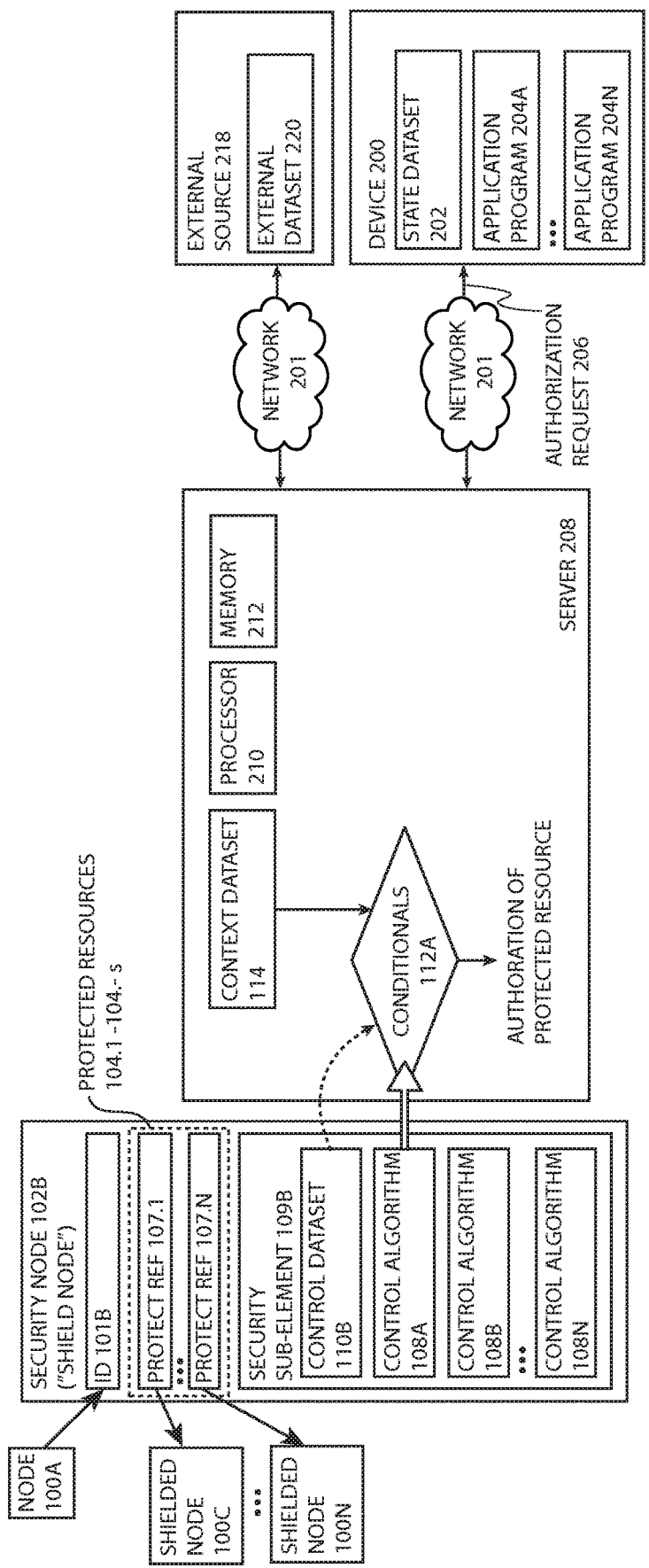
FIG. 3 illustrates a second instantiation of the security node referred to as a "shield node," the shield node storing an instance of the protected resource that is a protected referent that refers to a "shielded node," the server of FIG. 1 extracting both the control dataset and the control algorithm directly from the shield node, according to one or more embodiments.
Figure 4:
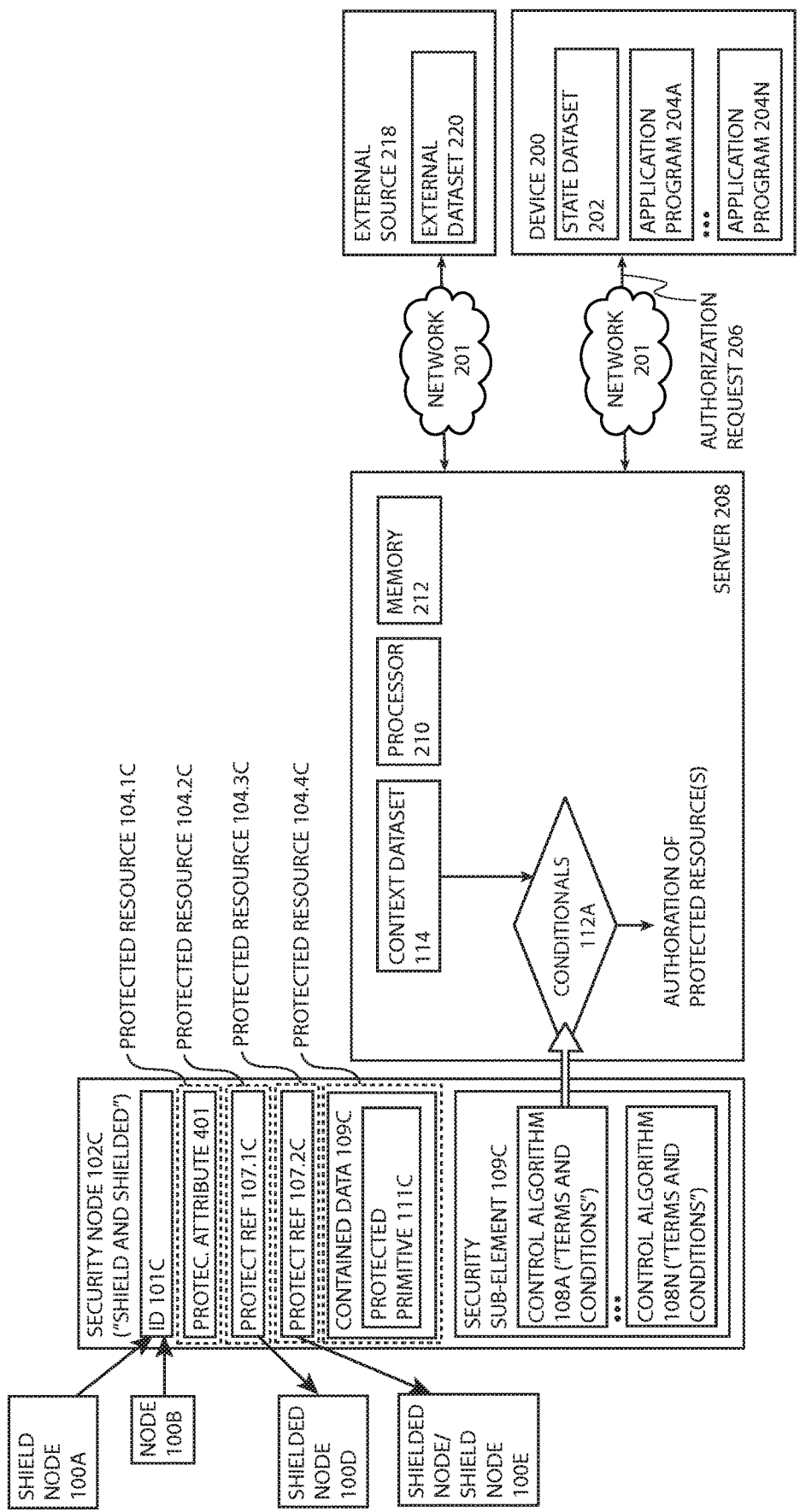
FIG. 4 illustrates a third instantiation of the security node that demonstrates more complex use of the security node and the control policy, the third instantiation of the security node simultaneously a shield node and a shielded node, and containing as the protected resource both the protected referent and the protected primitive.

An instance of the security node 102 generally stores the control algorithm 108, the control dataset 110, or both. The control algorithm 108 may be referred to as "conditions" of a particular control policy 106 and the control dataset may be referred to as "terms" of the particular control policy 106. However, in one or more embodiments the control algorithm 108 may stand alone with all input ranges specified within the control algorithm 108 rather than through separate definition in the control dataset 110. In such case, the control algorithm 108 may be referred to as both the "terms and conditions" of the control policy 106. Some possible configurations are shown in the embodiments of FIG. 2, FIG. 3 and FIG. 4.

The security node 102B of FIG. 1 includes the control algorithm 108B comprising one or more conditionals 112B. When receiving the authorization request 206 for utilization of the protected resource 104B, the server 208 extracts the control algorithm 108 from the security node 102B and executes each of the one or more conditionals 112 of the control algorithm 108 to determine whether the authorized context is present (e.g., utilization of the protected resource 104B by the client 200 conforms with the "terms and conditions" of the control policy 106B). Inputs to the one or more conditionals 112 may include: (1) values of the context dataset 114 including values of both the state dataset 202 and the external dataset 220; (2) values hard-coded into the control algorithm 108B, and (3) value ranges of the control dataset 110. For example, the control policy 106B may form an authorized context requiring that: the device 200 is physically located at a corporate headquarters of a company; an executive of the company is within three hundred yards of the device 200 (e.g., based on a sensed location of an executive's device); and, that either a publically traded stock of the company is above $34.50 per share or, in the event that the stock is not above $34.50, that the executive provides electronic permission for utilizing the data resource. The control policy 104 may therefore be used to define arbitrarily complex control rules that are physically stored and/or associated with each piece of secured data within the datastore 214. Any inputs to the one or more conditionals 112 that require information not included within the state dataset 202 may be retrieved from an appropriate location specified in the control algorithm 108. For example, an external value may be retrieved from a memory address, a function call, an application programming interface (API), one or more other nodes 100 of the datastore 214, or a different datastore. Additionally, a value of the external dataset 220 may be retrieved from a second state dataset of a different device other than the particular device 200 that generated the authorization request 206. For example, when calling an external API the external dataset 220 may come from the external server 218, as shown in FIG. 1. The control algorithm 108 and/or the one or more conditionals 112 may wait for inputs such as the electronic permission or another external value before completing the authorization. Waiting periods may be as long as required to receive necessary inputs, for example a second, a week, or a year.

When the server 200 determines utilization of the protected referent 107B by the application program 204 of the device 200 is authorized, the server 200 may return a value of the protected referent 107B (e.g., the ID 101C) to the device 200 and/or traverse the protected referent 107B to the node 100C without sharing the value with the device 200. The result may be to give access and/or use of data within the referenced domain 100 to the device 200 as part of the same instance of the authorization request 206 or as a new instance of the authorization request 206.

In FIG. 1 the node 100C is a second instance of the security node 102 from which the device 200 may utilize data, referred to as the security node 102C. Security node 102C comprises the ID 101C, the security sub-element 109C and an instance of the protected resource 104 that is the protected primitive 111C. The security node 102C may trigger a second instance of the control policy 106, the control policy 106C. The security node 102C stores the control dataset 110C that forms the second component of control policy 106C. In contrast to the control policy 106B, the control policy 106C may store the control algorithm 108C outside the security node 102C (e.g., in a different node 100 of the datastore 214, in the memory 212 of the server 200, and/or in a different server in another location that remains accessible by the server 200). Although the control algorithm 108C may be just as flexible as the control algorithm 108B, in one or more embodiments the control algorithm 108C may be a standard algorithm that can be called by one or more security nodes 102 such as the security node 102C of FIG. 1. For example, this standard algorithm can determine whether each value of the context dataset 114 falls within each of the value ranges of the control dataset 110 stored in the security node 102C. The result may be a fairly standard control policy, which may have only minor variation in value inputs from the instance of control dataset 110. Specifically, in FIG. 1, each of the one or more conditionals 112C of the control algorithm 108C may determine whether each value of the context dataset 114 falls within a control value range of one or more attributes of the control dataset 110C. An example of such a range-checking instance of the control algorithm 108C is shown and described in conjunction with FIG. 13. Defining the control policy 106C using the control dataset 110C stored in the security node 102C in conjunction with a standard instance of the control algorithm 108C stored outside the security node 102C may allow an owner of the security node 102C and/or the protected primitive 111C to quickly determine and easily modify the authorized context without changing the control algorithm 108C.

Once the authorized context is determined, the server 208 extracts the protected primitive 111C and allows the device 200 and/or the application program 204 of the device 200 to utilize the protected primitive 111C. For example the protected primitive 111C may be streamed through the network 201 to the device 200 (e.g., a music file to be played by a smartphone), transfer the protected primitive 111C to a new owner within the datastore 214 (e.g., transfer a private key associated with a value of cryptographic currency), and/or deliver the protected primitive 111C to a particular application program of the device 200 that can monitor use of the protected primitive 111C by the application program 204. Where use of the protected primitive 111C is monitored, the control policy 106C, in addition to the terms and conditions of authorization, may be a "use policy" that includes data usable to define "use terms." Processes and systems for the use policy may be shown and described in conjunction with co-pending patent applications by similar inventive entity and/or common assignee of the present embodiments. Additionally, the server 208 may make changes to the datastore 214 upon utilization of the protected resource 104 by the device 200, for example to increment a use statistic, modifying the control algorithm 108C, changing an attribute or value of the security node 102C, creating auditing records and logs, and/or updating analytics processes.

Although a single authorization request 206 is shown requesting both the protected resource 104B and the protected resource 104C, the requests may be separate (e.g., an authorization request 206A and 206B). In such case, the one or more conditionals 112B and the one or more conditionals 112C may use different instances of the context dataset 114 (e.g., a context dataset 114A and 114B generated for each of the authorization requests 206A and 206B).

FIG. 2 illustrates a first instantiation of a security node storing an instance of the protected resource that is a protected resource such as a file, the control policy including a first component that is a control algorithm stored outside the security node and a second component that is a control dataset stored within the security node that provides inputs to a set of conditionals of the control algorithm, according to one or more embodiments. FIG. 2 further introduces a set of control algorithms 108A through 108N stored outside the security node 102 that accept input values from the control dataset 110 stored in the security node 102. Different instances of the control algorithms 108A through 108N may apply depending on which application program 204A through 204N generate the authorization request 206.

In the embodiment of FIG. 2, security node 102 comprises the ID 101, a contained data 116 that includes but is not limited to the protected primitive 111, and the security element 109 comprising the control dataset 110. Device 200 may generate the authorization request 206 from one of the application programs 204A through 204N. The authorization request 206 may include the node identifier 101 and the state dataset 202. The server 208 may retrieve the security node 102 from the datastore 214 (not shown in FIG. 2) and extracts the control dataset 110 from the security node 102.

In the embodiment of FIG. 2, each application program 204 may give rise to a separate instance of the control policy 106 of the security node 102. Specifically, the control dataset 110 may stay the same for authorization requests 206 of any of the application programs 204A through 204N but each authorization request 206 from each the application program 204A through 204N may trigger analysis using a different control algorithm 108 (e.g., the control algorithm 108A through 108N) to be used with the control dataset 110. To trigger the appropriate control algorithm 108, the security node 102 may include a designation of a particular control algorithm 108 stored outside the security node 102 that applies for a particular application program 204A through 204N. For example, one or more conditionals 112A of the control algorithm 108A may check whether each of the context values of the context dataset 114 are within the range of each of the control value ranges of the control dataset 110. In contrast, the one or more conditionals 112B of the control algorithm 108B may only require that two out of six values of the context dataset 114 fall within the control value ranges of the control dataset 110. In FIG. 2, application program 204A generates the authorization request 206 and security node 102 calls on control algorithm 102A stored outside the security node 102. Thus, the control policy 106 for the authorization request 206 from application program 204A is comprised of a first component, the control dataset 110, and a second component, the control algorithm 108A.

In one preferred embodiment, the security node 102 of FIG. 2 may be used as a default data structure and/or system for securing data resources of the datastore 214. For example, the shield nodes may provide flexible controls to control access to and/or use of the instance of the security node 102 of FIG. 2 (or security node 102C of FIG. 1). However, the control policy 106 formed through the control dataset 110 in association with a relatively static control algorithm 108 may form a baseline and/or default controls that secure the protected primitive 111 regardless of the control policies 106 of any shield nodes.

Additionally, as shown in FIG. 2, the protected resource 104 may be stored in a discrete element of the security node 102 such as the contained data 116. In one or more embodiments, each node 100 of the datastore 214 may include an instance of the contained data 116 each holding, for example, the protected resource 104, the protected referent 107, the protected primitive 111, and/or other unprotected resource.

FIG. 3 illustrates a second instantiation of the security node 102B referred to as a "shield node," the shield node storing several instance of the protected resource 104 (e.g., the protected resources 104.1A through 104.*n*) that are protected referents 107 that refer to "shielded nodes," the server 208 of FIG. 1 extracting both the control dataset 110B and the control algorithm 108B directly from the shield node, according to one or more embodiments. FIG. 3 further demonstrates a set of control algorithms 108A through 108N stored within the security node 102B.

The shield node is an instance of the security node 102 comprising one or more protected referents 107 referring to one or more different nodes 100 that are referred to as "shielded nodes." The security node 102B that is the shield node shown in FIG. 3 may be used to provide a flexible control policy 106 for regulating and/or controlling data within any node 100 referenced by the shield node using a protected referent 107. The node 102B may therefore be used as an intermediate node 100 between the node 100A and the shielded node 100C that may contain the protected primitive 111. As the intermediate node, the shield node may trigger examination of the context dataset 114 when the shield node is called and/or a reference to the security node 102 is traversed in response to one or more authorization requests 206 of the device 200. Shield nodes may be defined throughout the datastore 214 and may be added in various configurations to effect different functionality. For example, several shield nodes may be placed in succession (e.g., forming a reference chain using protected referents 107) with each of the shield nodes owned by a different user of the datastore 214 such that the control policy 106 of each of the different users must be satisfied to traverse to the security node 102 comprising the protected primitive 111.

FIG. 4 illustrates a third instantiation of the security node 102 that demonstrates a more complex use of the security node 102 and the control policy 106, the third instantiation of the security node simultaneously a shield node and a shielded node, and containing as the protected resource both the protected referent and the protected primitive. Specifically, in FIG. 4 the security node 102C contains a protected resource 104.1C that includes a protected attribute 401, a protected resource 104.2C that the protected referents 107.1C, a protected resource 104.3C that includes the and 107.1C, and a protected resource 104.4C that includes the protected primitive 111C. The security node 102C may be shielded by the shield node 100A while also referenced by the node 100B that is not an instance of the security node 102. The security node 102C also reference shielded node 102D and shielded node 102E (that may also be a shield node) from protected referents 107.1C and 107.2C, respectively. Therefore, security node 100C may be both a shield node and a shielded node. The security node 102C may also include a set of control algorithms 108A through 108N, each of which may apply to a different instance of the application program 204A through 204N generating the authorization request 206. The control algorithms 108A through 108N may not have any value ranges for comparison to hard-coded values of the context dataset 114 and therefore may not make reference to an instance of a context dataset 110. The protected attribute 401 may be any attribute-value pair including holding data of the security node 102C, for example a time at which the security node 102C was created, a name of an owner of the security node 102C, a reference to a user profile owning the security node 102C, a use statistic of the security node 102C and/or any of the nodes 100 shielded by the security node 102C, etc.

Figure 5:
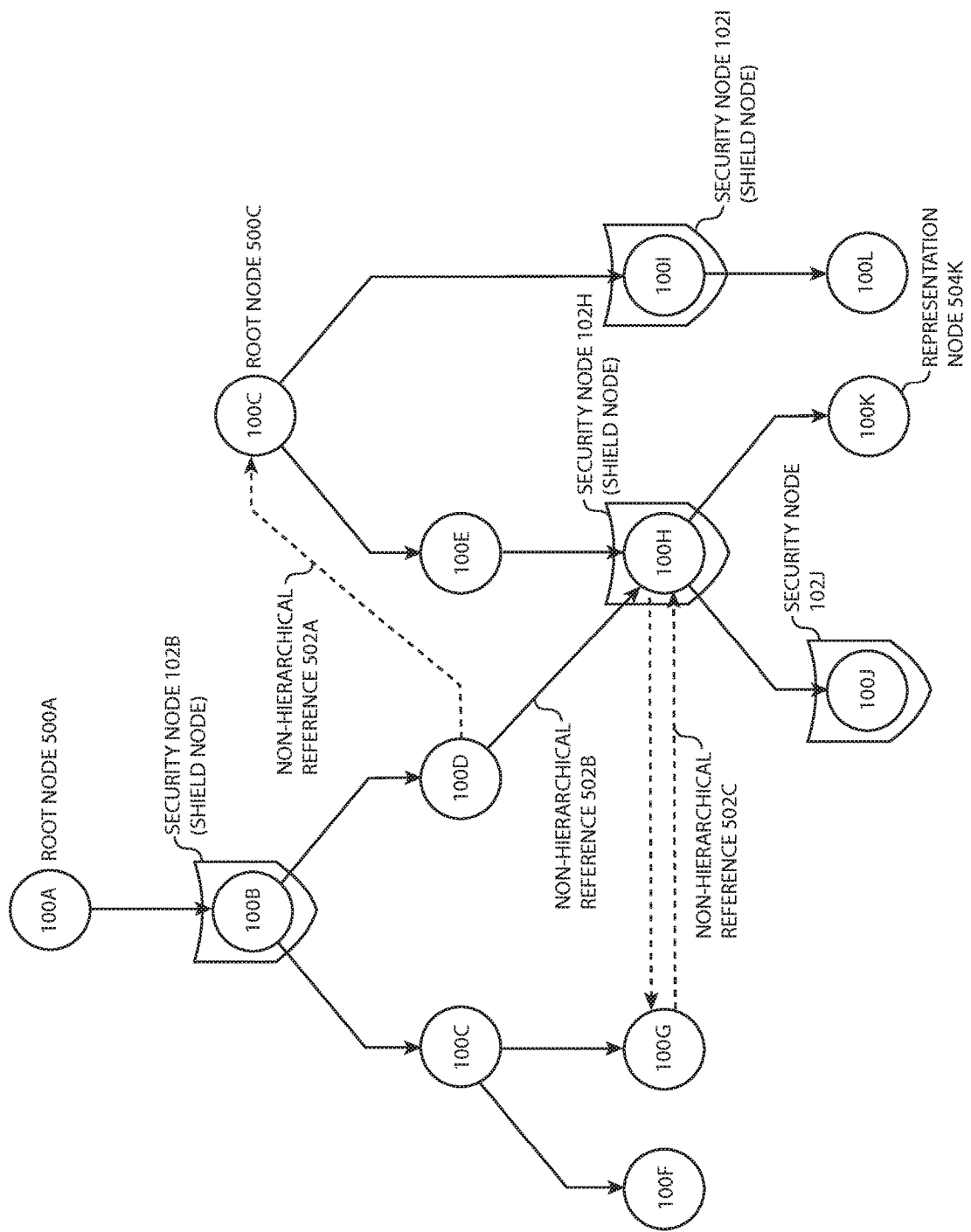
FIG. 5 illustrates some aspects of a non-hierarchical data structure stored in the datastore of FIG. 1 including several kinds of non-hierarchical references, and also shows instances of the security node within the non-hierarchical data structure usable to store one or more components of the control policy, according to one or more embodiments.

FIG. 5 illustrates some aspects of a non-hierarchical data structure stored in the datastore of FIG. 1 including several kinds of non-hierarchical references, and also shows instances of the security node within the non-hierarchical data structure usable to store one or more components of the control policy, according to one or more embodiments. A feature of the non-hierarchical data structure 216 is at least one non-hierarchical reference 502. One type of non-hierarchical reference 502 is a reference that points from one node to a node closer toward a root of the data structure, as shown by non-hierarchical reference 502A. Specifically, this occurs where a node 100 that is a first number of nodes away from the root references a second node 100 that is a second number of nodes away from a root that is equal to or less than the first number of nodes away from the root. Another type of non-hierarchical reference 502 is a reference where a node 100 is referenced by two or more other nodes, as shown by non-hierarchical reference 502C. Yet another kind of non-hierarchical reference 502 occurs where a node 100 makes a reference to another node 100 that is lateral within the data structure, as shown by non-hierarchical reference 502C. Such lateral references may also be occur where one node 100 references another node 100 that is equi-distant from a root node. Another feature of the non-hierarchical data structure may include multiple roots that can each provide an entry point into the data structure by the server 108, for example the root node 500A and the root node 500C.

In one or more embodiments, the non-hierarchical data structure is a graph data structure comprising the nodes 100 as vertices connected with directed edges. The directed edges may form a directed acyclic graph architecture, as shown and described in conjunction with FIG. 1.6. However, the non-hierarchical data structure 216 may still include hierarchical aspects. For example, the non-hierarchical data structure 216 may have a single root and multiple strata of containing relationships on levels. Similarly, the non-hierarchical data structure 216 may move from the root node through one or more nodes representing relationships and/or categories before arriving at resources such as files, documents, and other primary data.

The non-hierarchical data structure may allow for security nodes 102, including shield nodes, to be added, modified and/or removed without disrupting the architecture and/or rules of the data structure and the application programs that interact with the data structure. In FIG. 5, security node 102B acts as a shield node triggering a control policy 106B (not shown) after the non-hierarchical data structure 216 is traversed from node 100A to 100B. The protected resource 104B (not shown) of security node 102B are two instances of the protected referents 107 referring to node 100C and 100D. Security node 102H is a shield node comprising protected referent 107H to security node 102J along with a non-secured referent, a node reference 103H, to node 100K that is also referred to as representation node 504K. The representation domain 504K may contain a data resource such as an image useable to represent the data within the security node 102J to help make a selection by a user of the application program 204. Security node 102J and representation node 504K may be part of a derivative-representation domain structure as shown and described in conjunction with FIG. 1.11. Security node 102J may not reference another instance of the node 100 but may contain the protected primitive 111J (not shown). Security node 102I acting as a shield node, on the other hand, may provide the only access and/or use restrictions for data contained in the node 100L that it references. Any of the nodes 100 of the non-hierarchical data structure 216 of FIG. 5 may be converted into instances of the security node 102 (or converted back into non-security nodes), and additional nodes may be easily added between any of the nodes 100 by changing a reference structure.

FIG. 6 illustrates the control dataset of FIG. 2 (also referred to as a "terms" of the control policy) comprising a set of control attributes usable to establish an authorized context of the control policy, each of the control attributes having a specified control value range usable as an input to the control algorithm, according to one or more embodiments. Specifically, FIG. 6 further shows a control attribute 600 and a control value range 602. The control dataset 110 comprises one or more control attributes 600 that may be called by an instance of the control algorithm 108 for one or more control value ranges 602. In the embodiment of FIG. 6, the control dataset 110 is associated with a node 100 storing a CAD file that may be usable by a 3D printer instance of the device 200. The CAD file may have restrictions on use to ensure that the CAD file is utilized legitimately within an organization. For example, the 'Email_domain' attribute 600 may contain an array of email domains as one instance of the control value range 602. The 'Day' attribute 600 may contain an array of each day of the week (here, Monday through Friday) forming another instance of the control value range 602. The control algorithm 108 may use any of the control value ranges 602 as inputs, including a "range checking function," as discussed above, that determines if each value of the context dataset 114 is within each corresponding control value range 602 (e.g., whether the time specified in the state dataset 202 is within the time specified in the control value range 602). The control dataset 110 may be stored in a discrete sub-element of the security node 102 such as the security sub-element 109. The security sub-element 109, the attributes 600, and the control value range 602 may be in the form of an entity-attribute-value triplet which may allow for efficient query or retrieval of all data relevant to the control policy 106. Similarly, when a node 100 and/or security node 102 are implemented in the domains structure of FIG. 1.1, the security sub-element may form a sub-entity within the NT element 1.103 and/or the XT element 1.104 of the domain 1.100, which may for an entity-sub-entity-attribute-value quadruplet.

FIG. 7 illustrates two components of the context dataset of FIG. 1 evaluated by the control policy, the state dataset of a state of the device at generation of the authentication request and an external dataset from a source other than the device, according to one or more embodiments. FIG. 7 further shows a state attribute 700, a state value 702, an external attribute 704, and an external value 706. Either the state attribute 700 or the external attribute 704 may be referred to as a context attribute, and the state value 702 or the external value 706 may be referred to as a context value.

The values 706 of the state dataset 202 may be used in the one or more conditionals 112 of the control algorithm 108. The state dataset 202 comprises one or more state attributes 700 and state values 702 that include data associated with a state of the device 200 at generation of the authorization request 206. For example, the state dataset 202 may be generated just before (e.g., a few milliseconds, a second, a minute) the authorization request 206 is generated. In one or more embodiments, the state dataset 202 is constantly and/or periodically updated in the device 200 and a "snapshot" of the state dataset 202 is transmitted to the server 208 during the authorization request 208. The state dataset 202 may be generated by the device 200 and transmitted using a communication protocol (e.g., HTTP) to the server 208. Additionally, the server 208 may also add data to the state dataset 202, such as a time the authorization request 206 was received by the server 208, or may convert units (e.g., converting geospatial coordinates from a longitude/latitude system to a Cartesian system). FIG. 7 shows examples of state attributes 700 and state values 702 that may make up the state dataset 202. These examples include an 'Application' attribute 700 that generated the authorization request 206 (e.g., the application program 204), an 'Email' attribute 700 of an email address of a user of the application program 204 along with a 'User' attribute 700 specifying a 'User ID', a 'Time' and a 'Date' attribute 700, a 'device ID,' a 'device OS' (e.g., operating system of the device 200), and geospatial coordinates. The state dataset 202 may also include security features such as the hash state attribute 700 that may contribute to validation of the user, the device 200, the application program 204, and/or the veracity of the state dataset 202. Each type of device 200 and/or each instance of the application program 204 may have its own state dataset 202 that is sent during the authorization request 206, each comprising a different set of state attributes 700 and state values 702. For example, a 3D printer may send data related to a current configuration of materials loaded into the 3D printer while an autonomous vehicle instance of the device 200 may send data related to its current velocity.

In addition to the state data 202, the context dataset 114 may also be comprised of data from the external dataset 220. The external dataset 220 may be comprised of data from sources other than the device 200. The external value 706 of the one or more external attributes 704 may derived from several sources. The external value 706 may be retrieved from a memory address (e.g., a memory address of the memory 212 of the server 208) and/or retried from a function call (e.g., from software running on the server 208). The external value 706 may also be retried from an application programming interface (API), for example an API operated by a stock index or commodity exchange, an API operated by a sports association, a financial institution, and/or a government statistics service. The external value 706 may also be called and/or queried from one or more nodes of the datastore 214. For example, where a user of the device 200 has a user profile within the datastore 214, the external value 706 may be withdrawn from the user profile (e.g., a permission of the user, a subscription service information, a rank of the user. The external value 706 may also be retrieved from a second state dataset of a device other than the device 200 that generated the authorization request 206. For example, the context dataset 114 may require not only that the device 200 is located inside one of several industrial facilities of an organization but also that a second device associated with an executive of a certain position within the organization is within 50 yards of the device 200. The server 208 may delay the authorization of the protected resource 104 while retrieving all inputs of the context dataset 114 called by each of the one or more conditionals 112 of a particular control policy 106. For example the control policy 106 may require that the executive of the organization provide permission for the device 200 to utilize the protected resource 104. The server 208 may send out a notification to a different device of the executive to prompt the executive for the permission, the answer to which may be transmitted back to the server 208 and incorporated into the context dataset 214 as an instance of the external value

706. In FIG. 7, the external dataset 220 includes a 'User_usage' external attribute 704 that has data related to a number of times the user has utilized an instance of the protected resource 104, an 'Account_funds' external attribute 704 includes a bank account balance retrieved from a third-party API, and an 'NFL_Seahawks'® football team score retried from a sports service API.

FIG. 8 is a first example of a Turing complete expression 850 of the control algorithm 108 of FIG. 2 that provides flexibility to the control policy 106 securing the protected resource 104, the Turing complete expression of FIG. 8 including an if operation 800, a then operation 802, and an else operation 804, according to one or more embodiments. Specifically, FIG. 8 shows two if operations 800A and 800B, three then operations 802A through 802C, and an else operation 804. Each of the operations are written in pseudocode, which may be a notation resembling a simplified programming language, used in program design. The if operations 800 and the else operation 804 may include the one or more conditionals 112 of the control algorithm 108.

In FIG. 8, the if operation 800A first determines whether geospatial values of the state dataset 202 fall within a given range for x values and y values. The if operation 800A also compares the device_type (e.g., the type of the device 200) and the os_type (e.g., operating system type) state values 702 to determine whether they are included within the control value range 602 of the control dataset 110. Finally, the if operation 802A determines whether the user associated with the authorization request 206 is an executive (for example, by retrieving an external value 706 of the user's profile that may be stored within the datastore 214). Alternatively, instead of having the executive range, the user may have a permission token granted by the server 208 or another system. If satisfied, the then operation 802A authorizes utilization of the protected resource 104 of the security domain 102 by the application program 204 of the device 200. Otherwise, in the if operation 800B that may be used when the requirements of if operation 800A are not satisfied, where the user is an executive the then operation 802B may return an error message asking the user to utilize the protected resource 104 at the location of the organization. Otherwise, where requirements of if operation 800A and 800B are not met, the else operation 804 may return by the then operation 802C a message "Sorry, not authorized." The Turing-complete expression of the control algorithm 108 may therefore provide a flexible way to describe complex control to define the control algorithm 108 as part of the control policy 106.

FIG. 9 is a second example of the Turing-complete expression of the control algorithm 106 of FIG. 2, including the if operation, the then operation, and the else operation, according to one or more embodiments. In the embodiment of FIG. 9, the control algorithm 108 may define an authorized context for controlling access to and use of a medical record, for example an X-ray or magnetic resonance image (MRI). In contrast to the embodiment of FIG. 8, an instance of the control dataset 110 is not called or used by the control algorithm 108 of the embodiment of FIG. 9. An if operation 900A sets forth a number of conditionals 112, for example first requires re-authorization of the requesting user (e.g., through the 'user.reauth' command) to return True. The if operation 900A may then determine whether a user profile of the requesting user includes a 'radiologist' classification and whether the use request 206 derives from a list of approved IP addresses, as may be extracted from state dataset 202. If the classification and a verified IP address are present, the if operation 900A may then request affirmative permission from either the patient or the patient's general practitioner. If all of the requirements of the if operation 900A are met, the then operation 902A returns authorization. In addition, the then operation 902A may specify data to assemble "use terms," for example that the requesting user is able to view the medical record for two hours and may take any number of screenshots (e.g., all screenshot capabilities are enabled with a value of '1'). The use terms may be communicated to the device 200 along with a data stream that may be temporarily held in memory of the device 200 and its use monitored by one or more processes of the device 200.

If the conditionals 112 of the if operation 900A are not met, the if operation 900B may execute to determine whether permissions has been affirmatively granted by both the patient and the patient's general practitioner. However, the then operation 902B may define a more restrictive use controls, for example that the requesting user is only able to use the medical record for one quarter of an hour before re-authorizing, and that any screenshot taken during use will result in terminated use of the medical record as monitored by a process in an application program of the device 200. If nether the conditionals 112 of the if operation 900A nor the conditionals 112 of the if operation 200B are satisfied, the else operation 904 returns in the then operation 902C an error message, "Please contact System Health for assistance at 800-555-2146." As a result, the control policy 108 of FIG. 9 may define a flexible access and use policy that requires either an authenticated medical specialist have access to the medical record, or that both the patient and a general practitioner of the patient approve the requesting user. This may improve security of the datastore 214 by ensuring an appropriate scope of access and use is placed on requesting users.

FIG. 10 is an authorization process flow 1050 illustrating a method by which the security node can be used to determine whether the context dataset conforms to the authorized context defined by the control policy, according to one or more embodiments. Operation 1000 traverses a referent attribute (e.g., the node reference 103) of a first node referencing a security node, the security node including a protected resource (e.g., the protected resource 104) of the security node that is a protected primitive 111 and/or a referent attribute node referring to a second node (e.g., a protected referent 107). Operation 1002 receives an authorization request 206 from a device 200 for utilization of the protected resource 104, the authorization request 206 including a state dataset 202 that includes one or more state attributes 700 each having a state value 702 associated with a state of the device 200 at generation of the authorization request 206. Operation 1004 references a control policy 106 that defines an authorized context in which the device 200 is authorized to utilize the protected resource 104. The control policy 106 may include a first component that is a control algorithm 108 and optionally include a second component that is a control dataset 110. Some configurations of the storage of the control algorithm 108 and the control dataset 110 are shown in conjunction with FIG. 2 through FIG. 3. Operation 1006 determines an applicable control algorithm 108 based upon an application program generating the authorization request 206. In some cases the same control algorithm 108 may apply to multiple instances of the application program 204, whereas in other cases there may be multiple control algorithms 108 that apply for a single application program 204 or a single control algorithm 108 that applies to the multiple instances of the application programs 204.

Operation 1008 extracts the control algorithm 108 from the security node 102, the control algorithm 108 including one or more conditionals 112 each comparing a first input that is a context value with a second input that is a different context value and/or a control value range 602 of the control dataset 110. In one or more other embodiments, the control algorithm 108 may be extracted from a location other than the security node 102 where the security node 102 contains the other component of the control policy 106, the control dataset 110. Operation 1010 retrieves each context value specified in the control algorithm 108 and assembles the control policy 106 from the control dataset 110 and the control algorithm 108. Operation 1010 may pause to collect all called context values before continuing. Operation 1012 determines that the context dataset conforms to the authorized context by evaluating each of one or more conditionals 112 of the control algorithm 108 in conjunction with each context value of the context dataset and each control value range 602 of the control dataset specified as inputs to the conditionals (e.g., the one or more conditionals 112). Operation 1014 authorizes utilization of the protected resource 104 of the security node 102 by the device 200 when it is determined (e.g., by an outcome of the one or more conditionals 112) that the context dataset conforms to the authorized context (e.g., the authorized context defined by the control policy 106). In some cases the protected resource 104 may be utilized by directly delivering data to the device 200, and in other cases by allowing the protected resource 104 to be used in some other process (e.g., server-side process of the server 208) associated with the user of the device 200. For example, the protected resource 104 may be "utilized" by the device 200 by delivering the protected resource 104 into the control of another user or changing attributes and/or values of the data node 102.

FIG. 11 is a security node and control policy formation process flow illustrating a method by which the security node, the protected resource, and the control policy can be defined, according to one or more embodiments. Operation 1100 receives a selection of a node 100 stored in a non-hierarchical data structure 216. For example, the node 100 may be selected using an identifier of the node (ID 101). Where the node 100 is a domain 1.100, the node 100 may be selected using a UID 1.101 of the domain 1.100, as shown and described in conjunction with FIG. 1.1. Operation 1102 designates a portion of a contained data of the node 100 to be a protected resource 104. For example, the data selected to be the protected resource 104 can be one or more attribute-value pairs holding any type of data, a primitive data (e.g., the primitive 1.105 of FIG. 1.1) such as a file of any MIME-type that the node 100 contains and that may be referred to as the protected primitive 111. The protected resource 104 selected may also be an attribute-value pair referred to as the referent attribute 107 holding a reference to another node 100 that the node selected in operation 1100 will shield. Operation 1104 defines a first aspect of a control dataset 110 that is a first component of a control policy 106 by specifying one or more control attributes 600 to be evaluated against corresponding attributes of a context dataset (e.g., one or more state attributes 700 and/or one or more external attributes 704). For example, control attributes 600 may be specified to include attributes for a geospatial coordinate, a user, a time of day, a stock price, and/or a state of another device such as an operational state of a different server working in association with the server 208. Operation 1106 defines a second aspect of the control dataset 110 by specifying a control value range 602 for each of the control attributes 600, each control value range 602 usable as inputs to a control algorithm 108 that is a second component of the control policy 106. For example, specific values of geospatial coordinates may be defined, a particular set of users, a specific time of day, a specific stock price, and/or a functional state of the different server working in association with the server 208. Operation 1108 deposits the control dataset 110 in the node 100, for example by adding the control dataset 110 to a hard drive sector and/or a memory address associated with other hard drive sectors and/or memory addresses where other data of the node 100 is stored. Physical storage may be handled by a database management system API.

Operation 1110 defines a first aspect of a control algorithm 108 that is the second component of the control policy 106 by specifying one or more conditionals 112 each to compare a first input from the control dataset 110 and a second input from the context dataset 114. Operation 1112 defines a second aspect of a control algorithm 106 by specifying the first input of each of the one or more conditionals 112 by selecting one or more control attributes 600 of the control dataset 202 for each of the one or more conditionals 112. For example, as shown in operation 800A of FIG. 8 a device_type attribute may be selected corresponding to the device_type attribute 600 of the control dataset 110. Operation 1114 defines a third aspect of a control algorithm 108 by specifying the second input of each of the one or more conditionals 112 by selecting one or more contextual attributes of the contextual dataset for each of the one or more conditionals 112. For example, as shown in operation 800A FIG. 8, the device_type attribute may be selected corresponding to the device_type attribute 700 of the state dataset 202. Overall, as shown in FIG. 8, a device_type of the state dataset 110 may be required to be within the control value range 602 of the control dataset 202 that specifies a range of device types. Conversely, the conditional could also require that the device_type of the state dataset 110 was not within the control value range 602 of the control dataset 202 that specifies the range of device types (e.g., the control value range 602 could be a range of negative values to be excluded from authorization). In other embodiments, operation 1112 may specify as the first input a different value from the context dataset 110. Similarly, the first input and/or the second input may be hard-coded in the control algorithm 108. For example, as shown in the if operation 800A of FIG. 8, a conditional may be defined requiring that geospatial_x coordinate from the state dataset 110 be greater than or equal to a value hard-coded in the control algorithm 108 such as "40.452000." Boolean logic such as AND and/or OR may be used to relate the one or more conditionals 112 specified in operations 1110 and 1112.

Operation 1116 deposits the control algorithm 108 in the node 100. Operation 1118 specifies an application program 204 for which the control algorithm 108 applies as the second component of the control policy 106 when an authorization request 206 generated by the application program 204 is evaluated. In one or more embodiments, however, no application program 204 for which the control algorithm 108 applies needs to be specified: a different process of the server 200 may determine which control algorithm 108 applies and/or the only control algorithm 108 specified may apply to all instances of the application program 204 generating the authorization request 206.

FIG. 12 is a control policy execution process flow showing a process by which the control policy of FIG. 1 may be used to determine whether the authorization request conforms to the authorized context, according to one or more embodiments. Operation 1200 extracts the state dataset 110 from the authorization request 206. For example, the authorization request 206 may be conveyed to the server 208 through the network 201 according to a protocol that carries the data of the state dataset 110 and from which the state dataset 110 may be extracted. Operation 1202 determines an applicable control algorithm 108 that will be used to determine the authorized context. For example, operation 1202 may determine that a given control algorithm 108 may be used for a given application program 204. In one or more other embodiment, other factors than the application program 204 may be used to determine the applicable control algorithm 108 such as a location of the device 200 and/or a user of the device 200. Operation 1204 extracts any required external values 706 of the external dataset. For example, the server 208 may retrieve an external value 706 from a different node 100 of the datastore 214 and/or from a third-party API. Operation 1206 extracts one or more components of the control policy 106 from the security node 102. For example, where the security node 102 contains the control dataset 110 acting as the "terms" component and a corresponding control algorithm 108 acting as the "conditions" component both may be extracted. Where the security node 102 contains a control algorithm 108 acting as both the "terms and conditions" component the control algorithm 108 may be extracted from the security node 102. Where the security node contains only the control dataset 110 the control dataset may be extracted and a standardized control algorithm 108 (e.g., the control algorithm 108 in a location other than the security node 102) may be used.

Figure 18:
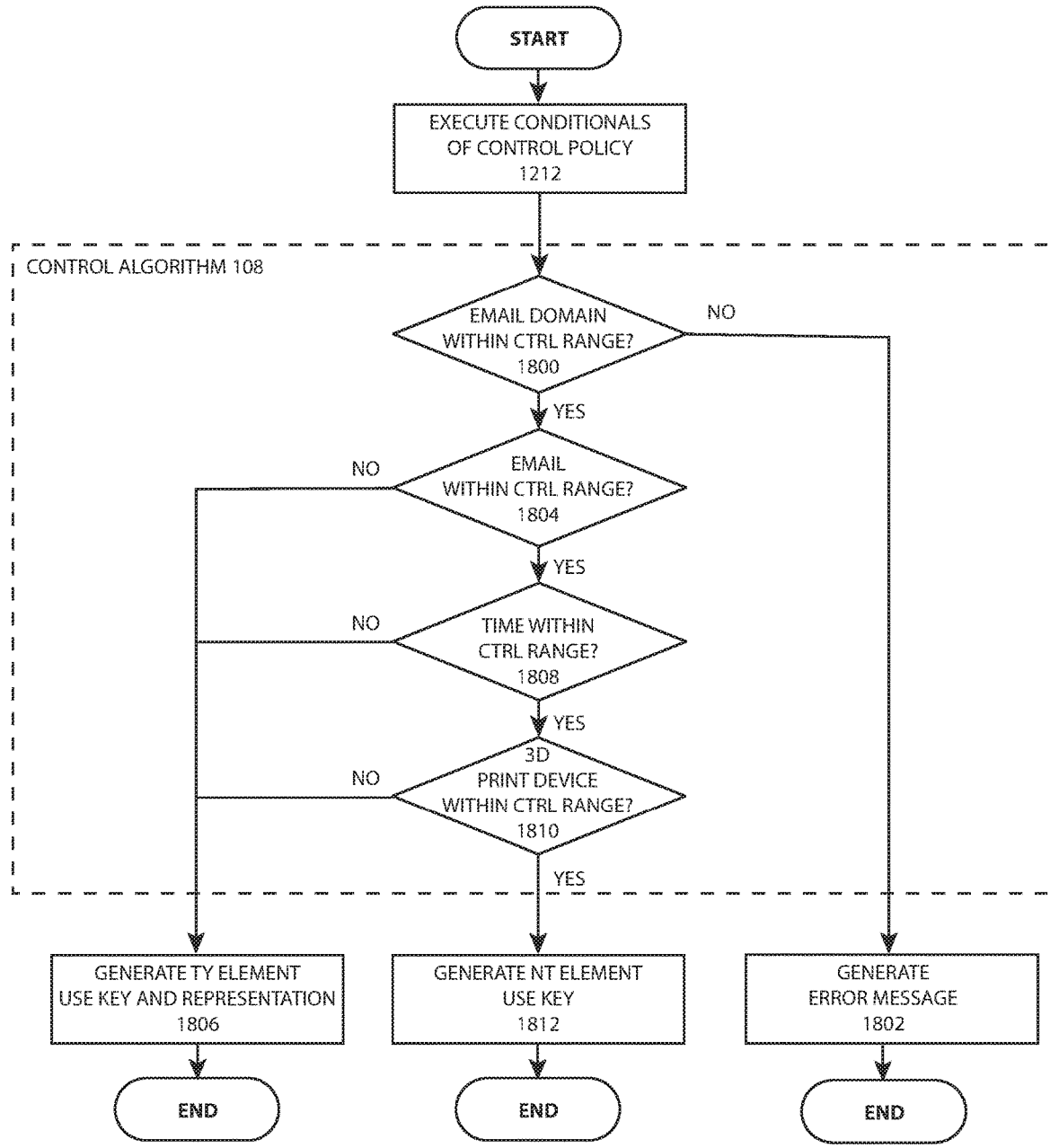

Operation 1208 assembles the context dataset 114 used as inputs to the one or more conditionals 112 of the control algorithm 108. The context dataset 114 is assembled from any data called for by the control algorithm 108 from the state dataset 202 and the external dataset 220. Using the assembled context dataset, any specified control value ranges 602, and the control algorithm 108, operation 1210 assembles the control policy 106 for the authorization request 206 for utilization of the protected resource 104 of the security node 102 by the device 200. Operation 1212 then executes the one or more conditionals 112 of the control policy 106 (e.g., the one or more conditionals 112 of the control algorithm 108) to determine whether the authorized context exists. As part of operation 1212, operation 1214 determines whether the device 200 and the context dataset 114 are within the authorized context defined by the control policy 106. If they are not within the authorized context, operation 1216 generates an error message and transmits the error message back to the device 200 and/or takes some other action denying utilization of the protected resource 104 such as logging a failed authorization request 206. Where the authorized context is determined to be present in the device 200 and/or the context dataset 114 according to the control policy 106, operation 1218 authorizes use of the protected resource 104 by the device 200. As shown in FIG. 18, the control algorithm 108 and/or the control policy 106 may have additional outcomes such as partially authorizing the protected resource 104 and/or authorizing use of a particular subset of a node 100 shielded by the security node 102.

FIG. 13 is a control algorithm process flow 1350 illustrating a basic process by which the one or mode conditionals may evaluate inputs from the context dataset 114 and the control dataset to authorize use of the protected resource, according to one or more embodiments. Specifically, FIG. 13 shows a strait "range checking function" used to determine whether values associated with four state attributes 700 fall within control value ranges 602 specified in the control dataset 110. Operations 1212, 1216 and 1218 may operate similar to those in operations shown and described in conjunction with FIG. 12. Each of operations 1300 through 1306 may be specified by a number of the one or more conditionals 112. Operation 1300 is a conditional checking whether a use of the device 200 (e.g., as included in the state dataset 110) is within an array of users specified in a control value range 602 of the control dataset 110. Operation 1302 determines if a location (e.g., a geospatial location) is within an array of locations and/or coordinates specified in the control value range 602 of the control dataset 110. Operation 1304 similarly checks a date of the authorization request 206 and operation 1306 checks a time of the authorization request 206. If any of the operations of the control algorithm 108 determine that a value of the context dataset is not within an appropriate control value range 602 than the control algorithm 108 proceeds to deny utilization of the protected resource 104 by operation 1216. Otherwise, if each applicable values 600 of the state dataset 202 falls within each corresponding control value range 602, utilization of the protected resource 104 is authorized by operation 1218.

FIG. 14 is a control algorithm process flow 1450 illustrating a more complex process by which the one or more conditionals may evaluate inputs from the context dataset and the control dataset to authorize use of the protected resource, according to one or more embodiments. The control algorithm 108 of FIG. 14 may be used to create a control policy 106 for a protected primitive 111 that is an auto track. Specifically, operation 1400 determines whether the user of the device 200 has listened to the audio track before (e.g., utilized the protected primitive 111). If uses is less than one, operation 1400 authorizes the protected resource 104 by operation 1218. Generally, any device 200, user of the device 200 and/or application program 204 of the device 200 may be prompted to purchase the song when a second authorization request 206 for utilization of the audio track is conveyed to the server 208. However, where the device is located in Las Vegas, Nev. (which may be defined through one or more conditionals 112 of geo-fenced data), operation 1402 and operation 1404 may authorize utilization of the audio track up to five times. Upon a sixth authorization request 206 for the audio track, operation 1406 will only authorize use of the audio track where the user of the device 200 is a "fan" of the artist of the audio track, for example by following social media posts of the artist and/or providing additional social media support. Such information may part of the context dataset 214 (e.g., an external value 702) and may be drawn directly from a profile of the artist, fan, and/or the security node 102, any of which may be stored in the datastore 214 or in another location accessible by the server 208. After utilization of the protected resource 104 is authorized, additional processes may occur for use in future applications of the control algorithm 108. For example, operation 1208 may increment a use statistic of the audio track.

FIG. 15 through FIG. 19 show the security node of FIG. 1 implemented in a semantic data structure described in FIG. 1.1A through FIG. 1.11. The domain structure 1.100 shown and described in FIG. 1.1A may provide an efficient and consistent form to structure data of the security node 100 and to implement the non-hierarchical data structure 216. The domain structure 1.100 and uses of the domain structure 1.100 may be disclosed in co-pending patent applications filed by related inventive entities and/or assignees of the current application. A domain key 199 for symbols used in figures illustrating domains is found in FIG. 1F. Referring to FIG. 1.1A through FIG. 1.11 and the accompanying text may be helpful before reviewing FIG. 15 through FIG. 19 and accompanying text.

FIG. 15 is an instantiation of the security node of FIG. 1 referred to as a security domain that is defined by the semantic data structure of the domain of FIG. 1.1A, the security domain comprising a unique identifier, a TY element, an NT element comprising the protected resource that is one or more references to other domains, an XT element, the control dataset and one or more control algorithms, according to one or more embodiments. The security domain 1.500 of FIG. 15 may be an instantiation of not only the domain structure 1.100 but more specifically of the relation domain 1.300 as shown and described in conjunction with FIG. 1.3. The security domain 1.500 that is also a relation domain 1.300 may be symbolized by a circle containing three smaller circles, the circle surrounded by a shield symbol in accordance with the key 1.199 of FIG. 1.1E. The security domain 1.500 of FIG. 15 may function similarly to the security node 102B shown in FIG. 3 but with one or more added features and/or structure of the domain structure 1.100.

The security domain 1.500 comprises a unique identifier (UID) whereby the security domain 1.500 is uniquely addressable within the datastore 214, and additionally comprises three primary elements. The identity element (TY element) 1.502 comprises one or more attribute-value pairs that include identification data 1.520 usable to label the security domain 1.500 and/or distinguish the security domain 1.500 from any other node 100 and/or domain 1.100 within the datastore 214. A content element (NT element) 1.502 comprises one or more attribute-value pairs that include the contained data 1.530 that the security domain 1.500 contains. The context element (XT element) 1.504 comprises one or more attribute-value pairs that include contextual data 1.540 that further characterizes the security domain 1.500. It is important to note that the contextual data 1.540 of FIG. 15 is distinct from the context dataset 114 of FIG. 1. The TY element 1.502 may contain the hastory 1.524 that provides for a block-chain security mechanism. Use of the hastory 1.524 is shown and described in conjunction with FIG. 1.1, and may be further described in co-pending patent applications be related inventive entities and/or common assignees of rights associated with the current embodiments.

The security domain 1.500 may be referred to by one or more other domains 1.100, for example by using the unique identifier 1.501 as a value of a referential attribute. For example the domain 1.100A references the security domain 1.500 shown in FIG. 15. The security domain 1.500 may be owned by another domain 1.100 such as the owner domain 1.400. One or more attribute value pairs or other data of the security domain 1.500 may be the protected resource 104. For example, in the embodiment of FIG. 15 an attribute-value pair of the contained data 1.530, specifically the domain ref 1.534 referencing domain 1.100B (which may be similar to the node reference 130 of FIG. 1), may be designated as the protected referent 107. The domain ref 1.534 may use a value of the UID 1.101 of the domain 1.100B to effect the reference. The security node 1.500 of FIG. 15 may therefore be referred to as a shield domain and the node 1.100B as a shielded domain.

One or more components of the control policy 106 such as one or more control algorithms 108A through 108N and/or the control dataset 110 may be stored in the security domain 1.500. In one or more embodiments, the components of the control policy 106 are stored in a discrete sub-element (e.g., the security sub-element 109) of the XT element 504. For example, as shown and described in conjunction with FIG. 1.1E, the security sub-element 109 and included data may form a plurality of entity-sub-entity-attribute-value "quadruplets" similar to the application sub-element 1.146.

Figure 16:
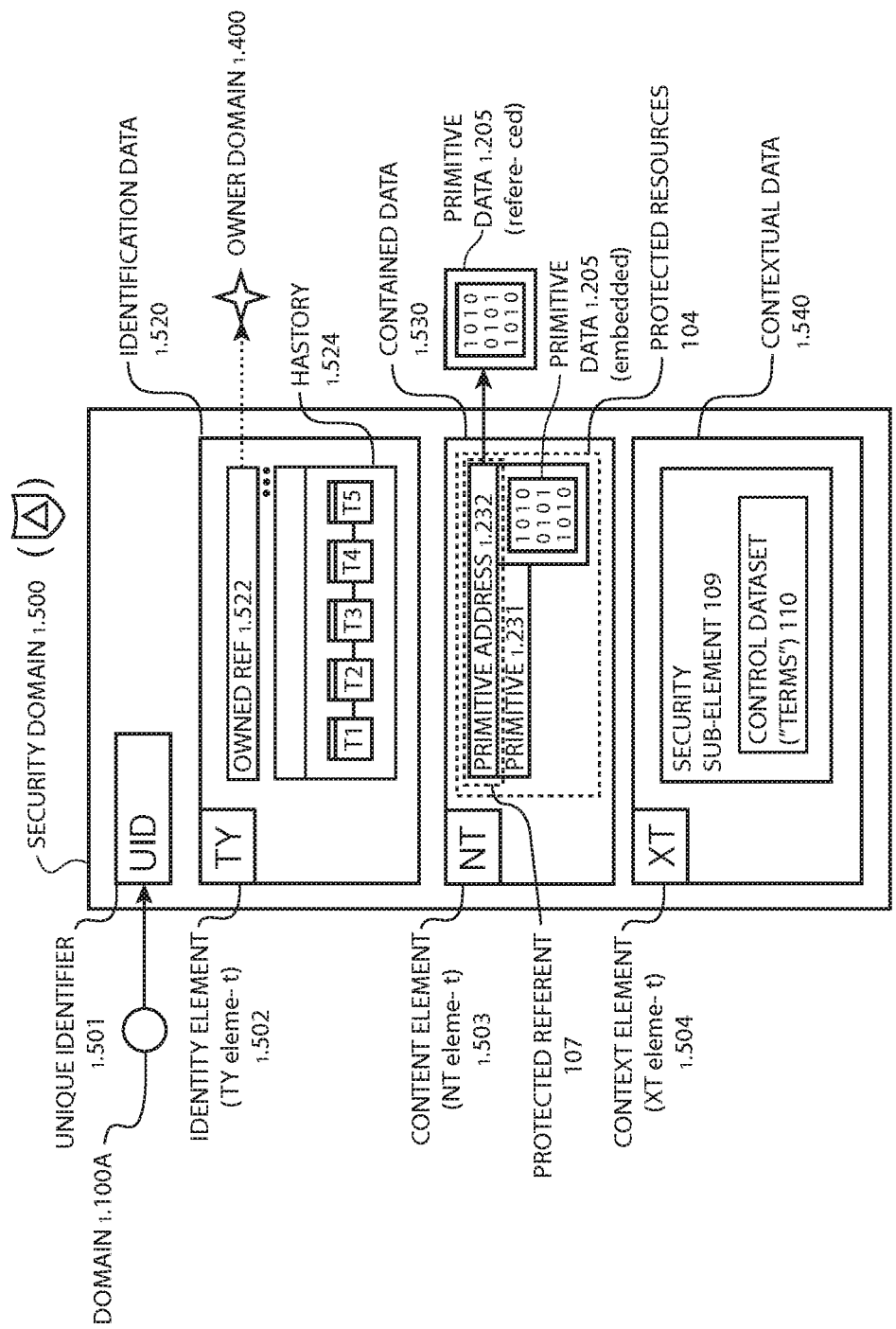

FIG. 16 is another example of the security domain of FIG. 15, including a primitive data that is the protected primitive and a control dataset to be used as a first component of the control policy along with the control algorithm stored in a location other than the security domain such as the server, according to one or more embodiments. The security domain 1.500 of FIG. 16 may be an instantiation of not only the domain structure 1.100 but more specifically of the subject domain 1.200 as shown and described in conjunction with FIG. 1.2. The security domain 1.500 that is also a subject domain 1.200 may be symbolized by a triangle surrounded by a shield symbol in accordance with the key 1.199 of FIG. 1.1E. The security domain 1.500 of FIG. 16 may function similarly to the security node 102 shown in FIG. 2 but with one or more added features and/or structure of the domain structure 1.100. The security domain 1.500 of FIG. 16 may function similarly to the security node 102 shown in FIG. 2 but with the added features and structure of the domain structure 1.100.

While similar to the security domain 1.500 of FIG. 15, the security domain 1.500 of FIG. 16 includes as the protected resource 104 the protected primitive 111 rather than the protected referent 107. The protected primitive 111 may be the primitive data 1.105 and/or the primitive data 1.205 as shown and described in conjunction with FIG. 1.1A and FIG. 1.2. The primitive data 1.205 may be embedded within the NT element 1.503 (e.g., through attribute 1.231) and/or referenced through a referent referring to a memory address (e.g., through primitive ref 1.232 which may be an instance of the protected referent 107). Other embodiments of the security domain 1.500 include a protected resource 104 that comprises both protected referents 107 and protected primitives 111.

One of the benefits of the domain structure 1.100 of FIG. 1.1A is an ability to define derivative-representation structures that enables efficient selection of domains 1.100 within a datastore (e.g., the datastore 214) as shown and described in conjunction with FIG. 1.11. Specifically, a derivative domain 1100 may hold data to be primarily acting on by an application program (e.g., the application program 224) and a representation domain 1101 may hold data usable by the application program to facilitate a selection of data within the derivative domains 1100. This derivative-representation data structure may also be used to effect increased security of the datastore 214 and control over data resources while still allowing the kinds of data and/or types of data resources that are within the datastore 214 to be represented and/or depicted to users (e.g., users of the device 200) without disrupting or disorganizing the underlying data organization. For example, an application program 204 may be able to populate a GUI view with representation views of album covers or song art while still controlling audio track data (e.g., as the protected primitive 111). At the same time, the node 100 and/or domain 1.100 containing data related to both the album cover and the audio track may be closely associated and organized within the datastore 214 while having discrete security features.

Figure 17:
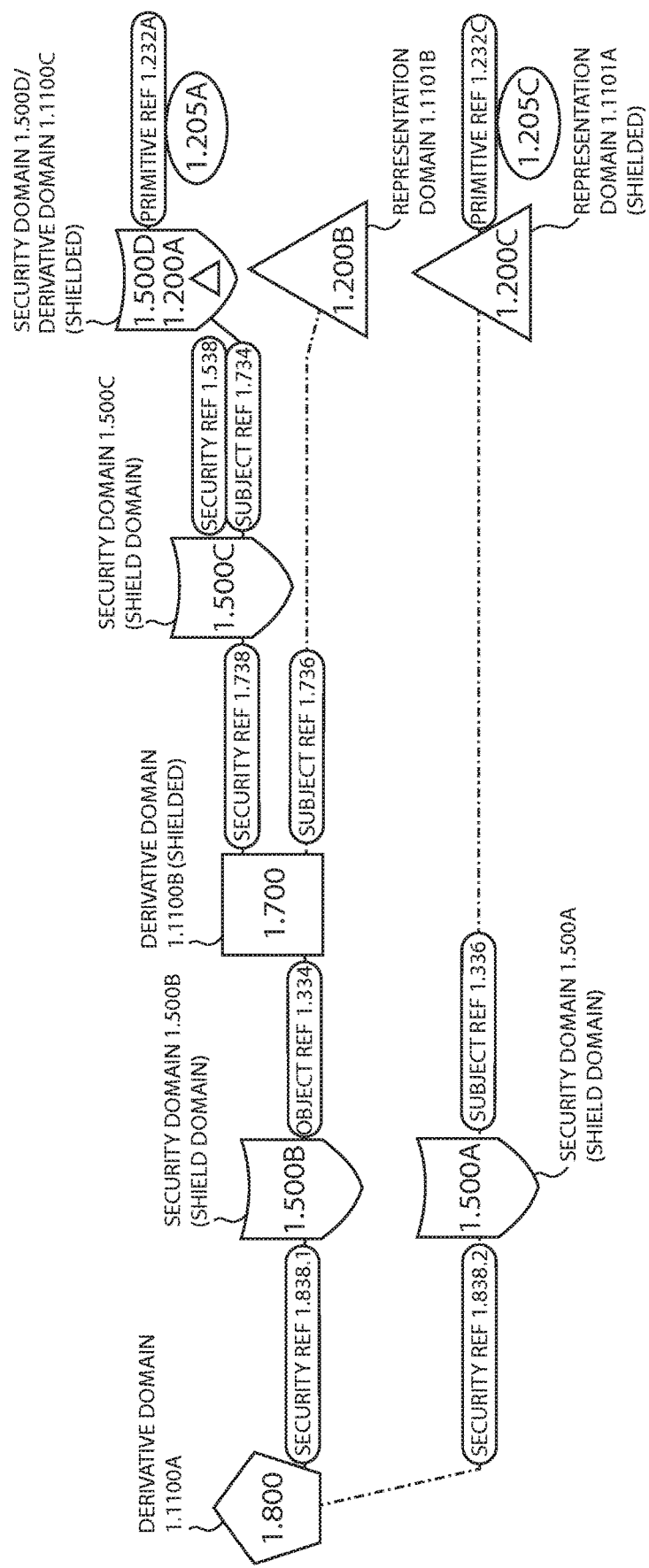

To this architecture the security domain (e.g., the security domain 1.500 of FIG. 1.5) is further added in FIG. 17. Along these lines, FIG. 17 is a derivative-representation-security structure illustrating use of the security domain 1.500 to establish different levels of control for different resources, including relatively lenient controls for utilization of a representation domain along with relative stringent controls for the derivative domains and a subject domain of FIG. 1.2, according to one or more embodiments. In FIG. 17, the stack domain 1.800 that is a relationship between one or more object domains 1.700 may act as derivative domain 1.1100A. The stack domain 1.800 may also reference a subject domain 1.200 (e.g., the subject domain 1.200C) containing data (e.g., an image as the primitive 1.205C) that represents and/or "depicts" the relationship among object domains 1.700. For this reason the subject domain 1.200C may also be referred to as a representation domain (e.g., the representation domain 1.1101A.

The application program 204 may query the datastore 214 for the stack domain 1.800. The server 208 may traverse security ref 1.838.2 to the security domain 1.500A acting as a shield domain shielding the representation domain 1.1101A. Thereafter, the component of the control policy 106A associated with the security domain 1.500A may be evaluated and where utilization of the subject ref 1.336 is determined to be within the authorized context (e.g., the subject ref 1.336 is a protected referent 107, not shown), the server 208 may traverse subject ref 1.336 to subject domain 1.200C and utilize the primitive 1.205C (e.g., as the protected primitive 111) within the GUI of the application program 204. Once a user and/or the application program 204 displays the primitive 1.1205C, the user may select one of the object domains 1.700. The server 208 may then traverse the security ref 1.838.1 of the subject domain 1.800 to the security domain 1.500B. After evaluating the control policy 106B (not shown) of security domain 1.500B, the object ref 1.334 may be utilized by the application program 204, traversing to the object domain 1.700 that is the derivative domain 1.1100B. The object domain 1.700 of FIG. 17 is a relation between a data to be primarily acted upon by the application program 204 (e.g., the subject domain 1.200A that is the derivative domain 1.1100C) and a representation of the data to be primarily acted upon (e.g., the subject domain 1.200B that is the representation domain 1.1101A). Unlike the stack domain 1.800, the object domain 1.700 of FIG. 17 may have its representation domain 1.1101B unshielded by an instance of the security domain 1.500, and the image and/or other file depicting the derivative domain 1.1100C may be freely returned within triggering the control policy 106C. An authorization request 206 for the derivative domain 1.1100C, however, may traverse security ref 1.738 to security domain 1.500C that shields the derivative domain 1.1100C. After the protected referent 107 of the security domain 1.500C is authorized for utilization by the application program 204 generating the authorization request 206, subject ref 1.734 may be returned to the device 200 through the network 201 to form the basis of another authorization request 206 and/or utilized by the server 208 to traverse the non-hierarchical data structure 216 to the derivative domain 1.1100C.

The subject domain 1.200A may be both the derivative domain 1.1100C (e.g., because it contains data to be primarily acted upon by the application program 204) and the security domain 1.500D being that it triggers a new instance of the control policy 106 (e.g., the control policy 106D, not shown) securing the primitive data 1.205A as the protected primitive 111. In the embodiment of FIG. 17, the primitive data 1.205A is the protected primitive 111 that is the protected resource 104 secured by the control policy 106D.

The data structure defined by domain structure 1.100 and the embodiments of FIG. 1.1A through FIG. 1.11 may also be used for fine-grain control of what type of data is returned from each domain. The control policy 106, for example, may authorize particular elements, sub-elements, and/or attributes of a domain. To illustrate, FIG. 18 is a control algorithm process flow 1850 illustrating a process by which the one or more conditionals of the control algorithm may define a fine-grain authorization such as a particular element of the domain structure of FIG. 1.1A, according to one or more embodiments. The process flow of FIG. 18 may show, for example, how an internet service streaming 3D printer CAD files to enterprises for on-site production may be controlled. When an authorization request 206 arrives at the server 208, operation 1212 executes the one or more conditionals 112 of the control policy 108. Operation 1800 may evaluate the state dataset 202 to determine whether an email domain of an email address of the user associated with the authorization request 206 is within the control value range 602 of the control dataset 110. If not, operation 1802 generates an error message because, for example, the authorization request 206 did not come from an enterprise that has been added to and/or approved by a service operating the server 208. If the email domain is within the control value range 602 of the email domain attribute 600, operation 1804 determines whether a particular email address of the request is within a control value range 602 of the email address attribute 600 of the control dataset 202. If not within the control value range 602 of the email address attribute 600, operation 1806 may authorize utilization of a referent attribute 107 referring specifically to the TY element 1.102 of an instantiation of the domain structure 1.100. Authorizing just the TY element 1.102 may allow a user to identify what the domain structure 1.100 is and/or models without being authorized to utilize the primary protected resource 104.

Where the user does have an authorized email address, operation 1808 may determine whether the authorization request 206 is during business hours (e.g., to ensure any CAD files utilized are for company rather than personal use after-hours). If after hours, operation 1806 may again generate a use key to authorize utilization of data in the TY element 1.102 of the instantiation of the domain 1.100. When within the hours specified in the control value range 602 of the time attribute 600, operation 1810 determines whether a 3D printer associated with the authorization request 206 is within the control value range 602 of a device_type attribute 600. If within range, operation 1812 generates a use key of the NT element 1.103 of the instantiation of the domain structure 1.100. For example, the NT element 1.103 may contain the CAD file that is the protected primitive 111. The embodiment of FIG. 18 may occur in either an instance of the security domain 1.500 that is a shield domain wherein the protected referent 107 includes a reference, for example, directly to the TY element 1.102. Particular references of this type may be accomplished, in one or more embodiments, by utilizing particular values of the ordered key value store shown in the embodiment of FIG. 1.1C. Similarly, the embodiment of FIG. 18 may also occur directly in the instance of the security domain 1.500 that is also the subject domain 1.200.

Figure 19:
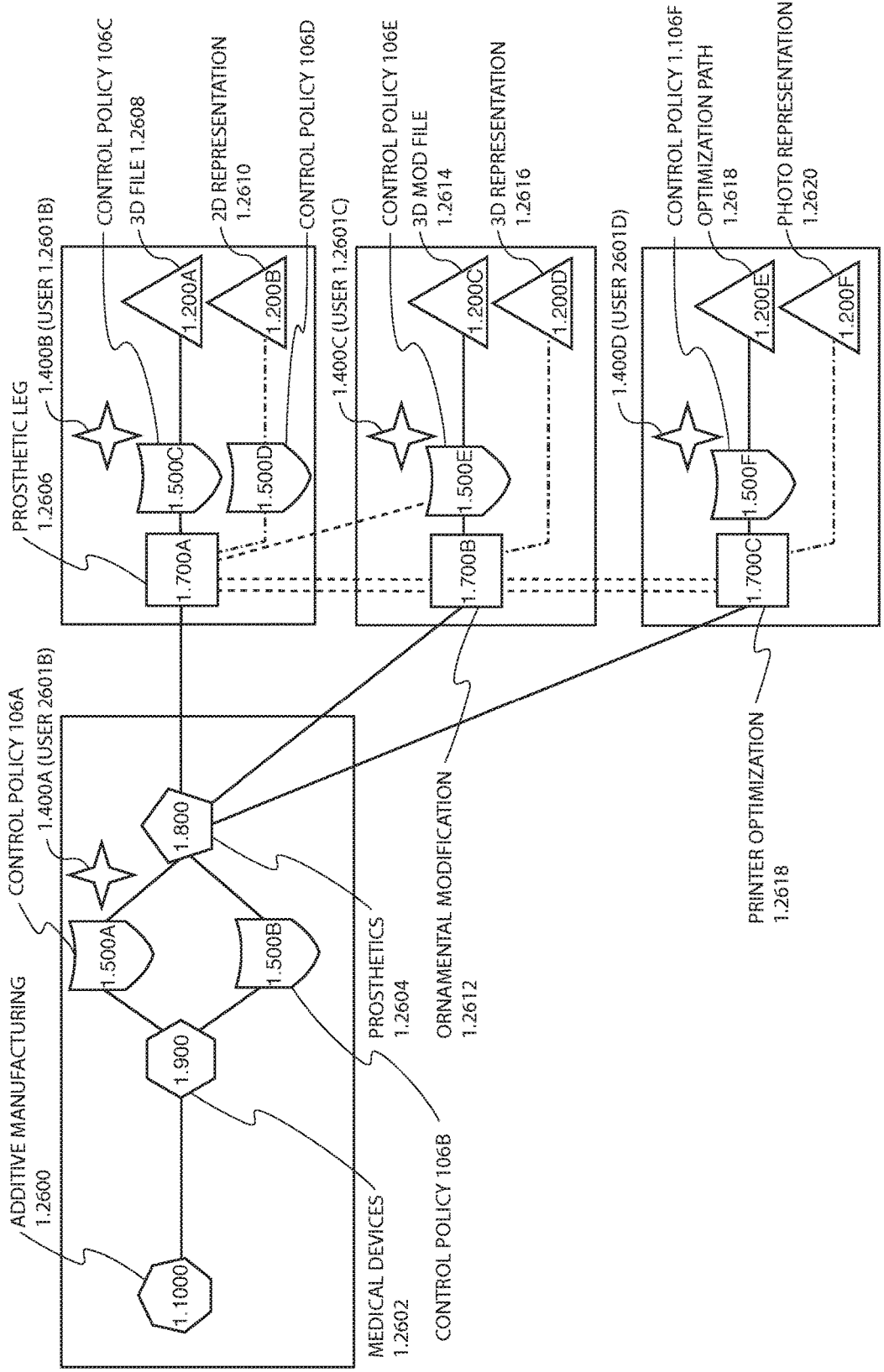

FIG. 19 illustrates secure CAD file datastore 1950 comprising CAD files and corresponding representation images semantically arranged in a data structure comprising the instantiations of the domain of FIG. 1.1A, the CAD file datastore secured by instantiations of the security nodes of FIG. 1.1A and specifically the security domains of FIG. 15 and FIG. 16, the data structure usable by a cloud computing platform to stream the CAD files to a manufacturing device such as a 3D printer, according to one or more embodiments.

In FIG. 19, a datastore (e.g., one or more instances of the datastore 214) includes domains 1.100 owned by distinct users: the user 1.2601A (the owner domain 1.400A), the user 1.2601B (the owner domain 1.400B), the user 1.2601C (the owner domain 1.400C), and the user 1.2601D (the owner domain 1.400D). The owner domain 1.400A may represent a machine-user that owns several representation domains 1.300 organizing and drawing relationships between the domains 1.100 owned by other users of the one or more instances of the datastore 214. For example, the owner domain 1.400A may own the epi-collection 1.1000 holding relationships to several categories of additive manufacturing 1.2600, the collection 1.900 holding relationships to medical devices 1.2602, and the stack 1.800 holding relationships for prosthetics 1.2604. Each of the owners may define their own security over each of their domains 1.100. For example, the a particular instance of the control policy 106 may require payment verification before granting access to and/or use the 3D mod file 1.2614. Security domains 1.500 may also be used on any of the relation domains 1.300. For example, before the device 200 and/or the application program 204 requests the stack domain 1.800 containing references to prosthetics 1.2604, the security domain 1.500A and 1.500B may be set up, each trigger control policies 106A and 106B, respectively. In this case, two instances of the security domains 1.500 may be used to logically separate different types authorization requests 206 (e.g., requests from web traffic versus requests from a instance of the device 1.200 that is a 3D printer). However in one or more other embodiments a single instance of the security domain 1.500A may handle both streams of authorization requests 206 may designating which control algorithm 108 applies to which application program 204.

In FIG. 19, the stack 1.800 references a CAD file that is a prosthetic leg 1.2606, the object domain 1.700A, which is owned by he owner domain 1.400B. The object domain 700A be a relationship between a subject domain 1.200A containing a 3D file 1.2608A (e.g., as a primitive 1.205A). A subject domain 1.200A that contains a 2D representation 1.2610 The 2D representation may be, for example, a rendered image of the 3D file from a fixed perspective. The user 1.2601B may define security domain 1.500C shielding subject domain 1.200A and security domain 1.500D shielding subject domain 1.200B.

Similarly, stack domain 1.800 may also contain a reference to the object 1.700B. The object 1.700B may be an ornamental modification 1.2612 of the prosthetic leg 1.2606. The 3D mod file 1.2614 may be used to modify the 3D file 1.2608 to add ornamentation. For example, an application program may load the 3D file 1.2608 and then apply modification processes specified in the 3D mod file 1.2614. In contrast to the prosthetic leg 1.2606, the ornamental modification 1.2612 may have a 3D representation 1.2606 that may allow a user to rotate a menu item to inspect ornamental features and/or an industrial design. The user 1.2601C may shield subject domain 1.200C with security domain 1.500E, but, in the embodiment of FIG. 19, may not shield the subject domain 1.200D that is the 3D representation 1.2616 of the 3D mod file 1.2614 contained in the subject domain 1.200C. Not shielding Subject domain 1.200D may allow for more ready access and/or use of the 3D representation 1.2616 by the application program 204.

Shown by two vertical dashed lines, the object domain 700A and 700B may contain contextual references to one another (e.g., through the NT elements 704A and 704B). A first contextual reference from object domain 700A to 700B may allow an application program to determine that there exists a mod in the datastore for the prosthetic leg 2606; a second contextual reference in object domain 700B to 700A may allow an application program to find the original file (e.g., 3D file 2608) that the 3D mod file 2614 modifies. In addition, and of the relation domains 1.300 of FIG. 19 may include contextual references to any instance of the security domain 1.500, as shown between the object domain 1.700A and the security domain 1.500E.

Stack domain 1.800 may reference object domain 1.700C containing an optimization path 1.2618 (as the subject domain 1.200E) for the 3D mod file 1.2614 and a photo representation 1.2620 (as the subject domain 1.200F) that may, for example, be a photo of the 3D printer for which the optimization path 1.2618 is intended. Analogous to the contextual references between object domains 1.700A and 1.700B, contextual references may be made between object domains 1.700B and 1.700C to allow an application program instant access to related resources.

The particular data structure associated with the domain structure 1.100 in which the security node 100 and/or the control policy 106 may be implemented will now be described in conjunction with FIG. 1.1A through FIG. 1.11. FIG. 1.1A shows a domain 1.100 that defines a semantic data structure (e.g., that is an example of the non-hierarchical data structure 216), according to one or more embodiments. A datastore may be comprised of data stored and organized in one or more instances of the domain 1.100. Each domain 1.100 may be used to model a real-world object or "thing," for example a file (such as a document, an audio track, an image, or a DNA sequence), a message, a user (such as a person or machine), a log file, or even a relationship between pieces of data. The datastore may be comprised of instantiations of the domain 1.100 that are adapted to model a particular type of real-world object or thing and/or to store a specific kind of data. For example, a subject domain 1.200, shown and described in conjunction with FIG. 1.2, is a fundamental instantiation of the domain 1.100 that can contain a piece of "subject" data usable by an application program as a data resource. The subject domain 1.200 can contain, for example, an audio file, a video file, a piece of clinical data, a scientific dataset, a message, or an architectural rendering. FIG. 1.3 shows another example of an instantiation of the domain 1.100, called a relation domain 1.300. The relation domain 1.300 can be used to draw relationships between domains 1.100. Similarly, FIG. 1.4 shows an instantiation of the domain 1.100 that can be used to represent a user of the datastore 1.100 and FIG. 1.5 shows an instantiation of the domain 1.100 that may be used to store data of a control policy 106 usable by an application program (such as a database) to limit access to, or use of, data within the datastore. A circle within the present drawings may represent an instance domain 1.100 of any instantiation.

The domain 1.100 may be comprised of a unique identifier 1.101 (which may be referred to as the UID 1.101) and three primary elements: an identity element 1.102 (which may be referred to as the TY element 1.102), a content element 1.103 (which may be referred to as the NT element 1.103), and a context element 1.104 (which may be referred to as the XT element 1.104). The primary elements may be referred to collectively as "the elements", or individually as "an element". Each of the elements organize data into a particular arrangement based on properties and/or characteristics of the data, for example whether the data is usable to identify the domain 1.100, whether the data is contained by the domain 1.100, or whether the data may help establish a context for the use of the domain 1.100. Each of the elements may hold data using one or more attribute-value pairs, each pair made up of an attribute 1.106 and a value 1.107. A field for each value 1.107 may be set to a common data type, for example a float, an integer, an alphanumeric string, or a binary large object (BLOB). The attributes 1.106 may establish structure between and among the domains 1.100. Throughout this disclosure including the accompanying figures, "ref" is used as an abbreviation for a reference (e.g., a referential attribute and value). References are usually drawn from one domain 1.100 to another domain 1.100. FIG. 1.1A shows a few common attributes 1.106 that may be used within the domain 1.100, including: an owned ref 1.22, a primitive 1.131, a primitive ref 1.132, a domain ref 1.134, a representation ref 1.136 and a contextual ref 1.142. For clarity, the attributes 1.106 of the present embodiments are generally shown in the figures without associated values 1.107. Additionally, aspects of the various embodiments that comprise attributes 1.106 and values 1.107, being evident to one skilled in the art, are generally unlabeled in the drawings and accompanying text after the embodiments of FIG. 1.1A through FIG. 1.1E.

Each element of the domain 1.100 is comprised of a specific set of data that may improve storage and query efficiency through uniform syntax and semantics. The unique identifier 1.101 allows the domain 1.100 to be uniquely addressable within the datastore. The UID 1.101 may be a value 1.107 with a low or very low likelihood of occurring twice within the same datastore. For example, the UID 1.101 may be a string of random alphanumeric characters thirty or more in length. In one preferred embodiment the UID 1.101 is a globally unique identifier such that each domain 1.100 is likely to remain unique when compared to domains 1.100 within any other datastore, even a datastore operated by a different organization. In another preferred embodiment an attribute 1.106 that references an instance of a different domain 1.100 (e.g., owned ref 1.22, domain ref 1.134) may have a value 1.107 that is the UID 1.101 of a different domain 1.100. Use of the UID 1.101 as a value 1.107 may allow an application program to directly address the different domain 1.100.

The TY element 1.102 comprises identification data 1.20 usable to either label a particular domain 1.100 or distinguish the particular domain 1.100 from any other domain 1.100 within the datastore. For example, data within the identity element 1.102 may be used by an application program, or a person operating the application program, to identify the particular domain 1.100 and/or the data that the particular domain 1.100 contains. Data usable to label the domain 1.100 may be, for example, a name of the particular domain 1.100 that is either user-defined or automatically generated by an application program. For example, data usable to label the domain 1.100 may be "Stairway to Heaven" when the domain 1.100 contains an audio track, "IMG_00045" when the domain 1.100 contains a digital photo, or "1.2015-June_ClinicalTrials" when the domain 1.100 contains clinical test data.

The identification data 1.20 may also include data that is usable to distinguish the particular domain 1.100 from any other domain 1.100 within the datastore. This distinguishing data includes a unique property of the domain 1.100 or a unique relation of the particular domain 1.100. For example, where the domain 1.100 contains data related to a periodic table element, the identification data 1.20 may include a number of protons (recall that the number of protons unique determines a species of the chemical element such as fluorine, tin, or potassium). In another example, where the domain 1.100 contains data related to a chemical compound, the TY element 1.102 may include within the identification data 1.20 electromagnetic radiation absorption values that are unique to the chemical compound. The radiation absorption values may act as a signature sufficient for a chemist to identify the compound modeled by the domain 1.100. In general, attributes usable as a "primary key" in other data models (e.g., the relational data model) for a group of related data may also be used in the identification data 1.20.

The distinguishing data may also include data that is not unique within the datastore but which may generally have a low expected reoccurrence. For example, the distinguishing data may be a time stamp of a time at which the particular domain 1.100 was created and/or modified. Specifically, where domain 1.100 stores a report of oceanographic activity is made daily, a date may be the distinguishing data, whereas when the domain stores a real-time statistic generated by a stock trade a time including a millisecond accuracy may be the distinguishing data. The distinguishing data may include attributes 1.106 that when considered in combination are usable to distinguish the particular domain 1.100 from any other domain 1.100 within the datastore. In other words, even where the value 1.107 of an attribute 1.106 within the identification data 1.20 is not likely unique within the datastore, the identification data 1.20 may be comprised of attributes 1.106 that, when a small number are examined in combination (e.g., two, three), can be used to identify the particular domain 1.100. For example, it is possible that neither the time stamp nor the owner are used by an application program to label the particular domain 1.100, but the combination of the owner and the time stamp is used to identify the particular domain 1.100 by distinguishing it from any other domain within the datastore. Distinguishing data may also be a property with a low occurrence within the datastore and/or a relation with a low occurrence within the datastore. For example, a domain 1.100 modeling a person could have a unique relation to a different domain 1.100 modeling a biological father of the person (perhaps through a "bio_father" attribute 1.106 within the identification data 1.20). The role and use of the identity element 1.102 is further described in conjunction with FIG. 1.1E.

The hastory 1.124 is a hashed history of transaction records, each transaction record related to one or more transactions in which the domain and/or data of the participated (e.g., the primitive 1.131) participated. The hastory 1.124 may create a "controlled identity" of the domain 1.100 within the datastore based on an immutable chain of blocks (the chain of blocks is shown in FIG. 1.1 as five illustrative transaction records, T1 through T5). The hastory 1.124 may include a set of blocks in a sequential chain and each block of the set of blocks includes a transaction record of a set of previous transactions. A hash function may generate a hash value of each block using inputs comprising a previous hash value of a previous block along with a transaction record of a present block. A root hash that is unique within the datastore results, the root hash dependent on a given data within each of the blocks and a given block order of the sequential chain. The hash function may be a cryptographic function and/or algorithm that converts a set of data to a string of other data such as alphanumeric characters. Additionally, the hash function may be a function that can be used to map digital data of arbitrary size to digital data of fixed size, where a small change in the input digital data yields a large difference in the output digital data of fixed size. The hastory 1.124 may be implemented as a Merkle tree, a hash chain, and/or a hash list.

A first block of the sequential chain may be a genesis block initiating the hastory 1.124. For example, where for the user domain 1.400, the genesis block 2.1.303A may contain a transaction record that includes data one or more attribute-value pairs of the TY element, such as an email address, biometric information, or name. After the domain 1.100 having the hastory 1.124 participates in an interaction, for example with an application program and/or a different domain 1.100 within the datastore, a new transaction record may be generated. The transaction record may be deposited as a new block in the sequential chain of blocks of the hastory 1.124. The root hash of the hastory 1.124 may then be re-calculated with a hash function (e.g., SHA256 algorithm), where the hash function uses inputs that include the new block of the hastory 1.124 of the particular domain 1.100. As a result, the controlled identity of the domain 1.100 evolves and can be distinguished from a copy of the domain 1.100 that includes otherwise similar data but which has a different transaction history. Thus, the evolved domain 1.100 may remain unique within the datastore, may have a complete auditing record of transactions in which it participated.

Retention of uniqueness within a datastore may allow a data processing system to define processes that distinguish otherwise identity domains 1.100. For example, a method may then be used to effect a controlled copying of the domain 1.100 such that a distinct original and copy are specified. Similarly, ownership may be determined and transferred in a distinct set of bits that comprise an instance of the domain 1.100. Further use of the hastory 1.124 may be shown and described in conjunction with co-pending patents and/or patent applications by similar inventive entity and/or common assignees of the present embodiments.

The NT element 1.103 comprises contained data 1.130 that the particular domain 1.100 contains. The data within the contained data 1.130 may be physically and/or logically contained as a logical "containing" relationship (e.g., a domain 1.100 that specifies an industrial part that is an assembly wherein each. Data that is physically contained (which may also be referred to as "embedded data") may be proximate and/or directly associated with the data structure of the particular domain 1.100 within a physical storage device. For example, data that is physically contained by the domain 1.100 may be placed in a memory address adjacent to other memory addresses holding the data structure defined by the domain 1.100. Similarly, both the domain 1.100 and the contained data 1.130 could be placed on the same hard disk sector. On the other hand, data that is logically contained by the domain 1.100 may include a reference (e.g., the domain ref 1.134) to a physical location such as a memory address holding the data that is logically contained by the domain 1.100.

Where the particular domain 1.100 contains a fundamental piece of data within the datastore, the contained data 1.130 may be a primitive data 1.105. The primitive data 1.105 may be embedded within the particular domain 1.100 (shown in FIG. 1.1A as the primitive 1.131 attribute 1.106). For example, the value 1.107 of the primitive 1.131 attribute 1.106 may be a string when the domain 1.100 contains a message or a BLOB when the domain 1.100 contains an image file. The contained data 1.130 may also be a reference to a memory address containing the primitive data 1.105 (the reference to the memory address shown in FIG. 1.1A as the primitive ref 1.132 attribute). The reference to the memory address may also be known as a pointer. In one or more embodiments, a small instance of the primitive data 1.105 is embedded in the domain 1.100 (e.g., 1.140 alphanumeric characters, a DNA sequence of 1.3000 base pairs), whereas a large instance of the primitive data 1.105 is referenced through primitive ref 1.132 (e.g., an audio file, a genome).

Rather than contain a primitive, the particular domain 1.100 may also contain a reference to one or more other domains 1.100 within the datastore (shown in FIG. 1.1A as the domain ref 1.134). An architectural constraint may be applied to one or more of the references such that the data structures built from instances of the domain 1.100 reference one another according to a particular arrangement. These architectural constraints may be used to build data structures that reflect and enforce certain types of relationships (such as a container) modeled through a directed acyclic graph (DAG) architecture 1.600, as shown in FIG. 1.6. An example of one set of architectural constraints is demonstrated in FIG. 1.7 through FIG. 1.11.

In addition to referencing an instance of the domain 1.100 through the domain ref 1.134, the particular domain 1.100 may reference a different instance of the domain 1.100 that represents and/or depicts the particular domain 1.100 (shown in FIG. 1.1A as the representation ref 1.136). The representation may help a user to make a selection of either the particular domain 1.100 or another instance of the domain 1.100 that the particular domain 1.100 contains. Representation domains that are instantiations of the domain 1.100 will be shown and described in conjunction with FIG. 1.11 and various other embodiments.

The particular domain 1.100 may contain within the content element 1.103 multiple instances of the primitive 1.131, primitive ref 1.132, domain ref 1.134, and/or representation ref 1.136. However, in one or more preferred embodiments the real-world objects modeled by the domain 1.100 are reduced to relatively basic units, and the instantiations of the domain 1.100 take on specialized roles reflecting the nature of these basic units. For example, the subject domain 1.200 of FIG. 1.2, in one or more preferred embodiments, contains within the NT element 1.203 a single primitive data (referred to in FIG. 1.2 as primitive data 1.205). Similarly, collection domain 1.900 of FIG. 1.9, according to one or more preferred embodiments, contains within the NT element 1.903 references to two or more stack domains 1.800. In such case the real-world thing that the collection domain 1.900 reflects may be the relationship itself between the two or more stack domains 1.800, thus expressing the relationship of the domains in the data structure rather than programmatically through software code that may attempt to build relationships as the code executes.

The XT element 1.104 comprises contextual data 1.140 that further characterizes the particular domain 1.100. The contextual data 1.140 may include examples of the particular domain 1.100 and/or data related to how the particular domain 1.100 is used. The XT element 1.104 may be a repository of any other data that is not primarily used to identify the domain 1.100 through the TY element 1.102 and that the domain 1.100 does not contain within the NT element 1.103. The XT element 1.104 may include attributes 1.106 having values 1.107 that have a relatively high likelihood occurring more than once within the datastore. For example, an attribute 1.106 "color" may have the value 1.107 "green." In this case, the value 1.107 green may be a likely property of many domains 1.100 within the datastore. The XT element 1.104 may include statistical data such as how many times data within the domain 1.100 has been accessed or used.

The XT element 1.104 may also include one or more context sub-elements. A legacy sub-element 1.144 may be used to store legacy information and metadata from an original file that was placed in the domain 1.100. An application sub-element may store data related to use of the domain 1.100 by one or more application programs. The XT element 1.104 and its optional sub-elements are further shown and described in conjunction with the example of FIG. 1.1E.

The data structure arranged according to the domain 1.100 may be deposited into the memory using a physical storage technology that may also be known as a physical layer and/or an internal schema. FIG. 1.1B is a representation of a linear memory storage of the domain of FIG. 1.1A, such as may be deposited directly in RAM and/or a memristor, according to one or more embodiments. Each element of the domain 1.100 may have an element identifier associated with one or more attribute-value pairs. For example, the TY identifier 1.161, the NT identifier 1.162, and the XT identifier 1.163 may signal the beginning of their respective elements within the memory. Although shown in a particular sequence (UID 1.101, TY element 1.102, NT element 1.103, and then XT element 1.104), the elements within an instance of the domain 1.100 may occur in any order (regardless of what storage layer the domain 1.100 is placed on). The primitive data 1.105, when referenced, may be stored at a memory address remote to the domain 1.100 stored in the linear memory. The primitive data 1.105, when embedded, may be deposited in association with the primitive 1.131 attribute (not shown in the embodiment of FIG. 1.1B) after the NT identifier 1.162. The linear memory may be a solid-state (SSD) drive. The linear memory may also be a memristor, also known as a "memory resistor." The linear memory may even be a physical storage device that stores information in quantum bits, also known as qubits.

The data structure arranging data according to the domain 1.100 may also be deposited into the memory using a storage layer that employs a different data model, for example a key-value store or a document model. In this case the domain 1.100 is said to be stored "on top of" the different data model, and may use the rudimentary building blocks of the different data model to impose the organization of the domain 1.100 on data resident in the memory. For example, the domain 1.100 may be placed into memory on top of a storage layer utilizing a memory map or a hash table. In another example, FIG. 1.1C is a representation of the domain of FIG. 1.1A built on top of a key-value store, according to one or more embodiments. In FIG. 1.1C, each value 1.107 within the domain (e.g., a value of the UID 1.101, a value 1.107 of the domain ref 1.134) is matched with a key 1.172. Each key 1.172 may be comprised of the value of the UID 1.101 of the particular domain 1.100, along with an element identifier (e.g., TY identifier 1.161) and the attribute 1.106. As shown in FIG. 1.1C, the primitive data 1.105, when embedded within the domain 1.100 that is stored on a key-value store, may be stored as a BLOB. The key-value store may be an existing commercial database, such as Redis, Riak, DynamoDB, Encache, and/or Memcached. In one preferred embodiment, a commercial database able to support transactions (e.g., ACID compliance) is used.

FIG. 1.1D is a representation of the domain 1.100 of FIG. 1.1A built on top of a document store, shown in JSON notation, according to one or more embodiments. The unique identifier 1.101 may be represented as an attribute-value pair, whereas the TY element 1.102 may include a subset of attribute-value pairs (e.g., the owned ref 1.22 attribute 1.106 and an associated value 1.107). FIG. 1.1D also illustrates that a value 1.107 may be comprised of array of values (that may be referred to as values 1.107.1, 1.107.2, etc.). A database storing the document may be an existing commercial database, such as MongoDB.

FIG. 1.1E is a specific example of an entity-attribute-value (EAV) representation of the domain 1.100 of FIG. 1.1A comprising data related to an amino acid sequence of a human lysozyme enzyme, according to one or more embodiments. In the embodiment of FIG. 1.1E, The UID 1.101 is made up of one attribute 1.106 and one value 1.107. The TY element 1.102, the NT element 1.103, and the XT element 1.104 are comprised of entity-attribute-value triplets. The TY element 1.102, the NT element 1.103 and the XT element 1.104 are each an instance of an entity 1.182. Examples of an attribute 1.106 associated with the TY element 1.102 are: "name," "date created," and "owner." Examples of a value 1.107 associated with attributes are, respectively: the array that includes "lysozyme C" and "1,4-beta-N-acetylmuramidase C"; "1.1344532774 UTC (GMT)"; and the string beginning "owner_UID_kc73n" that is an instance of the UID 1.101 belonging to a different domain 1.101 that owns the domain 1.100 shown in FIG. 1.1E (e.g., an owner domain 1.400). In relation to FIG. 1.1A, The contained data 1.20 is comprised of the attributes 1.106 and values 1.107 of the TY element 1.102 of FIG. 1.1E.

The TY element 1.102, the NT element 1.103, and the XT element 1.104 may further include sub-elements. A section of the domain containing sub-elements, such as the legacy sub-element 1.144 and the application sub-elements 1.146.1 and 1.146.2, may be stored in what may be understood to be an entity-sub-entity-attribute-value "quadruplet." In one or more embodiments, the XT element 1.104 may include a legacy sub-element 1.144 comprising data about the origin of a file that has been placed into the domain 1.100 (e.g., a file removed from a hierarchical file system and placed in the domain 1.100). In one or more embodiments, the XT element 1.104 may include one or more application sub-elements (e.g., the application sub-element 1.146.1 and the application sub-elements 1.146.2) holding data that may be utilized by one or more application programs.

The specific domain 1.100 as shown in the embodiment of FIG. 1.1E is used to store data about an enzyme that is excreted by tear ducts of humans to inhibit bacterial growth in the eyes: human lysozyme C. In the embodiment of FIG. 1.1E, the UID 1.101 has a value of 32 random alphanumeric characters. The TY element 1.102 is made up of data that can be used to either label the domain 1.100 or distinguish the domain 1.100 from any other domain within the datastore, allowing a user to identify the domain 1.100 as containing lysozyme C data and/or modeling lysozyme C. Specifically, the name attribute 1.106 holds an array of values 1.107 that can identify the domain 1.100, a gene_code attribute 1.106 holds a common three-letter abbreviation of a human gene that codes for the lysozyme C enzyme, and a UniProtKB attribute 1.106 that holds a unique identification code that has been assigned to lysozyme C by a scientific organization. The weight attribute 1.106 having a value 1.107 of 16537 Daltons is an example of data that while perhaps not likely to have a unique value within a datastore holding enzyme information may still be unlikely to occur more than a few times. The weight attribute 1.106, in the embodiment of FIG. 1.1E, may therefore be usable to distinguish the domain 1.100 of FIG. 1.1E from any other instance of the domain 1.100 within the datastore.

The NT element 1.103 of FIG. 1.1E holds data that the domain 1.100 is considered to contain, in this case an amino acid sequence that makes up lysozyme C (the value 1.107 of the sequence attribute 1.106) and a list of disulfide bonds between the amino acid sequence (the value 1.107 of the disulfide attribute 1.106). In FIG. 1.1E, both the value 1.107 of both the sequence and the disulfide attributes 1.106 are embedded in the domain 1.100. The NT element 1.103 may also include a reference to a representation of the domain 1.100 to help enable a selection of the domain 1.100 of FIG. 1.1E through a user interface. For example, an application program may address the NT element 1.102 and display the representation on a graphical user interface before expending time and/or energy to access, transmit or display other data within the domain 1.100.

The XT element 1.104 of the domain 1.100 of FIG. 1.1E may be comprised of data that further characterizes the domain 1.100, for example an application program that added the domain 1.100 to the datastore (the publishing_app attribute 1.106) or a website related to and/or providing more information about an aspect of the particular domain 1.100. Additionally, the XT element 1.104 may contain data that characterizes use of the domain 1.100. For example, a substrate attribute 1.106 specifies a chemical compound that lysozyme C catalyzes (acts on), and an enzyme_class attribute includes the category of enzyme to which lysozyme C belongs.

The legacy sub-element 1.144 is used to store data related to where one or more pieces of the content data 1.130 came from. For example, where the an original file is uploaded remotely to be placed in an instance of the domain 1.100 (e.g., within the subject domain 1.200), a restoreIP attribute 1.106 shows an IP address that the original file arrived from, a restore path (e.g., from a hierarchical file system), a file name of the original file (which may have a different value 1.107 than the name attribute 1.106 of the TY element 1.102), and a metadata that may have been extracted and/or stripped from the original file.

An application sub-element 1.146 may store data that is application-specific (e.g., particular to a specific application program). The attributes within each of the application sub-elements 1.146 may be similar or may differ widely between application sub-elements. For example, while both the sub-element 1.146.1 and the sub-element 1.146.2 have an app_data attribute 1.106 specifying an owner (e.g., the owner domain 1.400 of FIG. 1.4), they also comprise attributes 1.106 unique to the function of each application program. The application sub-element 1.146.1 includes application-specific data from an application program that sells research supplies to laboratories. The attribute Price_10 gm may be a price in dollars per ten grams of lysozyme C. In contrast, the application sub-element 1.146.2 is for an application program that maps biological origins of enzymes. A tax_lineage attribrue is therefore used to store a taxonomy of a species from which the enzyme was isolated (in the case of lysozyme C, humans).

Arranging data according to one or more of the present embodiments may represent several advantages. First, each instantiation of the domain 1.100 has a uniform syntax and semantics, allowing developers of application programs to easily learn how to interact with a datastore and how to utilize the domain 1.100 as a data resource within the datastore and/or for utilization of the application program. The consistent syntax and semantics also allows a single instance of the domain 1.100 within the memory to be utilized as a data resource for several application programs. At the same time, developers are still afforded flexibility by being able to add and define custom attributes 1.106 within the application sub-element 1.146. This use of the domain 1.100 by multiple application programs reduces duplication of data, saving space in the memory (and potentially preventing consistency issues associated with copying the data resource to ensure it remains addressable). Additionally, the owner of the domain 1.100 simultaneously can regulate access to or use of the domain 1.100 by all of the application programs that utilize it as a data resource, creating a single point of control (e.g., with the security domain 1.500 of FIG. 1.5). This single point of control may make the domain 1.100 especially useful in storing and distributing licensable content, such as music, video, documents, or computer aided drafting (CAD) files. It also makes the domain 1.100 useful to transact in private communications, securely store resources, and for enterprise and/or government cyber security applications. All of these emergent properties of the domain 1.100 and/or the relations between domains may make a datastore defined by instances of the domain 1.100 ideal for use with a cloud computing platform.

Another advantage is that each of the elements of the domain 1.100 (the UID 1.101, the TY element 1.102, the NT element 1.103, and the XT element 1.104) may be individually addressed by an application program, with the kind of data in each element generally known before a query against the datastore is made. In general, a person knowing little about the contents of the datastore may request data that identifies things (e.g., by requesting the TY element 1.102). For example, an application program may request just the TY element 1.102 of each of several of the domains 1.100 such that a user of the application program can identify which of the domains 1.100 for which he or she is searching or what they contain. Similarly, constrained references within the NT element 1.103 may be followed without drawing upon information within the TY element 1.102 or XT element 1.104. Once a domain 1.100 of interest is identified, data within the NT element 1.103 may be used and additional context about the domain 1.100 can drawn from the XT element 1.104, such as the domain 1.100's relationship to other domains. Additionally, different security features may be defined for each of the elements, allowing the TY element 1.102 to be displayed while additional security features (e.g., the control policy 106) are triggered when requesting data from the NT element 1.103.

Yet another advantage of the domain 1.100 is that references made through the NT element 1.103 may have architectural constraints imposed (e.g., the directed acyclic graph (DAG) architecture 1.600 of FIG. 1.6 and/or the object domain 1.700 of FIG. 1.7) whereas references made through the XT element 1.104 may remain flexible by referencing any other domain within the datastore (e.g., through the contextual ref 1.142). The architectural constraints may allow for a relatively rigid data structure that may model, for example, containing relationships, while the flexible references may be used to for semantic relationships within the data structure. This structure may segregate relationships by purpose, permitting targeted query that may reduce computing resources.

In one or more of the present embodiments, once the UID 1.101 of the domain 1.100 is obtained, all of the data within the domain 1.100 can be directly accessible by an application program, generally with minimal time and energy expenditure. In one preferred embodiment, almost every piece of data within the datastore is an instantiation of the domain 1.100, which may allow any data to be easily analyzed and directly addressed, subject to security parameters defined by the security node 1.500. Application programs may be able to easily combine data from several domains 1.100 without complex query but by directly addressing several resources from which data is to be drawn.

Specialized instantiations of the domain 1.100 that further define the data structure within the memory are shown in the embodiments of FIG. 1.2 through FIG. 1.11 and described in the accompanying text. Within the present drawings symbols may be used to represent instantiations of the domain 1.100 as shown in the key of FIG. 1.1F: a circle for any instantiation of the domain 1.100; a triangle for the subject domain 1.200; a circle having three contained circles for the relation domain 1.300, a four-pointed star for the owner domain 1.400; and a shield shape for the security domain 1.500. The shield shape may contain one of the other shapes demonstrating a hybrid whereby one of the instantiations of the domain 1.100 further comprise features of the security domain 1.500 such as the control policy 106. In addition, the relation domain 1.300 may have several instantiations, including: a square for the object domain 1.700, a pentagon for the stack domain 1.800, a hexagon for the collection domain 1.900, and a heptagon for the epi-collection 1.1000. An instantiation of the domain 1.100 that is shielded by the security domain 1.500 is denoted with an asterisks.

Also shown in the key of FIG. 1.1F are different styles of arrowed lines used to represent different kinds of relationships that may be defined between and/or among the instantiations of the domains 1.100 in the embodiments of FIG. 15 through FIG. 17 and FIG. 1.1 through FIG. 1.11. The relationships represented by the arrowed lines may be effectuated with referential attributes (e.g., the owned ref 1.222, the domain ref 1.134, the contextual ref 1.342). In general, a solid line shows a reference that may have one or more architectural constrains applied (effectuated with, e.g., the domain ref 1.134, the owning ref 1.434) or a reference to a memory address holding a primitive data 1.105 (effectuated with, e.g., primitive ref 1.131, primitive ref 1.231). A dashed line is generally an unconstrained reference (e.g., the unconstrained reference 1.642 of FIG. 1.6 effectuated with, e.g., contextual ref 1.142). Unconstrained references may generally reference any other domain of the datastore within parameters defined by the security domain 1.500, as described below. A dotted line is generally a reference from a domain 1.100 to an owner domain 1.400 that owns the domain 1.100. Finally, a dashed-dotted line may be a reference to a representation domain (e.g., the representation domain 1.1101 of FIG. 1.11, referenced, for example, with the representation ref 1.136). A reference to a representation domain may also have one or more architectural constraints applied by constraining permissible values of a referential attribute.

Each of the instantiations of the domain 1.100 are comprised of analogous primary elements which may be numbered in coordination with the domain 1.100. For example, the subject domain includes a UID 1.201, a TY element 1.202 (comprising identification data 1.220), an NT element 1.203 (comprising contained data 1.230), and an XT element 1.204 (comprising contextual data 1.240). Similarly, the identification data 1.220 includes data usable to either label a particular subject domain 1.200 or distinguish the particular subject domain 1.200 from any other domain 1.100 within the datastore. The contained data 1.230 includes data that the particular subject domain 1.200 contains. The contextual data 1.240 comprises data that further characterizes the particular subject domain 1.200. However, the analogous elements of a particular instantiation of the domain 1.100 may be comprised of specific structures (e.g., sub-elements, attributes, values, data) and/or specific kinds of references that facilitate certain functionality. For example, one defining feature of the owner domain 1.400 is that it includes within the NT element 1.403 an owning ref 422 attribute drawn to each instantiation of the domain 1.100 that the owner domain 1.400 owns and/or "possesses." A domain 1.100 may also be owned by an owner domain 1.400 when the domain 1.100 is created by an application program modeled and/or represented by an associated owner domain 1.400. Similarly, a domain 1.100 may be owned by an owner domain 1.400 that represents a person who may be logged into a particular service run by an application program. The inclusion of the owning ref 1.434 in the TY element 1.402 may allow an application program to quickly identify each of the domains 1.100 owned by a user by querying the NT element 1.403 of the owner domain 1.400.

Each of the instantiations of the domain 1.100 will now be described. FIG. 1.2 illustrates a fundamental instantiation of the domain 1.100 of FIG. 1.1A referred to as the subject domain 1.200 defining a data structure that contains a primitive data 1.105 that is embedded and/or referenced through the NT element 1.203, according to one or more embodiments. The subject domain 1.200 may be used to contain a fundamental piece of data, for example an audio file, a computer aided drafting (CAD) file, a document, a digital image, a file of any other MIME type, a cryptographic key (including a private key used for data encryption and/or a private key of a cryptographic currency (e.g., Bitcoin)) and/or a BLOB usable to store any block of binary information. The subject domain 1.200 may also be used to store components of a larger file, for example a vector path that is part of a digital illustration comprising many such vector paths or a paragraph of a document. The NT element 1.203 comprises a contained data 1.230 that includes one or more attribute-value pairs holding a primitive data 1.205 that is embedded (the primitive data 1.205 being a value of the primitive 1.231 attribute) and/or referenced through a reference to a memory address (the primitive data 1.205 being a value of the primitive ref 1.232 attribute). However, in one or more preferred embodiments, each instance of the subject domain 1.200 contains a single fundamental piece of data. Specifically, in that case the NT element 1.203 of the subject domain 1.200 contains only one instance of the primitive data 1.205, whether embedded or referenced (e.g., a single file stored as a BLOB-type value of a single attribute). That each fundamental piece of data is assigned to its own subject domain 1.200 may allow for increased flexibility in drawing relationships between data and/or may improve search of the datastore. In one or more embodiments, as shown in FIG. 1.1A, the identification data 1.220 for a particular subject domain 1.200 includes an owned ref 1.222 to an owner domain 1.400 that owns the particular subject domain 1.200.

FIG. 1.3 illustrates a relational instantiation of the domain of FIG. 1.1A referred to as a relation domain 1.300, the relation domain 1.300 defining relationships between one or more other domains 1.100 and that may include constrained relationships through an NT element 1.303 and unconstrained contextual relationships through the XT element 1.304, according to one or more embodiments. The relation domain 1.300, which may have its own elements for identity, content and context, treats a relationship between domains 1.100 as a real-world "thing" or object to be explicitly stored as a data structure deposited in the memory. This may be different than, for example, a programmatic relationship defined in an application program to relate rows and columns of tables in a relational database. Programmatic relationships may require computing resources (e.g., a "join" operation in a relational database) to process software code of the application program necessary to derive the relationship, decreasing efficiency of a data processing system.

The contained data 1.330 of the NT element 1.303 may contain one or more references to other domains 1.100 through instances of the domain ref 1.334 (e.g., the domain ref 1.334.1, 1.334.2, etc.). For example, the contained data 1.330 may include attribute-value pairs for referencing several instances of the subject domains 1.200 (e.g., a subject domain 1.200A, a subject domain 1.200B) and/or several other relation domains 1.300. In addition, the contained data 1.330 may include one or more representation refs 1.336 that reference domains 1.100 that are usable by an application program to represent the relation domain 1.300. The representation domain, which is further described in conjunction with FIG. 1.11, may facilitate a selection of the data within the relation domain 1.300 by a user of an application program. As shown and described in conjunction with FIG. 1.6, particular architectural constrains may be imposed on the references in the NT element 1.303 to define additional structure within the memory that may be useful for modeling particular kinds of real-world relationships. Similar to the subject domain 1.200, the identification data 1.320 for a particular relation domain 1.300 may include an owned ref 1.322 to an owner domain 1.400 that owns the particular relation domain 1.300.

FIG. 1.4 illustrates an owner instantiation of the domain 1.100 of FIG. 1.1A referred to as an owner domain 1.400, the owner domain 1.400 representing an owner that is a person or an owner that is a machine and referencing each domain 1.100 owned by the owner domain 1.400 through the NT element 1.404, according to one or more embodiments. The owner that is a person may be a user of the datastore and/or a user of one or more application programs that utilize the datastore, for example a person using a social network, a consumer using a game on a smartphone, a researcher contributing to a scientific datastore, or an employee using proprietary application programs of an enterprise. The owner that is a machine may be an application program, specific components and/or processes of an application program, an operating system, and/or pieces of physical computing hardware such as a network router. Where the owner is a person, the TY element 1.402 may include a variety of data that can be used to identify the person, including: a legal name, a social security number, an email address, a physical address, a username, and a password. Where the device is a machine-user, the data used to identify the machine and/or application program may include, for example: a serial number, a network address, and/or a device ID. The NT element 1.403 may include a reference to each domain 1.100 owned by the owner domain 1.400 through one or more owning refs 1.434 (e.g., 1.434.1, 1.434.2, etc.). In one preferred embodiment, each domain 1.100 is owned by one and only one instance of the owner domain 1.400. Although not shown in FIG. 1.4, the owner domain 1.400 could itself be owned by another owner domain 1.400 (e.g., an owner domain 1.400A having a UID 1.401B as a value of an owning ref 1.434A), although it may be beneficial for some datastores to maintain each owner domain 1.400 as a "root" which is not owned by any other owner domain 1.400. Additionally, where a person that is using multiple application programs, it is preferred that the person be represented by a single owner domain 1.400 within the datastore. This may allow all of the user's domains 1.100 to be easily retrieved simply requesting the contained data 1.430 of the NT element 1.403. Although not shown in FIG. 1.4, one or more sub-elements may be included within the XT element 1.404 to append application-specific data to the owner domain 1.400. For example, an application sub-element associated (e.g., the application sub-element 1.146) with a particular application program may reference each domain 1.100 that has been used as a data resource by the particular application program, or may include login credentials for the application program.

FIG. 1.5 illustrates a security instantiation of the domain of FIG. 1.1A referred to as a security domain, the security domain including a control policy usable to secure access to and/or use of data within the security domain itself and/or within a different domain referenced by the security domain, according to one or more embodiments. The different domain 1.100 may be referred to as a shielded domain and in the present drawings is represented by an asterisks associated with the symbol corresponding to a particular instantiation of the domain 1.100 (e.g., an asterisks placed in association with the pentagon symbol that represents the stack domain 1.800 of FIG. 1.8 represents that the stack domain 1.800 is a shielded domain).

The security domain 1.500 contains some protected resource that is data (e.g., one or more attribute-value pairs of one of the elements, especially the primitive 1.131 and/or referential attributes) along with a control policy 106. The control policy 106 may be stored in a security sub-element 109 of the NT element 1.503 and/or the XT element 1.504 similar to the application sub-element 1.146. The control policy 106 contains some data related to permissible access and/or use of the protected resource. For example, the control policy 106 may contain a control algorithm 108 and/or a control dataset 110 that evaluate a context of an authorization request for the protected resource (e.g., the authorization request made by a use, a device). In addition to the present embodiments, additional data structures, systems and methods for use of the security domain 1.500, along with the control policy 106, may be disclosed in co-pending patent applications of similar inventive entities and/or similar assignees.

The protected resource (e.g., the protected resource 104) may be, for example, one or more referential attributes. For example, in one or more embodiments, the contained data 1.130 of a relational domain 1.300 domain (or a portion of it) is replaced with a security ref 1.322 that references the security domain 1.500, for example through referencing the UID 1.501 of the security domain 1.500. The original contained data 1.130 of the relation domain 1.300 is then placed in the NT element 1.503 of the security domain 1.500. For example, in FIG. 1.5, the domain ref 1.334 was removed from the relation domain 1.300 and placed in the security domain 1.500 to become the domain ref 534.

A control policy 106 may be seen as attached to the domain 1.100 that includes the protected resource 104 that the control policy 106 controls. This may be in contrast to a relatively static, centralized location such as a lookup table associated with an operating system and/or a database (which may be referred to as an "access control list"). In one or more embodiments, the security domain 1.500 and the associated control policy 106 may provide an alternative to hierarchical access controls that might otherwise allow complete access to a leg of the hierarchy once access to a parent node of the hierarchy is granted by the access control list. The control policy 106 may function independently of a database and/or operating system managing authorization requests.

In addition, control policy 106 may be more useful and flexible than traditional access control lists. The control policy 106 may be an arbitrarily complex (e.g., written in a Turing complete language), application-specific policy for the use of data within the security domain, and, in conjunction with the security program, may be usable to institute "capability based controls." Specifically, the control policy may be used to regulate use of the data within the security domain 1.500 based upon a number of criteria, including a location of a device (e.g., a set of geospatial coordinates, a geo-fenced location). The device, e.g., the device 200 of FIG. 1, may be a computer, a tablet, a smartphone, and/or a piece of hardware having network accessibility such as a 3D printer. The criteria of the control policy 106 may also include a type of device (e.g., an iPhone 6 Plus®, an Android® phone, a Galaxy S III®, an iPad®), a type of operating system (e.g., Windows®, iOS®, Mac OSX®, Android®), an application program (e.g., a specific application program which may be represented by an owner domain 1.400 such as a game, a database or a spreadsheet), a query time (such as 14:09:34 EST), a query date, a number of uses of data, and a type of use of data. The type of use of data may include monitoring other data provided by an application program, for example, how the application intends to use the data in a shielded domain (e.g., the make, model, and color settings of an inkjet printer; a configuration and/or settings of a 3D printer). The criteria of the control policy may also include a number of accesses of data (such as from a specific user and/or owner domain 1.400), a duration of use of the data within the shielded domain by one or more computer applications, a particular owner domain 1.400, and an activity of a software application for which the shielded domain is a data resource. Several of the criteria of the control policy may be simultaneously analyzed using a complex decision tree (e.g., established through a control algorithm). Various methods for mediating requests of application programs to effectuate regulation of access to and/or use of data within the shielded domain may be known in the art.

In one or more embodiments, the protected resource 104 may be the primitive data 1.105 (e.g., the protected primitive 111). However, FIG. 1.5 provides a specific example of the use of the security domain 1.500 to shield access to one or more domains 1.100 referenced by a relation domain 1.300 without disrupting the role that the relation domain 1.300 may have in modeling relationships. An original contents of the contained data 1.330 may be the domain ref 1.334 and the representation ref 1.336. Once the security domain 1.500 is created, the contained data 1.330 receives the security ref 1.338 attribute, the value of which is the UID 1.501 of the security domain 1.500. One or more attribute-value pairs from the contained data 1.330 are then removed from the contained data 1.330 and placed in the contained data 1.530. For example, domain ref 1.334 from the contained data 1.330 is placed in the contained data 1.530 to become the domain ref 534 (the value of which may be unchanged). One or more attribute-value pairs of the contained data 1.330 may remain unsecured by the control policy 106 effected by the security domain 1.500. In FIG. 1.5, for example, the representation ref 1.336 and its associated value are not protected by the security domain 1.500. When mediating a request for the NT element 1.303 of the relation domain 1.300 from an application program, the request may have returned the values of the security ref 1.338 and the representation ref 1.336. Data within the representation ref 1.336 may be immediately available to requesting application programs. The contents of the security domain 1.500 may be further mediated by a security program comparing contextual values of data associated with the authorization request with parameters of the control policy 106. In one or more embodiments, the security domain 1.500 may act as a domain of indirection, and may therefore allow access to, or use of, data within domains 1.100 originally referenced by the relation domain 1.300 without providing the UID 1.101 of those domains 1.100 to a requesting user and/or application program. Preventing some users and/or application programs from even addressing a domain by hiding the UID 1.101 of the domain originally directly referenced by the relation domain 1.300 may drastically improve security of data and/or information within the datastore.

In addition to having several specialized instantiations of the domains 1.100, the domains 1.100 within the datastore may be organized such that they reference one another according to a particular arrangement that further adds organization to the data structure resident in the memory. This additional organization may be used to model particular types of relationships between real-word things or objects. The additional organization may be imposed, for example, by limiting the permissible values of one or more referential attributes within one or more elements of the domain 1.100. For example, in one preferred embodiment the additional organization is imposed on each instance of the domain ref 1.334 of the relation domain 1.300. The additional organization may be referred to as a "referential constraint."

FIG. 1.6 illustrates a directed acyclic graph (DAG) architecture 1.600 that imposes constraints on values of referential attributes within the NT element 1.103 of the domain 1.100, while simultaneously permitting unconstrained values of one or more referential attributes within the XT element 1.104 to allow for flexibility, according to one or more embodiments. A DAG may be a collection of vertices linked by directed edges in such a way that there exists no directed cycles and/or loops within the data structure. A DAG may be useful in modeling particular types of real-world relationships, for example containers and/or versioning of a set of data through time. A DAG can also be useful in finding and retrieving data, for example by allowing application of mathematics that calculates an efficient path from one vertex of the DAG to another vertex.

In FIG. 1.6, references are shown between and among instantiations of the domain 1.100 including: a number of relation domains 1.300 (labeled 1.300A through 1.300G); a number of subject domains 1.200 (labeled 1.200A through 1.200E); and an owner domain 1.400X. Although not numbered in FIG. 1.6, each element of each instantiation of the domain 1.100 will be referred to using a corresponding number of the element from previous described embodiments. For example, the relation domain 1.300A includes the UID 1.301A and the subject domain 1.200C includes the XT element 1.204C. Each of the NT elements 1.203, 1.303 and 1.403 (of the subject domains 1.200, the relation domains 1.300, and the owner domain 1.400, respectively) may form a set of vertices 1.603 of the directed acyclic graph. For example, NT element 1.303D may form vertex 1.603D. Referential attributes within each NT element 1.303 and XT element 1.403 (e.g., the domain ref 1.334 attribute and the owning ref 1.434 attribute) may be referred to as directed edges 1.635 of the DAG, represented by solid arrowed lines, e.g., the relation domain 1.300A includes three directed edges 1.635.1A, 1.635.2A, and 1.635.3A. For clarity, some of the directed edges 1.635 and vertices 1.603 are not labeled.

FIG. 1.6 shows various features of the DAG architecture 1.600. First, the DAG of FIG. 1.6 has two "entry points" that receive no directed edge 1.603—the relation domain 1.300A and the owner domain 1.400. Second, the DAG of FIG. 1.6 has six end-points: the relation domain 1.300D and the subject domains 1.200A through 1.200E. Third, a single vertex 1.603 may initiate multiple directed edges 1.635, as shown where relation domain 1.300A references relation domains 1.300B, 1.300D and 1.300F via directed edges 1.635.1A, 1.635.2A, and 1.635.3A, respectively. Fourth, multiple directed edges 1.635 may point to a single vertex 1.603, as shown where relation domain 1.300D is referenced through NT element 1.303A of relation domain 1.300A and is also referenced through NT element 1.303B of relation domain 1.300B. Finally, no directed cycles are formed through references within the NT elements 1.203, 1.303, and 1.403 (e.g., directed edges 1.635 represented by the solid arrowed lines). Although not shown, the owner domain 1.400X can own each of the instantiations of the domains 1.100 in FIG. 1.6 without violating the DAG architecture 1.600.

Also illustrated in FIG. 1.6 are two owned reference 1.132 attributes of the domain 1.100 and several instances of the unconstrained references 1.642. Specifically, relation domain 1.300B is owned by the owner domain 1.400X and therefore may reference domain 1.400X through owned ref 1.322B of the TY element 1.103B (not labeled). Similarly, subject domain 1.200A is owned by the owner domain 1.400X and therefore may reference domain 1.400X through owned ref 1.22A of the TY element 1.203A (also not labeled). The XT element 1.104 of each of the instantiations of the domain 1.100 in FIG. 1.6 may each include one or more instances of the unconstrained reference 1.642, shown in dashed lines. The unconstrained reference 1.642 may, for example, be effected by the contextual ref 1.142. In contrast to the directed edges 1.635, for example, the unconstrained references 1.642 may form a directed cycle, as shown by the dashed arrows that run from relation domain 1.300D to 1.300B, from 1.300B to 1.300C, and from 1.300C back to 1.300D. A domain 1.100 may have multiple unconstrained references 1.642, for example the unconstrained reference 1.642.1D and 1.642.2D. "Unconstrained" references may, however, be subject to security protocols of the datastore. For example, according to one or more embodiments, any shielded domain may have unconstrained references drawn to the security domain 1.500 referencing the shielded domain rather than directly to the shielded domain.

Arranging different kinds of references within different elements may improve efficiency of a computer, especially in a cloud computing environment where scalability and performance may be important. Separation of concerns between identifying a data resource (e.g., via TY element 1.102), following a set of relatively structured relationships (e.g., via NT element 1.103), and following a set of relatively flexible relationships (e.g., via XT element 1.104) may allow each element of the domain 1.100 to be discretely queried or updated by an application program depending on which of these concerns is implicated at a given time. The processor of a server computer managing requests from the application program and storage hardware (e.g., a hard disk) may therefore only need to read or write within a particular element of the domain 1.100. For example, a database managing the datastore may be able to follow references within the NT element 1.103 of each of a set of the domains 1.100, and, upon arriving at a particular domain 1.100 that is identified to be correct, request the XT element 1.104 of the particular domain 1.100. The database may then examine the particular domain 1.100's semantic relationships and/or establish a context for the use of the particular domain 1.100.

In addition to the DAG architecture 1.600, referential constrains of even greater specificity may be applied to references within the domain 1.100. As a general illustration, domains 1.100 containing a first kind of data may be prevented from (or required to) reference domains with a second kind of data. FIG. 1.7 through FIG. 1.10 show instantiations of the relation domain 1.300 that can be used to model relationships that are, for example, containers of several layers or "orders" of structure as shown in FIG. 1.11. For example, the set of subject domains 200 within the datastore may form a first order of structure. FIG. 1.7 is an object instantiation of the relation domain of FIG. 1.3 referred to as an object domain 1.700 that references one or more of the subject domains 1.200 of FIG. 1.2 within the NT element 1.703 of the object domain 1.700, according to one or more embodiments. The set of object domains 700 within a datastore may therefor be a second order of structure. The contained data 1.730 comprises a reference to each of one or more subject domains 1.200. The object domain 1.700 may also reference a representation domain. In one preferred embodiment, the object domain 1.700 is a relation between two instances of the subject domains 1.200: a first instance that is a derivative domain (e.g., the derivative domain 1.1100) and a second instance that is a representation domain (e.g., the representation domain 1.1101). The derivative domain includes contained data 1.230 to be primarily acted upon by a computer application (e.g., a primitive 1.205 that is a audio file, a document). The representation domain, on the other hand, is usable by the computer application to represent the first instance (e.g., a primitive 1.205 that is an image of music track art or an abstract of the document). The relation between the derivative domain and the representation domain may facilitate a selection of the data to be primarily acted upon by the computer application, as shown and described in conjunction with FIG. 1.11. The reference to the derivative domain and the representation domain, as shown in FIG. 1.7, may be respectively effected through the subject ref 1.734 and the subject ref 1.736.

FIG. 1.8 shows a similar arrangement, wherein a stack instantiation of the relation domain 1.300 of FIG. 1.3 referred to as a stack domain 1.800 references one or more of the object domains 1.700 of FIG. 1.7 within the NT element 1.803 of the stack domain 1.800, according to one or more embodiments. The stack domain 1.800 comprises references to each of two or more object domains 1.700. The stack domain 1.800 may therefore act as a third order of structure within the datastore. That stack domain 1.800 may also comprise a reference to an instance of the subject domain 1.200 usable by one or more computer applications to represent the contained data 1.830 of the stack domain 1.700 (e.g., a representation domain 1.1101). In a preferred embodiment, the stack domain 1.800 only references one or more object domains 1.700 along with, optionally, a single subject domain 1.200 that acts as a representation domain of the object domain 1.700. FIG. 1.9 and FIG. 1.10 are similar. FIG. 1.9 is a collection instantiation of the relation domain 1.300 of FIG. 1.3 referred to as a collection domain 1.900 that references one or more of the stack domains 1.800 of FIG. 1.8 within the NT element 1.903 of the collection domain 1.900, according to one or more embodiments. The collection domain 1.900 may therefore act as a fourth order of structure within the datastore. In a preferred embodiment, the collection domain 1.900 only references one or more stack domains 1.800 along with, optionally, a single subject domain 1.200 that acts as a representation domain of the collection domain 1.900. FIG. 1.10 is an epi-collection instantiation of the relation domain 1.300 of FIG. 1.3 referred to as an epi-collection domain 1.1000 that references one or more of the collection domains 1.900 of FIG. 1.9 within the NT element 1.1003 of the epi-collection domain 1.1000, according to one or more embodiments. The set of epi-collecton domains 1.1000 within the datastore may be referred to as a fifth order of structure within the datastore. Again, in a preferred embodiment, the epi-collection domain 1.1000 only references one or more collection domains 1.900 along with, optionally, a single subject domain 1.200 that acts as a representation domain of the epi-collection domain 1.1000. Additional higher-order instantiations of the relation domain 1.300 may be defined according to this pattern, although it may be preferable that all real-world objects or things, especially for content delivery networks, may be modeled without additional higher-order instantiations of the domains 1.100 to reduce query times associated with walking referential chains and/or networks. However, due to the UID 1.101 of each domain 1.100, once a referential chain and/or network is traveled to identify a particular domain 1.100, the particular domain 1.100 may be directly addressed without walking the chain and/or network (reducing associated computing costs).

FIG. 1.11 is a derivative-representation structure illustrating instantiations of the relation domain 1.300 that each reference a derivative domain 1.1100 having data to be primarily acting on by an application program and also each referencing a representation domain 1.1101 usable by the application program to facilitate a selection of data within the derivative domains 1.1100, according to one or more embodiments. An instantiation of the domain 1.100 may include within the contained data 1.1030 one or more derivative domains 1.1100 and one or more representation domains 1.1101. In FIG. 1.11, an application program may request data of the epi-collection 1.1000, and a database may return both the values of the references to the derivative domains 1.1100 and the representation domains 1.1101 stored within the contained data of each. In FIG. 1.11, the derivative domain 1.1100A of the epi-collection domain 1.1000 is the collection domain 1.900 (referenced through collection ref 1.1034), and the representation domain 1.1101D of the epi-collection domain 1.1000 is the subject domain 1.200E (referenced through subject ref 1.1036). Similarly, in the embodiment of FIG. 1.11, the derivative domain 1.1100B of the collection domain 1.900 is the stack domain 1.800, and the representation domain 1.1101C of the collection domain 1.900 is the subject domain 1.200D. While each of the subject domains 1.200 of FIG. 1.11 have a primitive 1.205 within their contained data 1.220, some are shown referenced (e.g., the subject domain 1.200A and 1.200C) while some are not shown being that each has an embedded primitive 1.205 (e.g., within the subject domains 1.200B, 1.200D and 1.200E).

The inclusion of the representation domain 1.1101 may improve efficiency of a database returning data resources to an application program. The application program, for example, may request the representation domain 1.1101 from a particular domain 1.100 to be retrieved before the derivative domains 1.1100. This may allow a user of the application program, or the application program itself, to determine whether the domain 1.100 contains the correct data before requesting data in the derivative domain 1.1100. For example, an application program may be instructed to populate a menu on a user interface by retrieving several instances of the domain 1.100. Where each of the domains 1.100 contain a reference to a representation domain 1.1101, the menu may then be populated with a primitive 1.105 of the representation domain 1.1101 (e.g., images). The representation domains 1.1101 may contain "light weight" data that is smaller than that in the derivative domain 1.1100 (for example, a small PNG image rather than a large AAC audio file). The use of representation domains 1.1100 may therefore reduce back-end processes rather than requiring the retrieval of an entire file before its contents (and/or metadata) can be identified and selected. Similarly, security features (such as the control policy 106) may be defined for individual elements of a domain 1.100, allowing different security measures for identification of the contents of the domain 1.100 without authorizing utilization of the contents of the domain 1.100. Although not shown in FIG. 1.11, a single subject domain 1.200 may be used as a derivative domain 1.1100 for one domain 1.100, while acting as a representation domain 1.1101 for another domain 1.100. A specific example of the use of the derivative domain 1.1100 and the representation domain 1.1101 is shown and described in conjunction with FIG. 17. The representation domain may be especially useful in populating UIs of mobile devices (e.g., smartphones) where data transfer rates are slow and/or bandwidth is expensive.

FIG. 11 also illustrates orders of structure within the datastore formed by the one or more domains 1.100. The subject domains 1.200 (e.g., the subject domains 1.200A through 1.200E) form a first order of structure. The object domains 1.700 forms a second order of structure, the stack domain 1.800 forms a third order of structure, the collection domain 1.900 forms a fourth order of structure, and the epi-collection domain 1.1000 forms a fifth level of structure.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the server 1200, the device 2500). Accordingly, the specification and drawings are to be regarded in an illustrative rather than a restrictive sense.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A computer-implemented method for controlling a data resource of a datastore, using a computer processor and a physical memory, comprising:

traversing a referent attribute of a first node of a non-hierarchical data structure referencing a security node, wherein the security node comprises a protected resource of the security node that is at least one of a protected primitive and a protected referent referring to a second node of the non-hierarchical data structure;

receiving an authorization request from a device for utilization of the protected resource of the security node, the authorization request comprising a state dataset comprising one or more state attributes each having a state value associated with a state of the device at generation of the authorization request, referencing a control policy that defines an authorized context in which the device is authorized to utilize the protected resource of the security node, the control policy comprising a control algorithm comprising one or more conditionals each comparing a control value range to a context value that is at least one of the state value of the one or more state attributes and an external value associated with a source other than the authorization request of the device;

wherein the control value range of each of the one or more conditionals specifies any one of a location of a computing device, a number of uses of the protected resource, a type of use of the protected resource, and a duration of use of the data of the protected primitive, and wherein the context value of each of the one or more conditionals specifies any one of the location of the computing device, the number of uses of the protected resource, the type of use of the protected resource, and the duration of use of the data of the protected primitive;

extracting the control algorithm of the control policy from the security node;

retrieving each context value specified in the control algorithm from a context dataset that is at least one of the state dataset comprising each instance of the state value and the external dataset comprising each instance of the external value;

determining that the context dataset conforms with the authorized context by evaluating each of one or more conditionals of the control algorithm; and authorizing utilization of the protected resource of the security node by the device when it is determined that the context dataset conforms to the authorized context defined by the control policy.

2. The method of claim 1, further comprising:
extracting the control policy from the security node of the non-hierarchical data structure.

3. The method of claim 2,
wherein the external value of the one or more external attributes is any one of a value retrieved from a memory address, a value retrieved from a function call, a value retrieved from an application programming interface (API), a value retrieved from one or more nodes of the datastore, and a value
retrieved from a second state dataset of a device other than the device that generated the authorization request.

4. The method of claim 3, wherein the security node organizes data according to a domain structure that comprises: a unique identifier (UID) whereby the security node is uniquely addressable within the datastore; and an identity element (TY element) comprising one or more attribute-value pairs that include an identification data usable to at least one of label the security node and distinguish the security node from any other node within the datastore.

5. The method of claim 4, wherein the security node organizes data according to a domain structure that comprises:
a content element (NT element) comprising one or more attribute-value pairs that include a contained data that the security node contains; and
a context element (XT element) comprising one or more attribute-value pairs that include contextual data that further characterizes the security node.

6. A computer readable memory comprising:
a plurality of nodes of a non-hierarchical data structure, the non-hierarchical data structured defined by at least one of the plurality of nodes includes a non-hierarchical reference to another of the plurality of nodes, each node of the plurality of nodes defined by a node structure comprising:
an identifier (ID) of a particular node whereby the particular node may be referenced by at least one of the plurality of nodes;
a referent attribute that references at least one other node of the plurality of nodes,
a security node of the non-hierarchical data structure, the security node defined by the node structure and further comprising:
(i) a protected resource secured by a control policy establishing an authorized context for which utilization of the protected resource is authorized, the control policy usable to evaluate a context dataset associated with an authorization request of a device in relation to the authorized context defined by the control policy,
wherein the context dataset is at least one of a state dataset that comprises a state value for each of one or more state attributes associated with a state of the device at generation of the authorization request and an external dataset comprising an external value for each of one or more external attributes associated with a source other than the authorization request of the device, and
(ii) a control algorithm of the control policy comprising one or more conditionals each comparing a first input that is any of the state value of one or more state attributes and the external value of one or more external attributes with a second input that any of a different state value of the one or more state attributes, a different external value of the one or more external attributes, and a control value range.

7. The memory of claim 6, wherein the one or more conditionals of the control algorithm are expressed in a Turing complete language, the Turing complete language comprising an if operation, a then operation, and an else operation.

8. The memory of claim 7, wherein the security node is referred to as a shield node where the protected resource is a protected referent pointing to a specific node of the plurality of nodes, the specific node referred to as a shielded node.

9. The memory of claim 8, wherein the security node further comprising:
a first control algorithm used as the first component of the control policy when a first application program of the device generates the authorization request, and
a second control algorithm used as the first component of the control policy when a second application program of the device generates the authorization request.

10. The memory of claim 9, wherein the security node further comprising:
wherein the state value of the one or more state attributes is any one of a location of the device, a geospatial coordinate of the device, a type of the device, an operating system of the device, a type of application program running on the device, a time at which the authorization request was generated, a date on which the authorization request was generated, a number of uses of the protected resource by the device, a type of use of the protected resource by the device, a number of accesses of data of the protected primitive by the device, a duration of use of the data of the protected primitive by the device, and an identifier of a user of the device.

11. The memory of claim 10,
wherein the external value of the one or more external attributes is any one of a value retrieved from a memory address, a value retrieved from a function call, a value retrieved from an application programming interface (API), a value retrieved from one or more nodes of the datastore, and a value retrieved from a second state dataset of a device other than the device that generated the authorization request, and
wherein the control value range specifies any one of a location, a geospatial coordinate, a type of device, an operating system, a type of application program, a query time, a query date, a number of uses of the protected resource, a type of use of the protected resource, a number of accesses of data of the protected resource, a duration of use of the data of the protected resource, and an identifier of a user.

12. The memory of claim 11, wherein the node structure further comprising:
an identity element (TY element) comprising one or more attribute-value pairs that include identification data usable to at least one of label the particular node and distinguish the particular node from any other node within the datastore,
wherein the identifier (ID) of the particular node is a unique identifier (UID) whereby the particular node is uniquely addressable within the datastore;
a content element (NT element) comprising one or more attribute-value pairs that include the contained data that the particular node contains; and
a context element (XT element) comprising one or more attribute-value pairs that include contextual data that further characterizes the particular node.

13. A system comprising:
a datastore comprising:
a plurality of nodes of a non-hierarchical data structure, the non-hierarchical data structure defined by at least one of the plurality of nodes includes a non-hierarchical reference to another of the plurality of nodes, each node of the plurality defined by a node structure comprising:
an identifier (ID) of a particular node whereby the particular node may be referenced by at least one of the plurality of nodes,
a referent attribute that references at least one other node of the plurality of nodes, and
a security node of the non-hierarchical data structure, the security node defined by the node structure and further comprising:
(i) a protected resource secured by a control policy establishing an authorized context for which utilization of the protected resource is authorized, the control policy usable to evaluate a context dataset associated with an authorization request of a device in relation to the authorized context defined by the control policy,
wherein the context dataset is at least one of a state dataset that comprises a state value for each of one or more state attributes associated with a state of the device at generation of the authorization request and an external dataset comprising an external value for each of one or more external attributes associated with a source other than the authorization request of the device,
wherein an instance of the control value range of each of the one or more conditionals specify any one of a location of a computing device, a number of uses of the protected resource, a type of use of the protected resource, and a duration of use of the data of the protected primitive, and
(ii) a control algorithm of the control policy comprising one or more conditionals each comparing a first input that is any of an instance of the state value of one of the one or more state attributes and an instance of the external value of one of one or more external attributes with a second input that is a control value range, and
a server comprising
a processor, and
a computer readable memory comprising instructions to:
receive the authorization request of the device; and
evaluate the context dataset associated with the authorization request with the control algorithm to determine an authorization of the protected resource.

14. The system of claim 13, wherein the one or more conditionals of the control algorithm are expressed in a Turing complete language, the Turing complete language comprising an if operation, a then operation, and an else operation.

15. The system of claim 14, wherein the security node is referred to as a shield node where the protected resource is a protected referent pointing to a specific node of the plurality of nodes, the specific node referred to as a shielded node.

16. The system of claim 15, the security node further comprising:
a first control algorithm used as the first component of the control policy when a first application program of the device generates the authorization request, and
a second control algorithm used as the second component of the control policy when a second application program of the device generates the authorization request.

17. The system of claim 16, wherein the external value of the one or more external attributes is any one of a value retrieved from a memory address, a value retrieved from a function call, a value retrieved from an application programming interface (API), a value retrieved from one or more nodes of the datastore, and a value retrieved from a second state dataset of a device other than the device that generated the authorization request.

18. The system of claim 17, wherein the node structure further comprising:
an identity element (TY element) comprising one or more attribute-value pairs that include an identification data usable to at least one of label the particular node and distinguish the particular node from any other node within the datastore,
wherein the identifier (ID) of the particular node is an unique identifier (UID) whereby the particular node is uniquely addressable within the datastore.

19. The system of claim 18, wherein the node structure further comprising:
   a content element (NT element) comprising one or more attribute-value pairs that include a contained data that the particular node contains.

20. The system of claim 19, wherein the node structure further comprising:
   a context element (XT element) comprising one or more attribute-value pairs that include a contextual data that further characterizes the particular node.

* * * * *